US012660946B2

(12) United States Patent
Tuckey et al.

(10) Patent No.:  US 12,660,946 B2
(45) Date of Patent:       Jun. 23, 2026

(54) BEDSIDE BASSINET ASSEMBLY

(71) Applicant: Wonderland Switzerland AG, Steinhausen (CH)

(72) Inventors: Peter R. Tuckey, Leola, PA (US); Lance J. Clemmer, Mohnton, PA (US); Jonathan M. Pacella, Gap, PA (US)

(73) Assignee: Wonderland Switzerland AG, Steinhausen (CH)

( * ) Notice: Subject to any disclaimer, the term of this patent is extended or adjusted under 35 U.S.C. 154(b) by 614 days.

(21) Appl. No.: 17/922,847

(22) PCT Filed: May 3, 2021

(86) PCT No.: PCT/US2021/030432
§ 371 (c)(1),
(2) Date: Nov. 2, 2022

(87) PCT Pub. No.: WO2021/225943
PCT Pub. Date: Nov. 11, 2021

(65) Prior Publication Data
US 2023/0165387 A1      Jun. 1, 2023

Related U.S. Application Data

(60) Provisional application No. 63/137,496, filed on Jan. 14, 2021, provisional application No. 63/116,286, (Continued)

(51) Int. Cl.
*A47D 9/02*       (2006.01)
*A47D 9/00*       (2006.01)
*F16M 11/28*      (2006.01)

(52) U.S. Cl.
CPC .............. *A47D 9/02* (2013.01); *A47D 9/012* (2022.08); *A47D 9/016* (2022.08); *A47D 9/057* (2022.08); *F16M 11/28* (2013.01)

(58) Field of Classification Search
None
See application file for complete search history.

(56) References Cited

U.S. PATENT DOCUMENTS 2,557,907 A       6/1951   Cranfill, Jr. et al.
7,824,273 B2     11/2010   Clapper et al.
(Continued)

FOREIGN PATENT DOCUMENTS

CN        101548836 A     10/2009
CN        101862095 A     10/2010
(Continued)

OTHER PUBLICATIONS

International Search Report and Written Opinion for Application No. PCT/US2021/030432 dated Aug. 2, 2021.
(Continued)

*Primary Examiner* — Adam C Ortiz
(74) *Attorney, Agent, or Firm* — Volpe Koenig

(57) ABSTRACT

A bassinet assembly is disclosed herein. A sway lock is provided for a swaying mechanism such that swaying motion of the bassinet can be allowed or prevented via actuation or deactivation of the lock. In another aspect, a height adjustment feature is implemented with the bassinet assembly. The height adjustment feature includes a height adjustment mechanism and an offset support member that both provide different configurations for adjusting a height of the bassinet assembly. The bassinet assembly also provides the ability to quickly remove the bassinet from a bassinet support.

15 Claims, 67 Drawing Sheets

Related U.S. Application Data filed on Nov. 20, 2020, provisional application No. 63/109,086, filed on Nov. 3, 2020, provisional application No. 63/070,503, filed on Aug. 26, 2020, provisional application No. 63/019,656, filed on May 4, 2020.

(56)                    References Cited

U.S. PATENT DOCUMENTS

| | | | |
|---|---|---|---|
| 8,677,526 | B2 | 3/2014 | Li |
| 8,769,737 | B1 * | 7/2014 | Duggins .............. A47D 15/001 |
| | | | 5/915 |
| 9,962,012 | B1 | 5/2018 | Schmid et al. |
| 2007/0111809 | A1 | 5/2007 | Bellows et al. |
| 2008/0240483 | A1 | 10/2008 | Godiska et al. |
| 2009/0170618 | A1 | 7/2009 | Bellows et al. |
| 2010/0320810 | A1 * | 12/2010 | Chen ........................ A47D 1/08 |
| | | | 297/118 |
| 2011/0041245 | A1 | 2/2011 | Shafer et al. |
| 2011/0105237 | A1 | 5/2011 | Gillett et al. |
| 2012/0205954 | A1 * | 8/2012 | Pollack .................. A47D 1/002 |
| | | | 297/344.21 |
| 2013/0026805 | A1 * | 1/2013 | Sclare .................... A47D 9/057 |
| | | | 297/260.2 |
| 2013/0244803 | A1 | 9/2013 | Haut et al. |
| 2015/0265068 | A1 * | 9/2015 | Ferraro .................... A47D 9/02 |
| | | | 472/118 |
| 2018/0296006 | A1 | 10/2018 | Robbins et al. |
| 2024/0092121 | A1 * | 3/2024 | Tully ...................... B60B 33/00 |

FOREIGN PATENT DOCUMENTS

| | | | |
|---|---|---|---|
| CN | 102068157 | A | 5/2011 |
| CN | 102894733 | A | 1/2013 |
| CN | 203633849 | U | 6/2014 |
| CN | 204708424 | U | 10/2015 |
| CN | 205849139 | U | 1/2017 |
| CN | 205947527 | U | 2/2017 |
| CN | 206062701 | U | 4/2017 |
| CN | 107411435 | A | 12/2017 |
| CN | 108260998 | A | 7/2018 |
| CN | 207565671 | U | 7/2018 |
| CN | 208582085 | U | 3/2019 |
| CN | 208676791 | U | 4/2019 |
| CN | 208807967 | U | 5/2019 |
| CN | 208807970 | U | 5/2019 |
| CN | 209202552 | U | 8/2019 |
| CN | 209202556 | U | 8/2019 |
| GB | 2421684 | A * | 7/2006 .............. A47D 7/04 |
| WO | 2019055671 | A1 | 3/2019 |

OTHER PUBLICATIONS

HALO® BassiNest® Glide Sleeper, https://www.youtube.com/watch?v=oGn5FO_icM0 , Available at: https://web.archive.org/web/20210304203804/https://www.youtube.com/watch?v=oGn5FO_icM0 (Mar. 4, 2021).

HALO™ Bassinest™ Swivel Sleeper, https://www.youtube.com/watch?v=zSncyxC7IpU , Available at: https://web.archive.org/web/20180204110709/https://www.youtube.com/watch?v=zSncyxC7IpU (Feb. 4, 2018).

Extended European Search Report issued in corresponding European Application No. 21800409.1 dated Apr. 15, 2024.

Office Action for corresponding Taiwanese Application No. 112112522 dated Aug. 14, 2023, along with English Machine Translation.

* cited by examiner

40

20

50

60

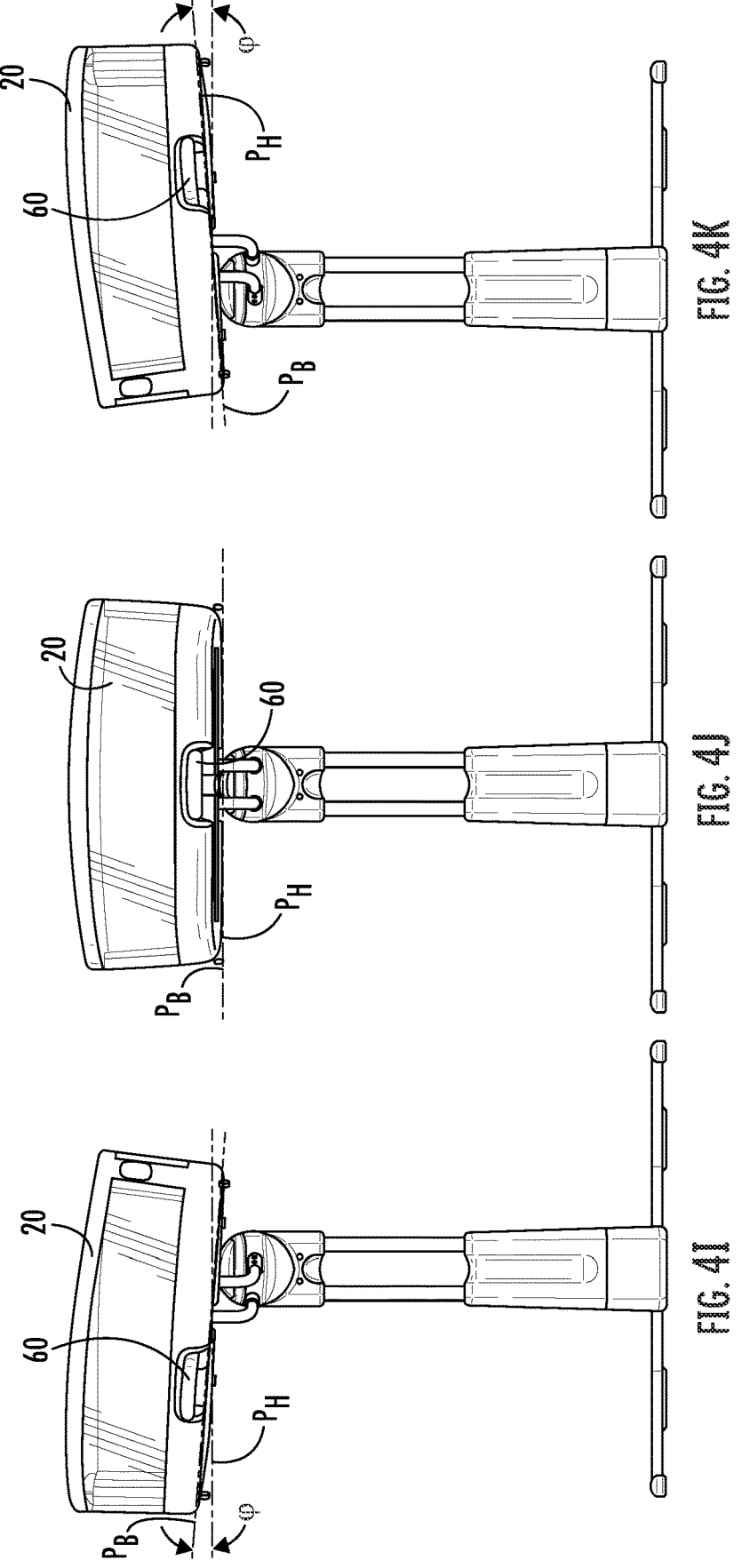

20

20

42a

42a'

42b'

42b

42b'

19B

41c 19C        19C

41b

41a

21

21

1

BEDSIDE BASSINET ASSEMBLY

CROSS-REFERENCE TO RELATED APPLICATIONS

This application is a National Stage 371 filing of International Application No. PCT/US2021/030432, filed May 3, 2021, which claims priority to U.S. Provisional Patent Application Nos.: 63/019,656, filed May 4, 2020; 63/070, 503, filed Aug. 26, 2020; 63/109,086, filed Nov. 3, 2020; 63/116,286, filed Nov. 20, 2020; and 63/137,496, filed Jan. 14, 2021, the disclosures of which are all hereby incorporated by reference as if set forth in its entirety herein.

TECHNICAL FIELD

The present disclosure generally relates to a bassinet assembly, and more particularly relates to specific features and aspects of a bassinet assembly, including a bedside bassinet assembly.

BACKGROUND

Bassinets generally include any type of enclosed structure that allows an infant to sleep or rest in close proximity to a caregiver. Bassinets essentially include some sort of support structure and an enclosure that typically includes some sort of soft support surface for the infant.

Some known bassinets include a stationary support member, which can generally include a vertical or upright frame. The support members are typically configured to hold the bassinet in a specific position and at a specific height. The bassinets are generally fixed to the stationary support members such that the bassinets intentionally cannot be easily moved or adjusted without moving the entire bassinet assembly. Other known bedside bassinets include anchoring elements, such as straps, to specifically immobilize and secure the bassinet relative to a support structure, such as an adjacent bedframe. Accordingly, these bassinets lack any ability to sway or otherwise move.

The effectiveness of bassinets in terms of encouraging infants to rest or sleep can be increased by imparting some sort of regular motion, such as a swaying motion, that sooths and comforts an infant to promote sleeping. Controlling a swaying mechanism of a bassinet should be uncomplicated so as to not disturb or otherwise disrupt a sleeping infant. It is also desirable to provide a sway mechanism that is intuitive and reliable.

It is further advantageous for a bassinet to be removable or detachable from a bassinet frame or support structure. Therefore, it is desirable to provide a bassinet assembly in which a caregiver can quickly and easily remove the bassinet from the support frame.

Providing varying degrees of adjustability is also important for bassinet assemblies. For example, providing the ability to adjust the height of the bassinet allows a caregiver to position the bassinet such that the infant is visible in varying situations and locations. This is also important in order to correctly position the bassinet next to a caregiver's bedside, particularly due to the varying heights of different mattresses and bed frames.

SUMMARY

The present disclosure generally provides a bassinet assembly including various features related to swaying, height adjustment, and the ability to remove the bassinet from a remainder of the bassinet assembly, among other features.

In one aspect, the present disclosure provides a swaying mechanism for a bassinet assembly that is configured to allow a bassinet to sway in a predetermined pattern in order to comfort an infant residing therein.

In another aspect, the present disclosure includes a bassinet that is removably attached to an underlying frame portion or support structure. This feature provides the ability for the caregiver to remove the bassinet from the main frame and transport it to other rooms or locations.

The bassinet assembly disclosed herein also includes a height adjustment assembly or mechanism. In one aspect, a main frame or support structure includes an easily accessible height adjustment actuator.

In one aspect, the bassinet assembly generally can be disassembled into at least two primary components, which limits or minimizes the size of the assembly for shipping purposes. Additionally, the bassinet assembly can be quickly and easily assembled with requiring any tools.

Additional embodiments are described below and in the claims.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIGS. 4F-4N illustrate perspective view of the bassinet assembly in various swaying positions.

DETAILED DESCRIPTION

Figure 1A:
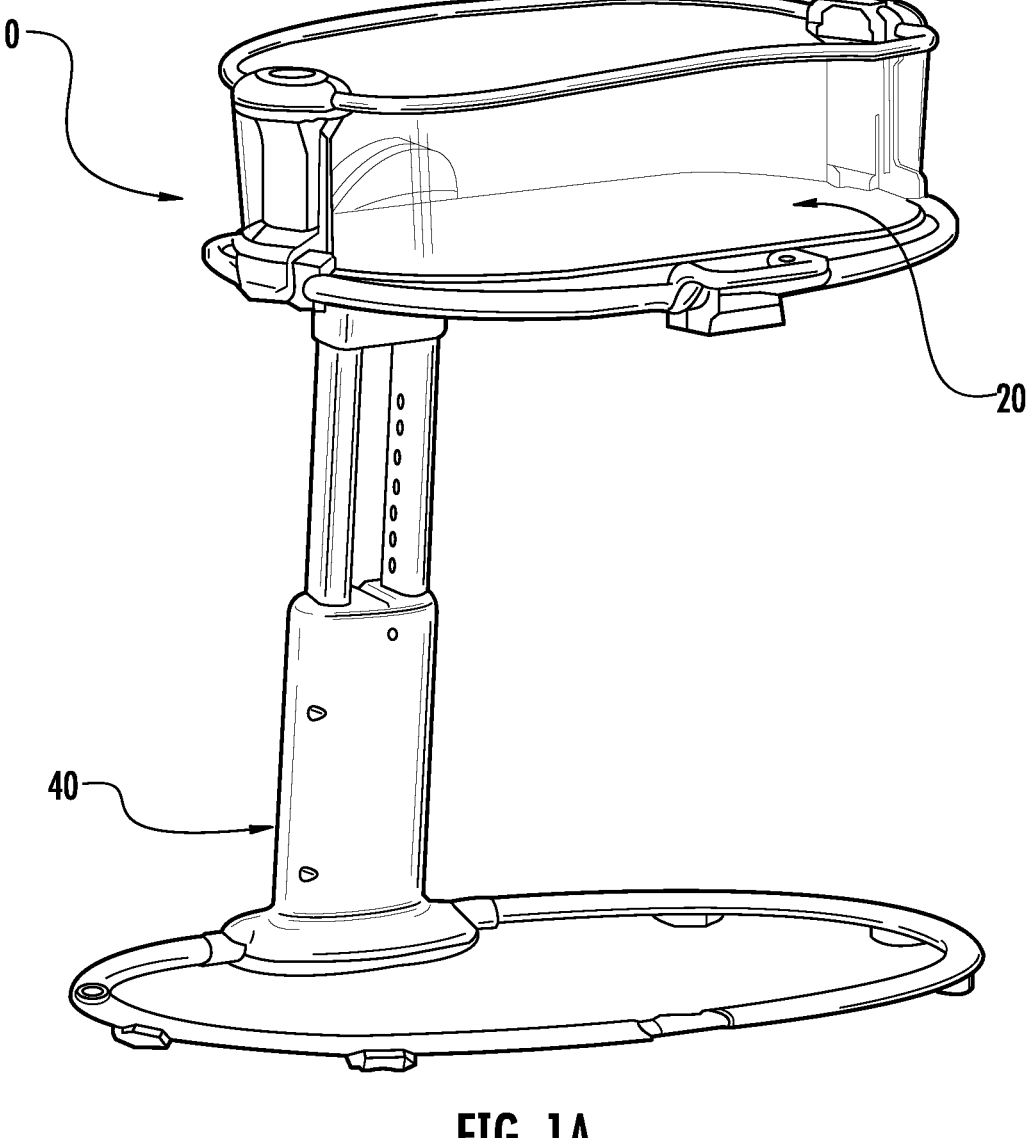
FIG. 1A is a perspective view of a bassinet assembly, including a bassinet and a frame, according to one aspect.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. This terminology includes the words specifically noted above, derivatives thereof and words of similar import.

Figure 1B:
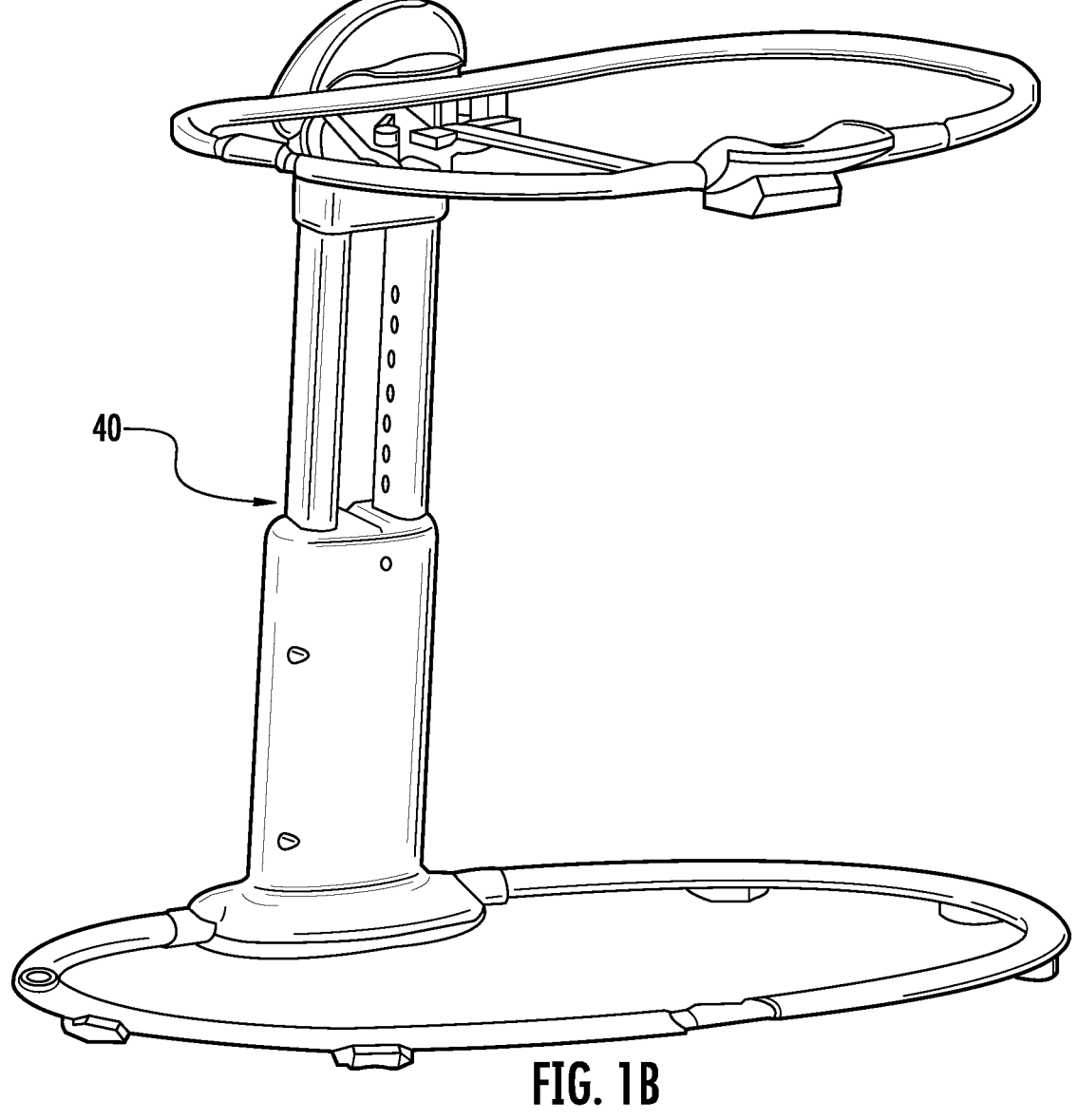
FIG. 1B is another perspective view of the frame of the bassinet assembly of FIG. 1A.
Figure 1C:
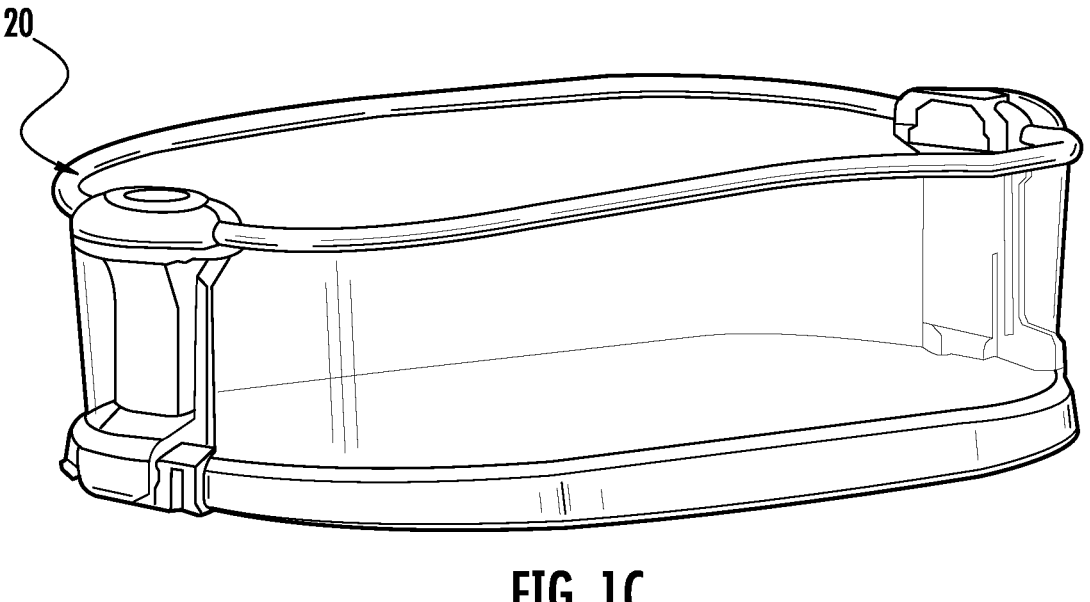
FIG. 1C is a perspective view of the bassinet of FIG. 1A removed from the frame.

A bassinet assembly 10 is generally shown in FIG. 1A. In one aspect, the bassinet assembly 10 has the ability to provide soothing swaying motion, as described in more detail herein. In another aspect, the bassinet assembly 10 provides the ability to completely remove a bassinet 20 from a frame 40 of the bassinet assembly 10. FIG. 1A illustrates the bassinet assembly 10 with the bassinet 20 and frame 40 in a fully assembled state. FIG. 1B illustrates the frame 40 for supporting the bassinet 20 with the bassinet 20 removed. FIG. 1C illustrates the bassinet 20 removed from the frame 40.

Figure 2B:
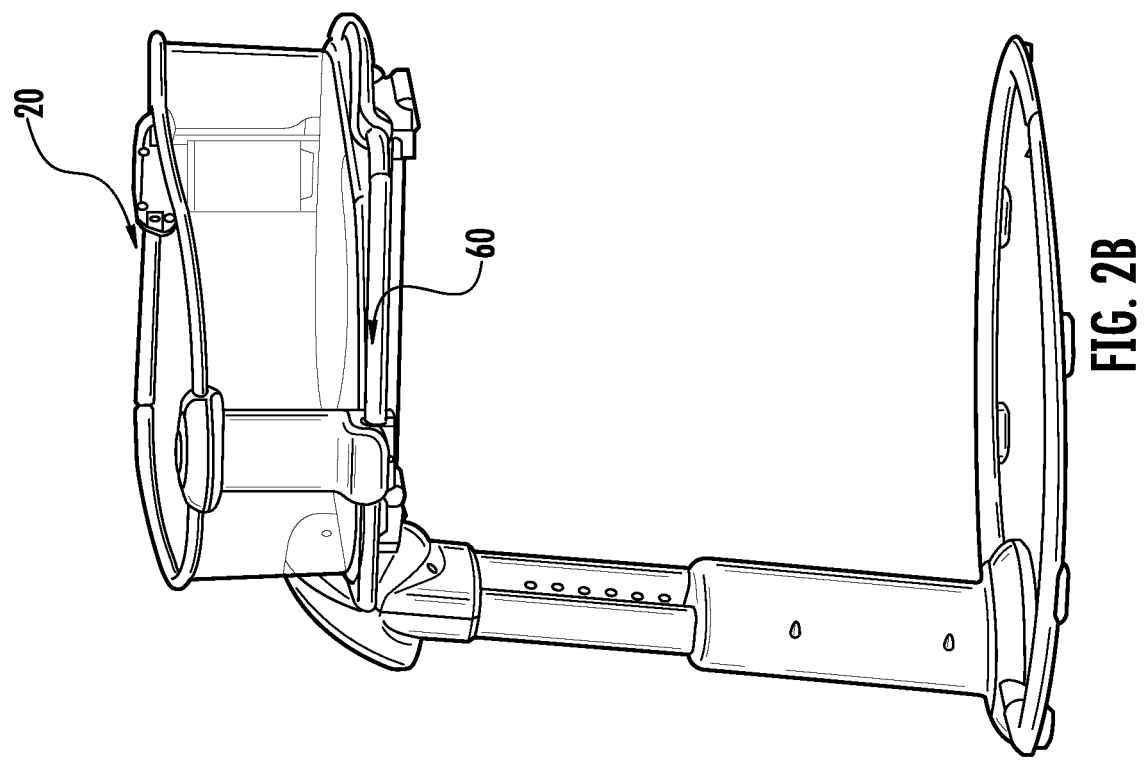
FIG. 2B illustrates the bassinet secured to the bassinet support.
Figure 2A:
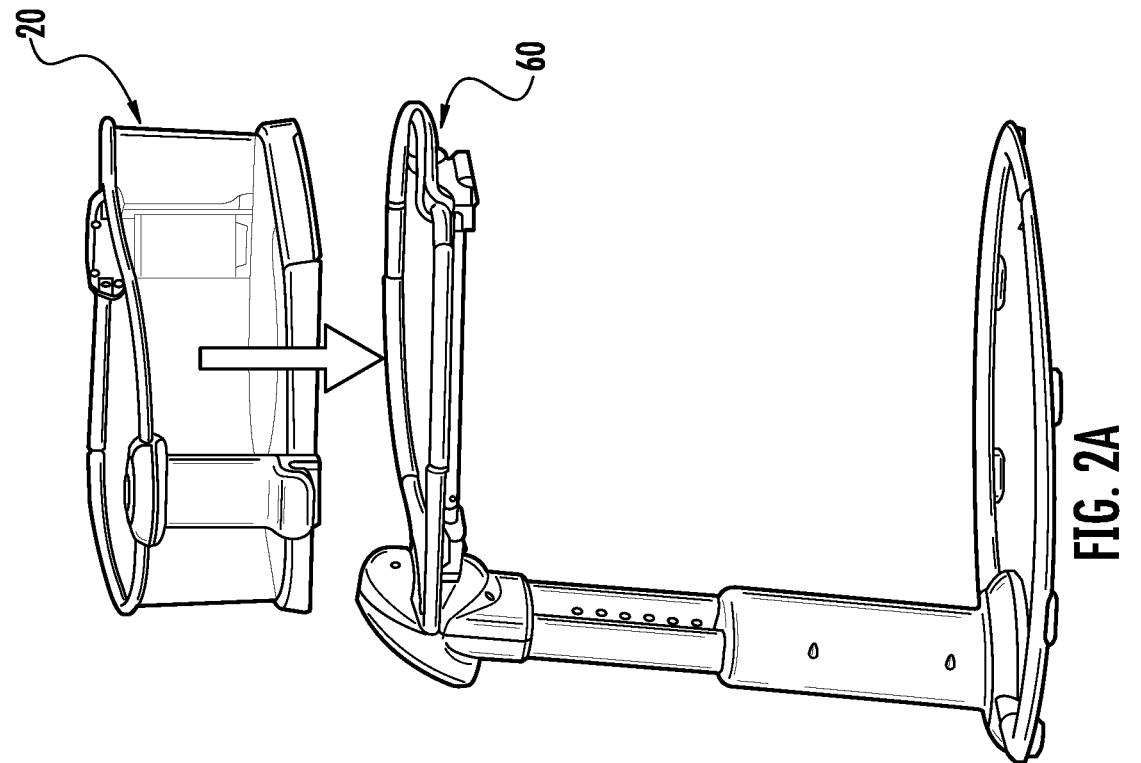
FIG. 2A illustrates the bassinet prior to attachment with a bassinet support of the frame of the bassinet assembly of FIG. 1A.

As shown in FIGS. 2A and 2B, the bassinet 20 is completely removable from the remainder of the bassinet assembly 10. This arrangement is provided via a bassinet support 60 that extends cantilevered from the frame 40, in one aspect. The bassinet support 60 can extend at an angle in an upwardly tilted direction from the frame 40 in an unloaded state in which the bassinet 20 is detached.

One of skill in the art would understand that the bassinet support 60 can be formed as a frame, an arm, or any other type of support structure that is configured to hold the bassinet 20. In one aspect, the bassinet support 60 is formed as a support structure that has a dovetail connection to the frame 40.

Figure 2C:
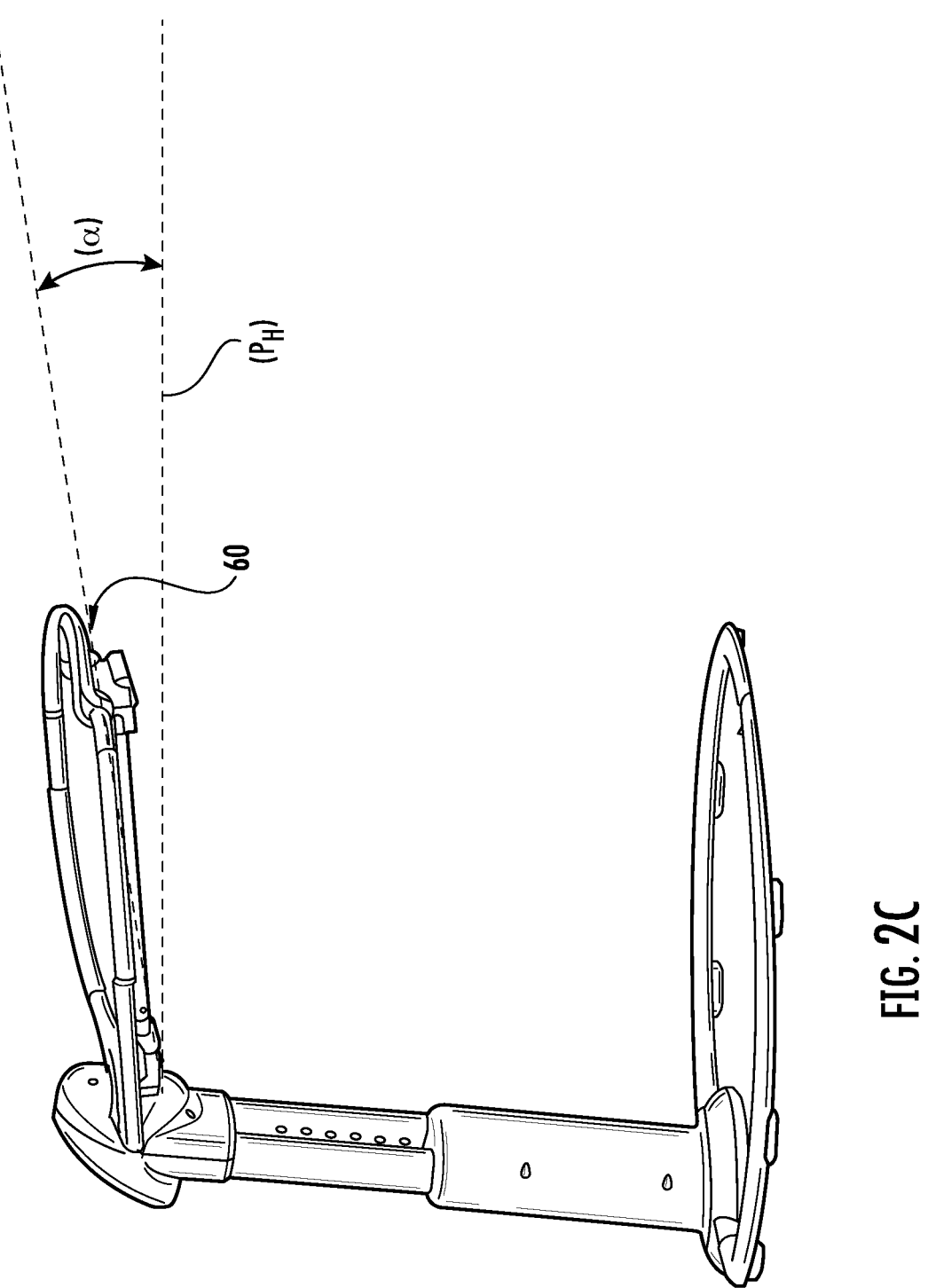
FIG. 2C illustrates the bassinet secured to the bassinet support in an unloaded state.

As shown in more detail in FIG. 2C, the bassinet support 60 can be angled upward by an angle ($\alpha$) of relative to a horizonal plane ($P_H$) at its terminal region relative to the frame 40 when the bassinet support 60 is in an unloaded state, i.e. when there is no infant in the bassinet. In one aspect, this angle ($\alpha$) is 0 degrees to 3 degrees, and preferably 2.5 degrees. In one aspect, the angle ($\alpha$) is selected such that the angle ($\alpha$) is between 0 degrees to 2.5 degrees, and preferably 1.5 degrees, when the bassinet 20 is installed, with no infant in the bassinet 20, and when the bassinet assembly 10 is in a lowest height position. This arrangement essentially accounts for deflection of the bassinet support 60 due to its cantilevered arrangement, while still providing a positive angle for the sleep surface in the bassinet 20. In one example, the bassinet support 60 is configured to deflect roughly 1.5 degrees when a twenty-pound load is positioned into the bassinet 20. In one aspect, the angle ($\alpha$) is essentially 0 degrees when fully loaded. A negative angle (i.e. sagging downward) is essentially avoided based on the angle ($\alpha$) of the bassinet support 60 being pre-set to a specific angle prior to the bassinet 20 being loaded.

Once loaded with the bassinet 20, the bassinet support 60 will naturally dip, sink, or otherwise drop slightly. In addition, once an infant is placed in the bassinet 20 attached to the bassinet support 60, the bassinet support 60 will further dip, sink, or otherwise drop. In an embodiment, when an infant is placed in the bassinet 20 attached to the bassinet support 60, the bassinet support 60 is at an angle relative to the frame 20 such that a bottom plane of the bassinet 20 and a bottom plane of the bassinet support 60 is substantially parallel to a horizontal plane ($P_H$). One skilled in the art will recognize that the bottom plane of the bassinet 20 being substantially parallel to the horizontal plane ($P_H$) includes slight variations of an angle of the bottom plane of the bassinet 20, such as less than 5 degrees, more preferably, less than 3 degrees, and even more preferably, less than 1 degree, relative to the horizontal plane.

A securing interface is provided between the bassinet 20 and the bassinet support 60. The securing interface is generally described in more detail with respect to at least FIGS. 12A-13E. The bassinet 20 is configured to be removably secured and supported by the bassinet support 60, and the bassinet 20 is completely free-standing once removed, as shown in FIG. 1C. Therefore, the bassinet 20 can be used as an infant sleeping area in locations away from the frame 40. As shown in FIGS. 2A and 2B, the bassinet support 60 can generally include an oval tubular frame that generally has a profile matching a bottom perimeter of the bassinet 20. One skilled in the art would understand that the exact shape and configuration of the bassinet support 60 can vary.

Figure 3A:
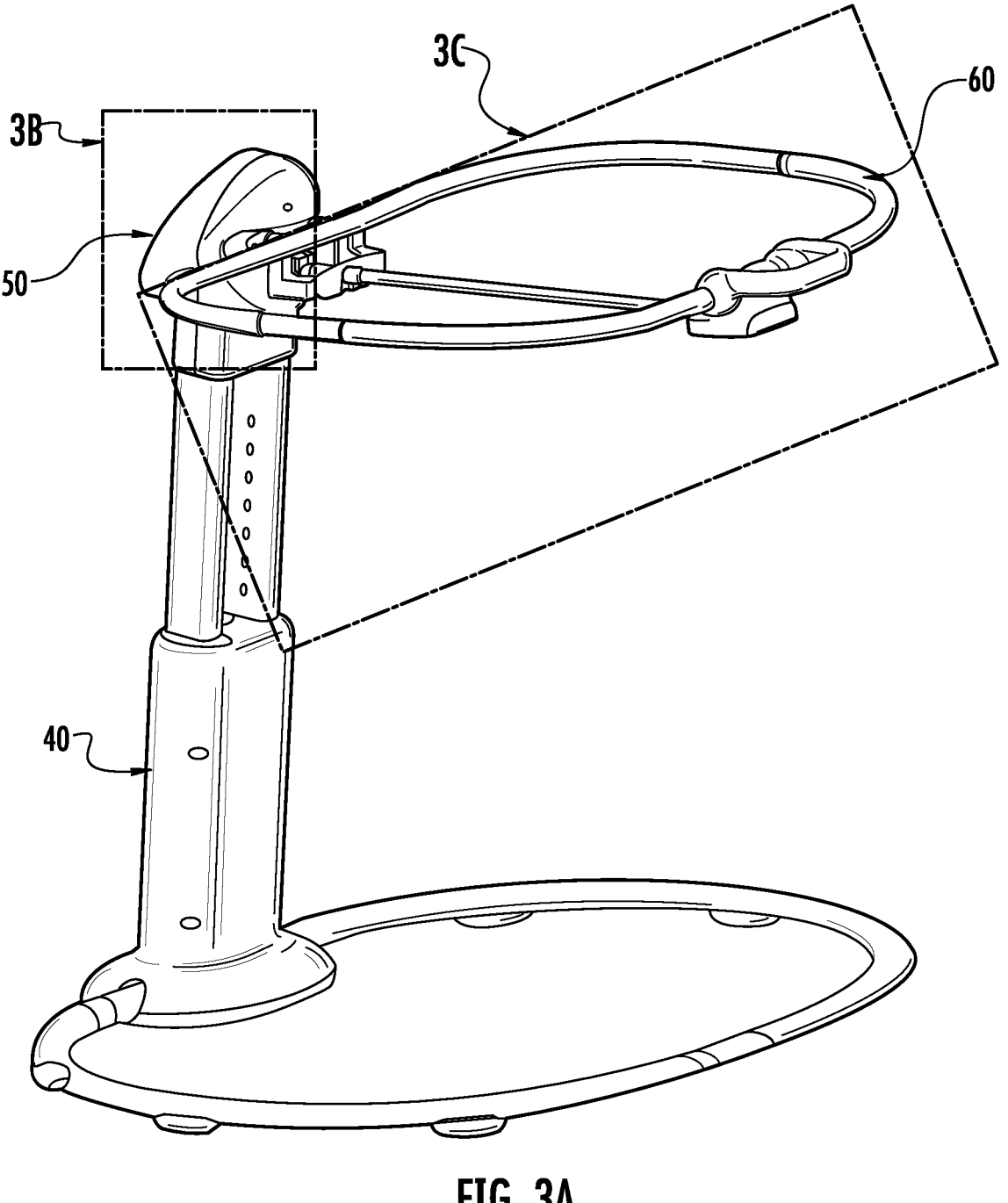
FIG. 3A illustrates additional features of the frame of the bassinet assembly of FIG. 1A.
Figure 3B:
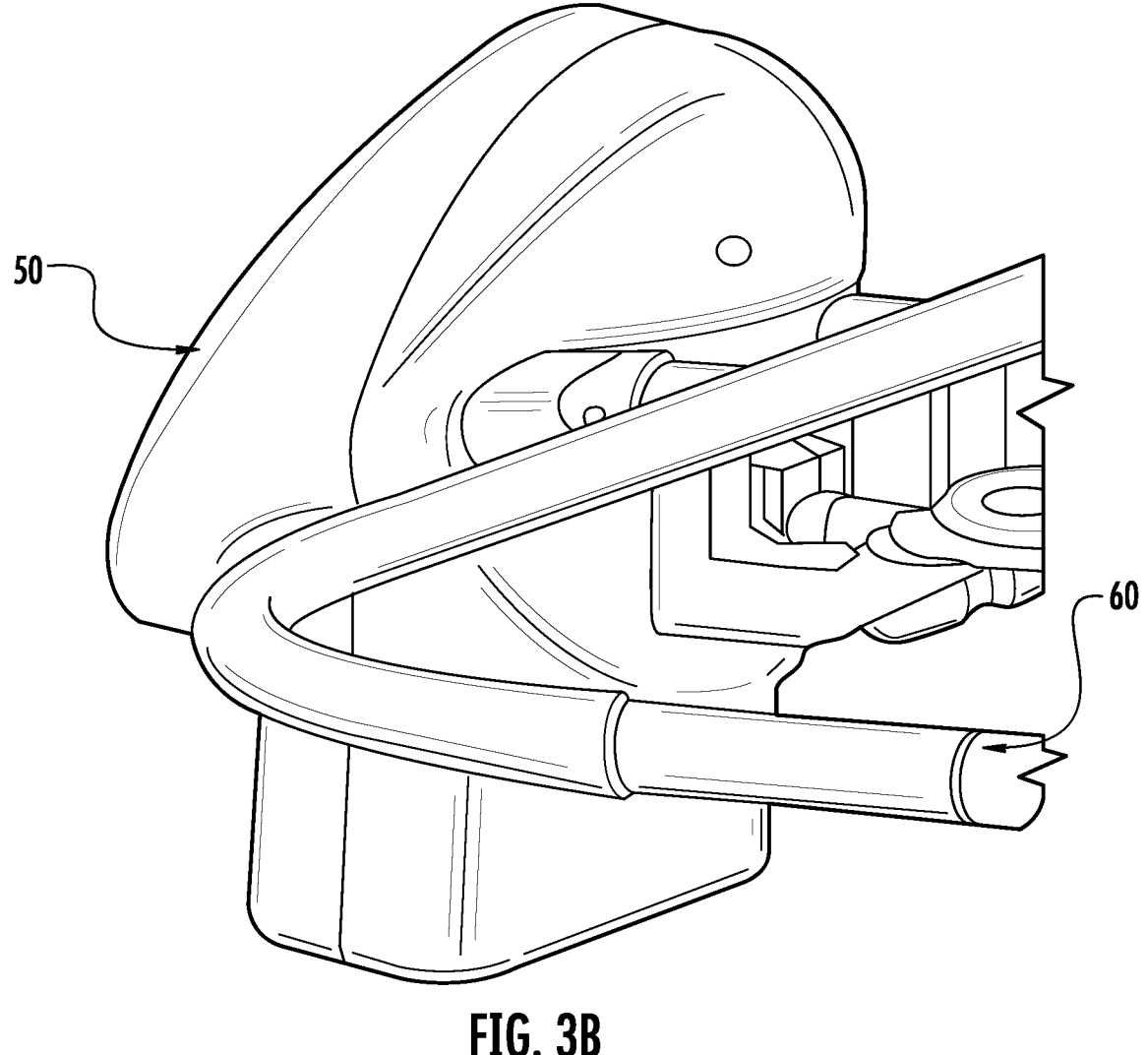
FIG. 3B illustrates a magnified portion of region "3B" from FIG. 3A.
Figure 3C:
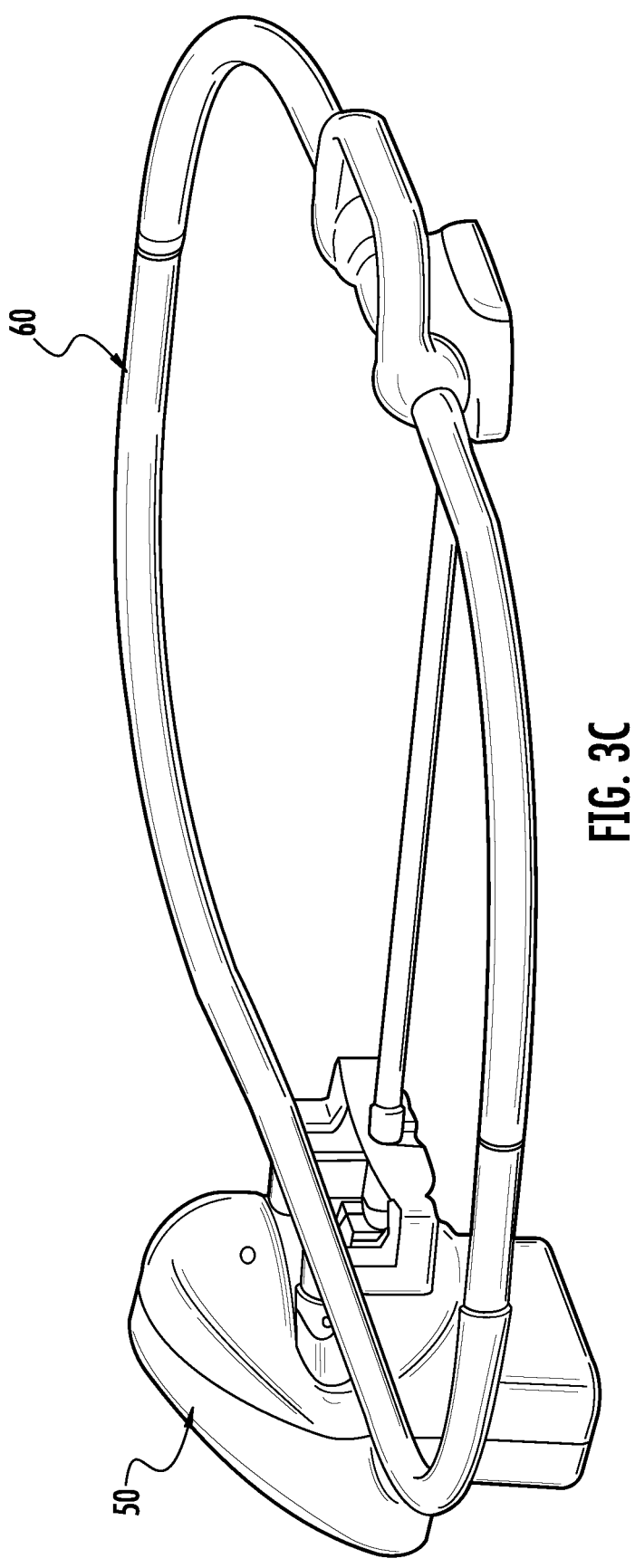
FIG. 3C illustrates a magnified portion of region "3C" from FIG. 3A.

FIG. 3A illustrates another view of the frame 40 and is provided to illustrate further details of a sway mechanism 50. Within FIG. 3A, there is a region 3B which is magnified in FIG. 3B to show a view of the sway mechanism 50, and a region 3C which is magnified in FIG. 3C to show the sway mechanism 50 engagement with the bassinet support 60

Figure 4A:
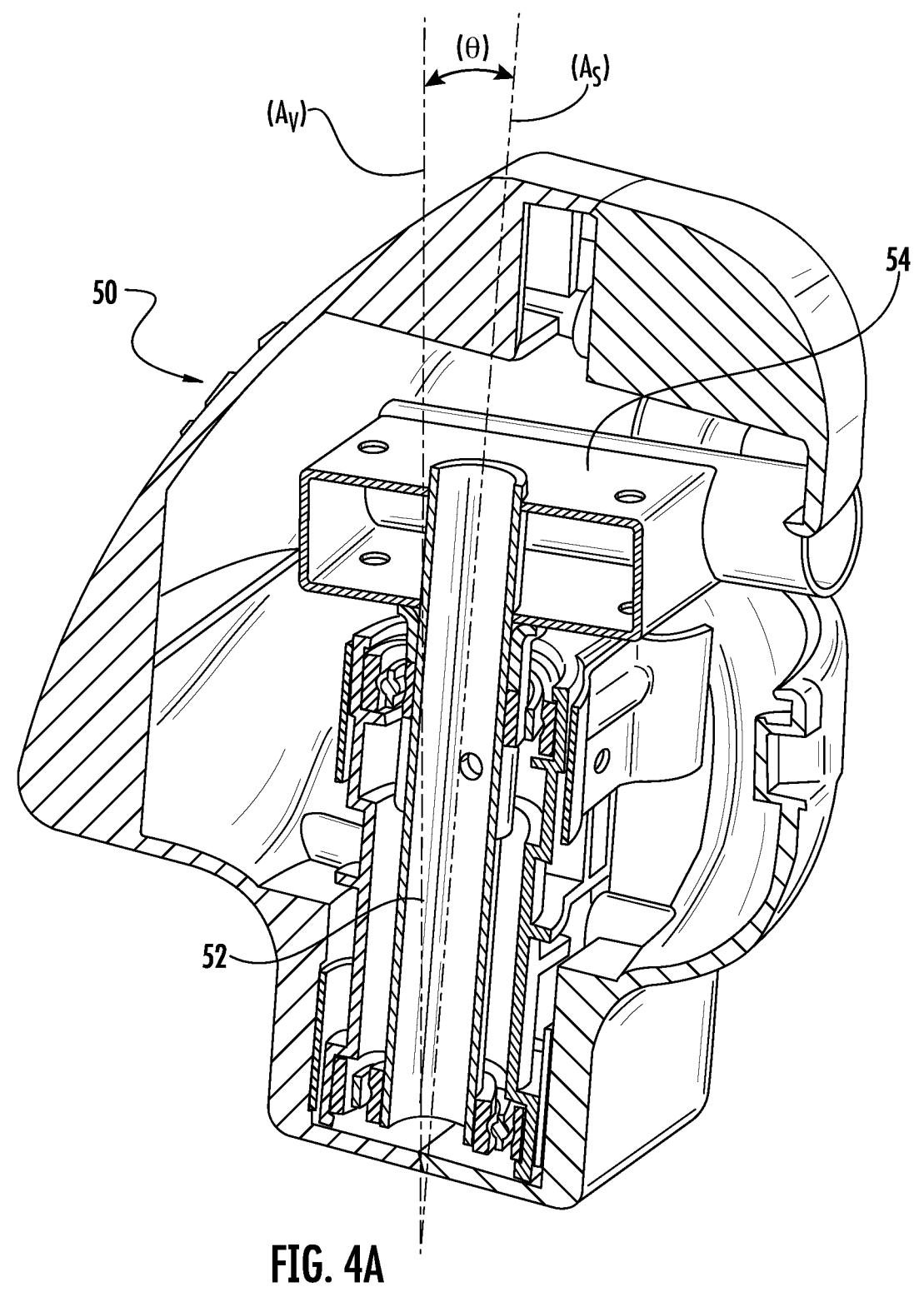
FIG. 4A is a partial cross-sectional view of a sway mechanism for the bassinet assembly.

FIG. 4A illustrates a cross-sectional view of the sway mechanism 50. As shown in FIG. 4A, the sway mechanism 50 includes a pivot shaft 52 and an attachment component 54. The pivot shaft 52 is connected to the attachment component 54. The attachment component 54 can be attached to the pivot shaft 52 via a friction fit by an opening formed in the attachment component 54 which is configured to engage around the pivot shaft 52. One skilled in the art would understand that other connection methods can be used to join the pivot shaft 52 and the attachment component 54, or these components can be integrally formed with each other.

Figures 4B, 4C:
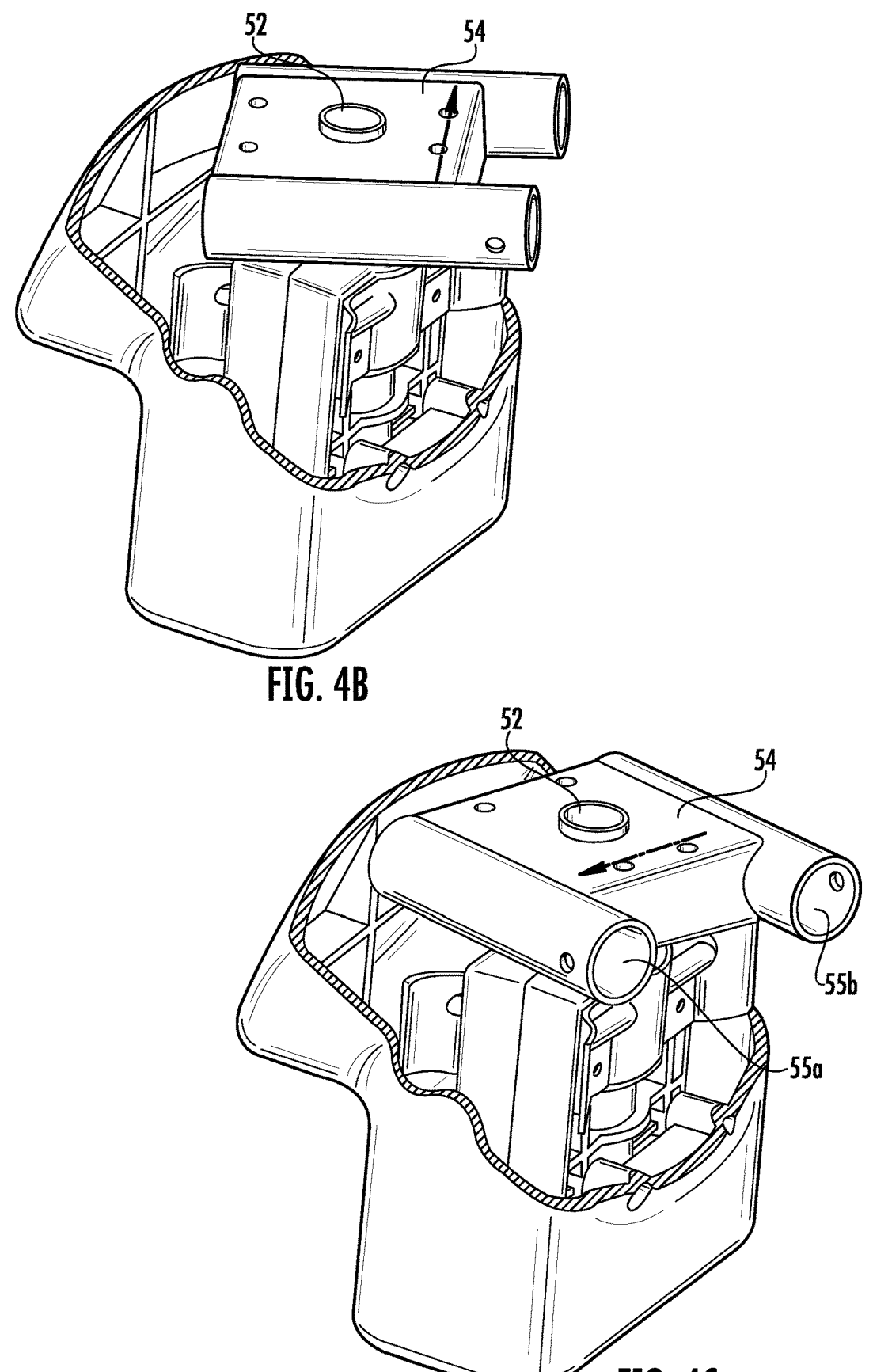
FIG. 4B is a partial cross-sectional view of the sway mechanism of FIG. 4A in a first position.
FIG. 4C is a partial cross-sectional view of the sway mechanism of FIG. 4A in a second position.

The attachment component 54 provides a connection or interface between the pivot shaft 52 and the bassinet support 60. The pivot shaft 52 is configured to rotate such that the attachment component 54 sways or rotates, as shown in FIGS. 4B and 4C. The motion illustrated in FIGS. 4B and 4C shows the swaying motion for the bassinet support 60. In one aspect, the pivot shaft 52 is freely rotatable. The pivot shaft 52 is configured to be rotated about its axis ($A_S$) and provide a pivoting motion to the attached bassinet support 60. Additional details regarding the pivot shaft 52 and its ability to rotate or impart pivoting motion are provided herein.

Figures 4D, 4E:
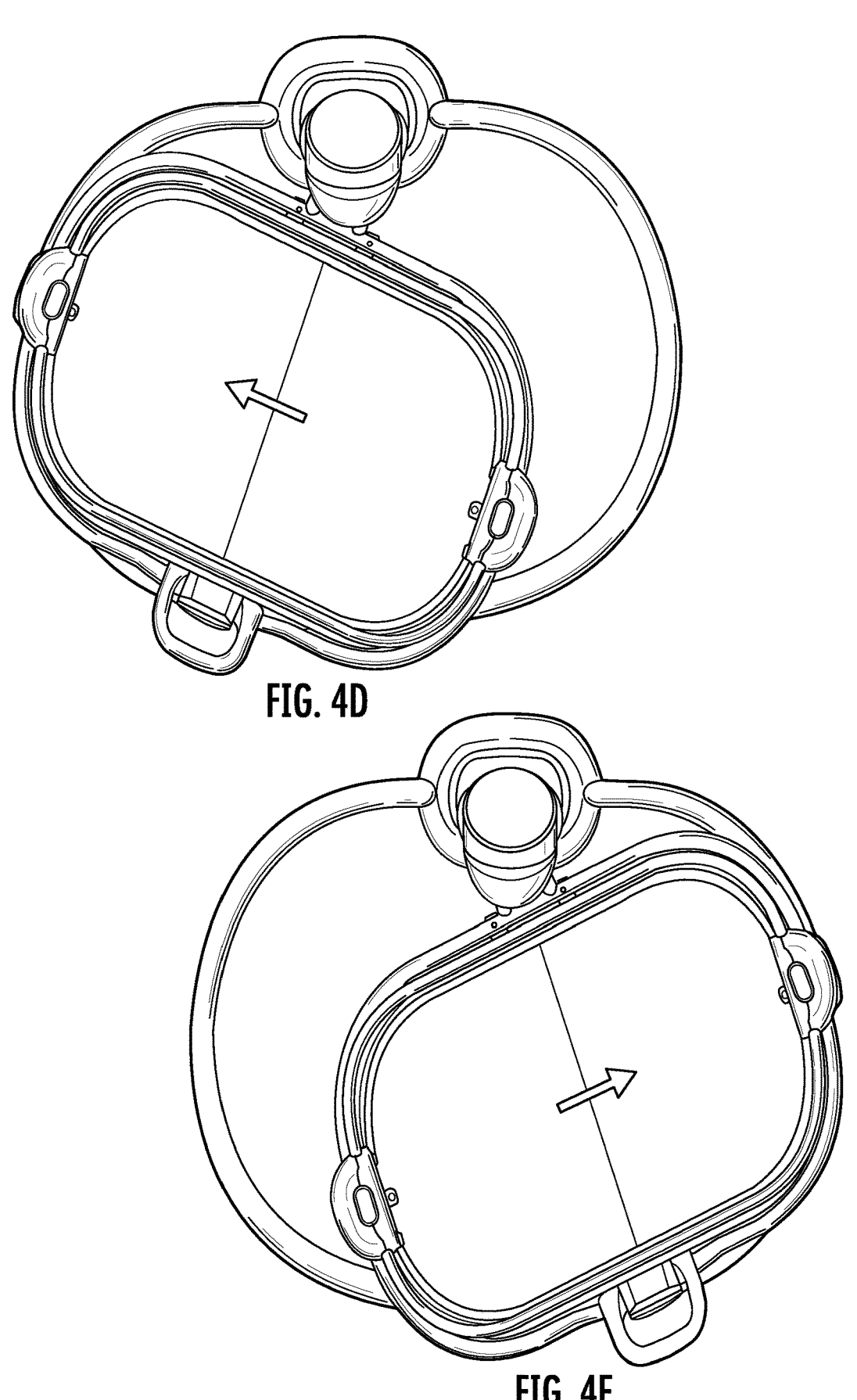
FIG. 4D is a top view of the bassinet assembly in a position corresponding to FIG. 4C.
FIG. 4E is a top view of the bassinet assembly in a position corresponding to FIG. 4B.
Figure 4H:
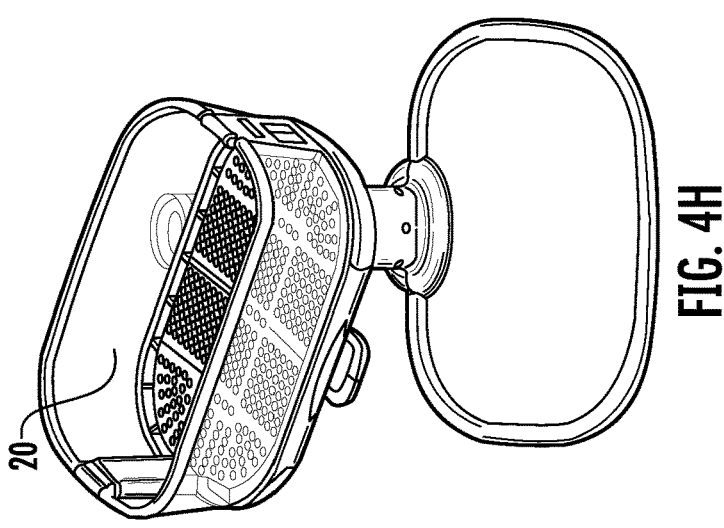
Figure 4G:
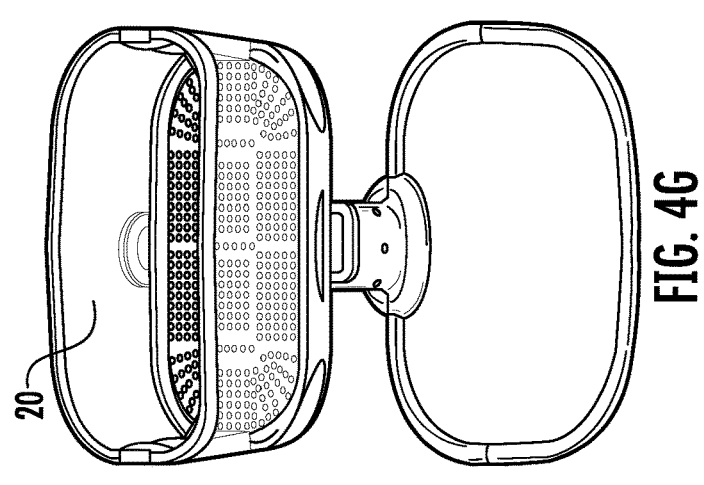
Figure 4F:
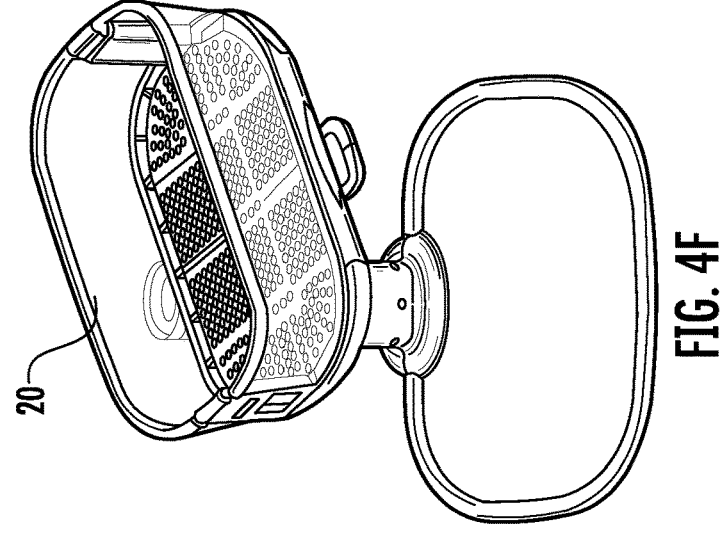

The attachment component 54 includes at least one receptacle 55a, 55b dimensioned to receive a portion of the bassinet support 60. In one aspect, the attachment component 54 includes two receptacles 55a, 55b each dimensioned to receive a portion of the bassinet support 60. As shown in FIGS. 4B and 4C, the two receptacles 55a, 55b are arranged on opposite sides of the pivot shaft 52, which can provide even loading for the swaying mechanism. FIGS. 4D and 4E illustrate top views of the bassinet assembly to show the sway motion associated with FIGS. 4B and 4C. FIGS. 4F-4H further illustrate the bassinet 20 in various swaying positions In one aspect, the pivot shaft 52 is arranged in a non-vertical position. This arrangement results in the rotational motion of the pivot shaft 52 providing swaying to the bassinet 20 motion that mimics a natural pendulum.

As shown in FIG. 4A, an axis ($A_S$) of the pivot shaft 52 can be arranged at an angle ($\theta$) of 3 degrees to 10 degrees relative to a vertical axis ($A_V$) extending perpendicular from a ground surface or support surface. In a preferred aspect, the pivot shaft 52 is titled or arranged 5-8 degrees relative to the vertical axis ($A_V$). In a more preferred aspect, the pivot shaft 52 is titled or arranged 7 degrees relative to the vertical axis ($A_V$). Based on this angle ($\theta$), the bassinet 20 experiences a swaying, scooping, pendulum-like motion when pushed. The angle ($\theta$) of the pivot shaft 52 is selected such that the bassinet 20 sways within a swaying arc, which is shown in more details in FIGS. 4I-4N.

Figures 4M, 4N, 4O:
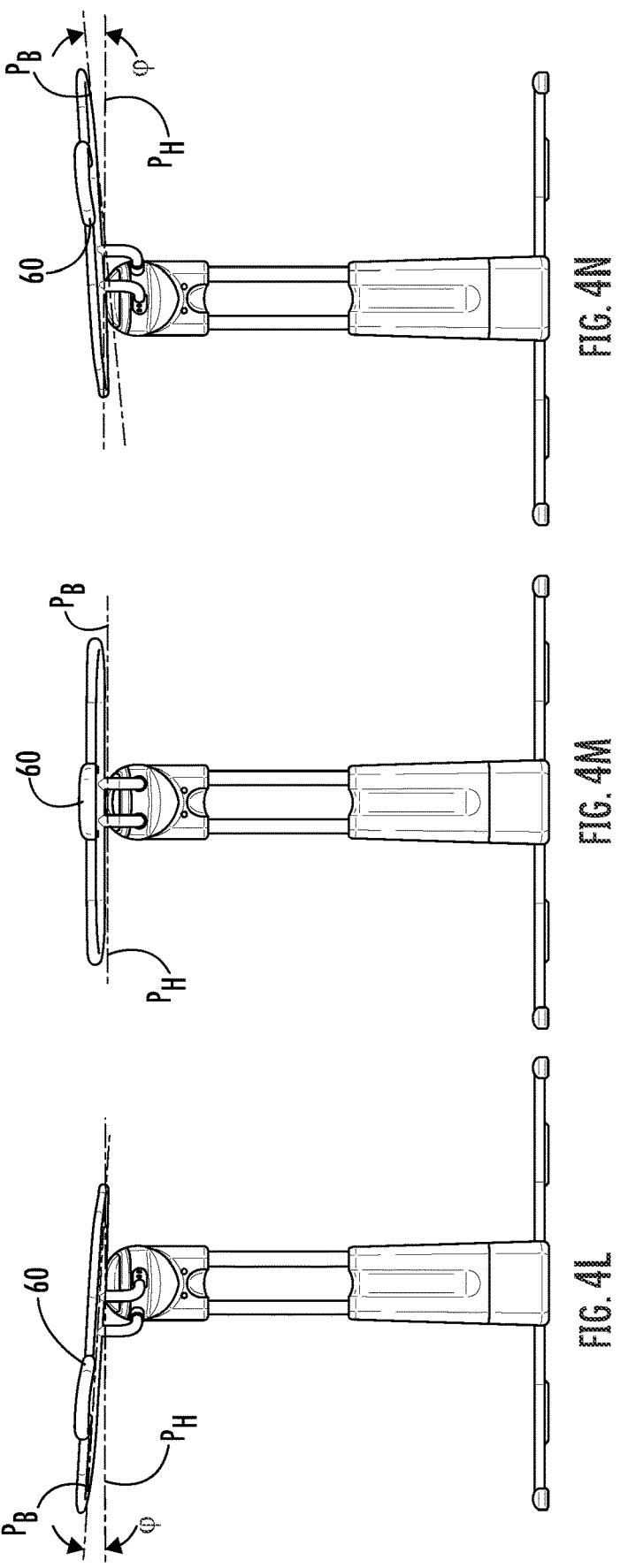

FIGS. 4I-4N illustrate further details of the swaying arc of the bassinet support 60 and the bassinet 20. FIGS. 4I-4K illustrate the bassinet support 60 loaded with the bassinet 20. FIGS. 4L-4N illustrate the bassinet support 60 in a loaded state. As shown in FIG. 4I, which corresponds to a leftmost extreme swinging position of the bassinet support 60, and FIG. 4K, which corresponds to a rightmost extreme swinging position of the bassinet support 60, a bottom plane ($P_B$) defined on a bottom surface of the bassinet support 60 and the bassinet 20 is angled relative to the horizontal plane ($P_H$) by an angle ($\varphi$). As shown in FIG. 4J, the bottom plane ($P_B$) and the horizontal plane ($P_H$) are parallel or coincident with each other.

The same angle ($\varphi$) is provided in FIG. 4L, which corresponds to FIG. 4I without the bassinet 20, FIG. 4M, which corresponds to FIG. 4J without the bassinet 20, and FIG. 4N, which corresponds to FIG. 4K without the bassinet 20.

The angle ($\varphi$) of the bottom plane ($P_B$) in the extreme swaying positions (i.e. right most and left most swaying positions) is arranged within 5 degrees of a horizontal plane ($P_H$) that is parallel to the ground or support surface. In one aspect, the bottom plane ($P_B$) is preferably maintained within 1 degree to 3 degrees relative to the horizontal plane ($P_H$).

The sway mechanism 50 and pivot shaft 52 can include, but do not require, a driving mechanism, such as a motor or at least one spring, to provide the swaying motion to the bassinet 20.

The bassinet assembly 10 can be a non-motorized assembly, i.e. it does not require an external power source. Gravity and momentum are utilized to provide swaying motion after an initial impulse or push is applied to the bassinet 20 by a user or caregiver. Assuming an infant weight of six pounds to twenty pounds, a single gentle push to the bassinet 20 can provide at least two to three minutes of swaying motion.

In another embodiment, the pivot shaft 52 can be arranged entirely vertical, and other mechanical components can be provided to assist the sway motion, such as a driving mechanism. In one aspect, at least one of a magnetic drive system, a DC motor assembly, a gearbox assembly, and or any one or more combinations thereof can be used to drive the pivot shaft 52. In one aspect, at least one of compression or torsion springs can be used to drive the pivot shaft 52. One of skill in the art would understand that in another configuration, the pivot shaft 52 can be stationary, and other components can be provided that are configured to rotate about the axis of the pivot shaft 52. For example, the pivot shaft 52 can be stationary while the attachment component 54 rotates about it.

Figure 5A:
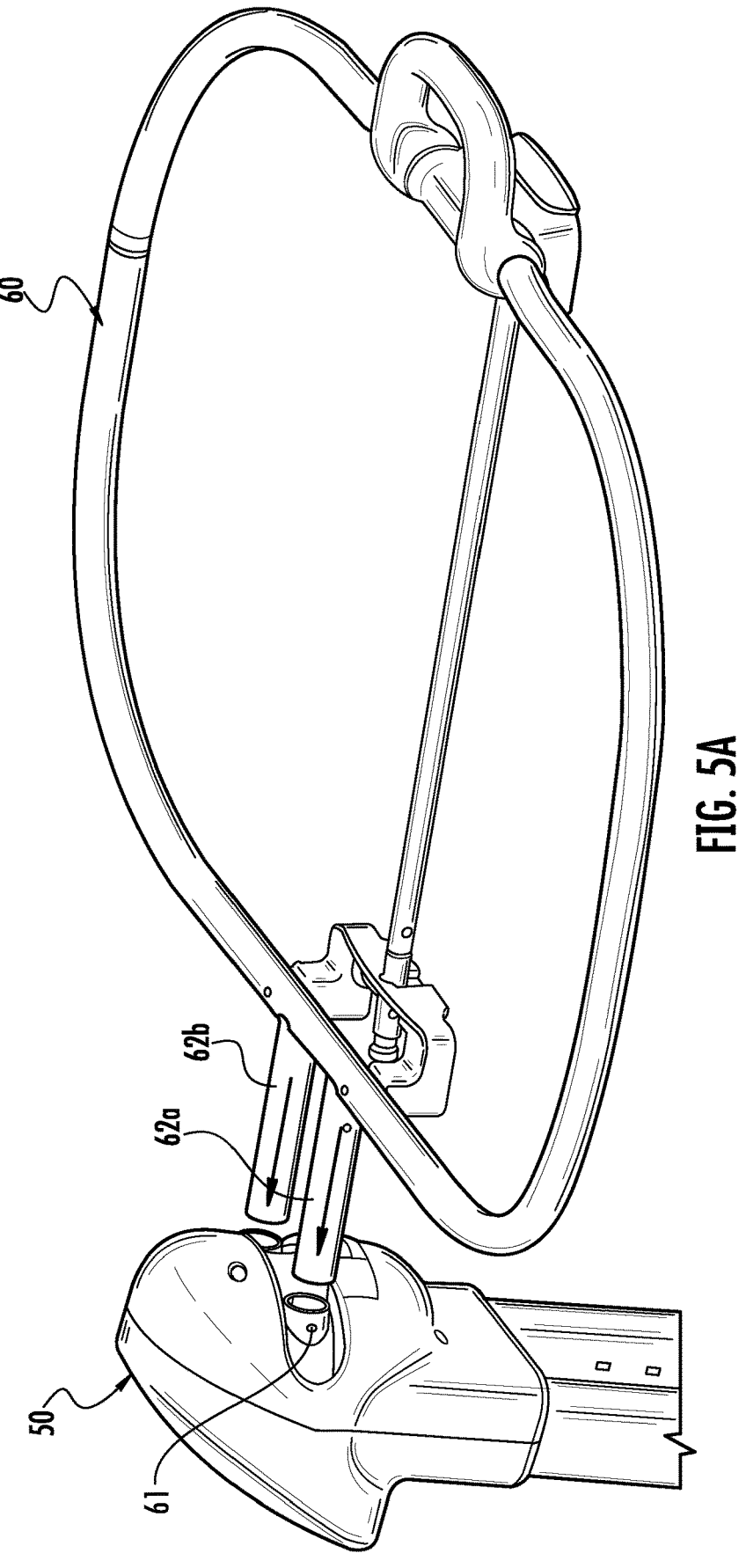
FIG. 5A is a perspective view illustrating the bassinet support of the bassinet assembly of FIGS. 1A-1B prior to insertion with the sway mechanism.
Figure 5B:
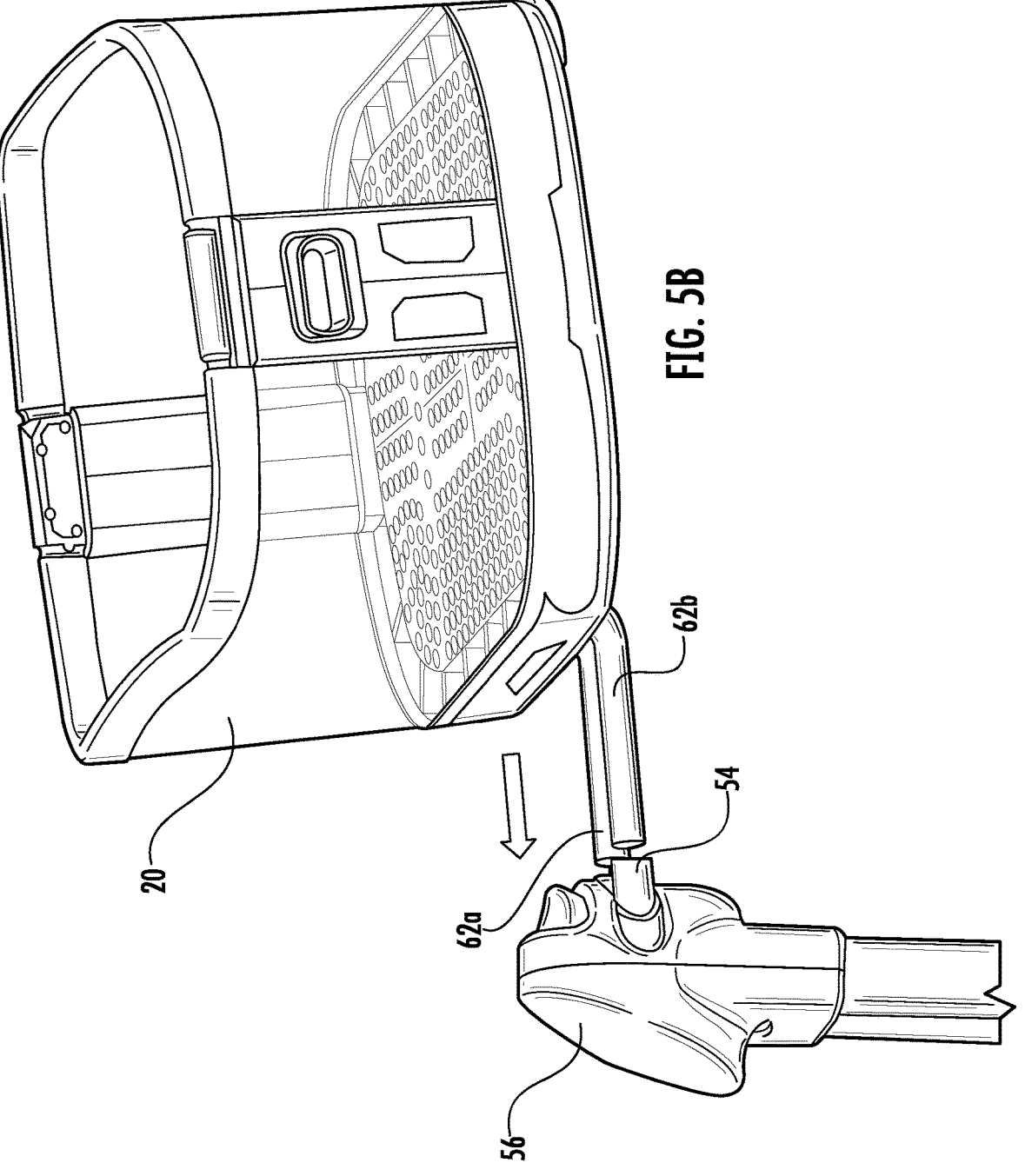
FIG. 5B is a side view of the sway mechanism and the bassinet prior to insertion with the sway mechanism.

As shown in FIG. 5A, the bassinet support 60 includes a sway attachment portion 62a, 62b. The sway attachment portion 62a, 62b can include at least one extension, such as a tube or rod, that engages within the at least one receptacle 55a, 55b. In one aspect, a spring locking assembly 61 can be provided between the sway attachment portion 62a, 62b and the receptacles 55a, 55b. As shown in FIG. 5A, the sway attachment portion 62a, 62b includes two cantilevered rods or tubes. The connection between the sway attachment portion 62a, 62b and the receptacles 55a, 55b can be achieved via any number of fastening arrangements, such as a friction fit or locking pins or elements. One skilled in the art would understand that the sway mechanism 50 could include an extension and the bassinet support 60 could include a receptacle configured to receive the extension in another configuration. FIG. 5B illustrates another interface between the sway attachment portion 62a, 62b and housing 56. The housing 56 generally defines a connection or interface between the bassinet support 60 and the frame 40.

Figure 6A:
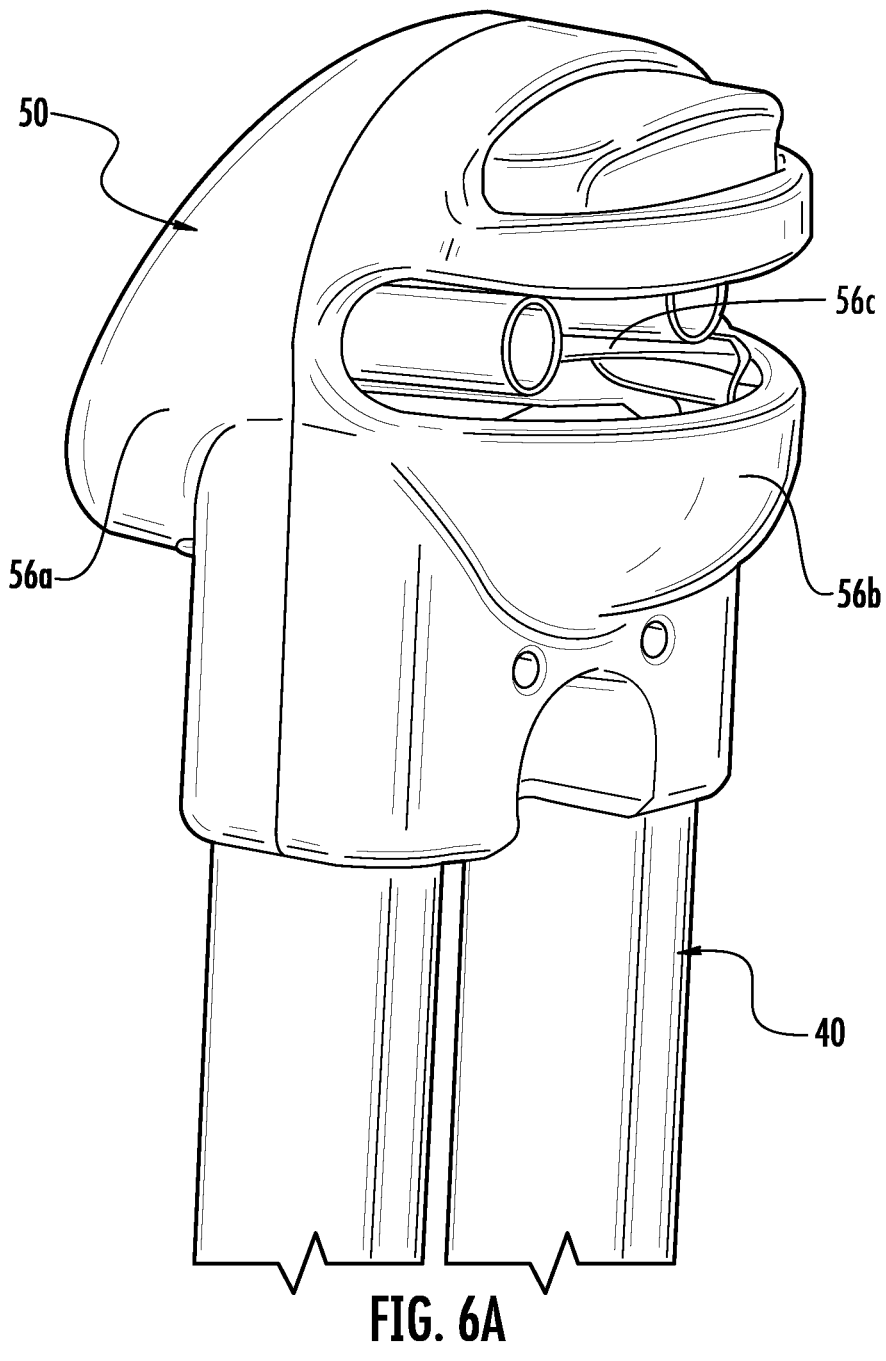
FIG. 6A is a perspective view of a sway mechanism according to another aspect.
Figure 6B:
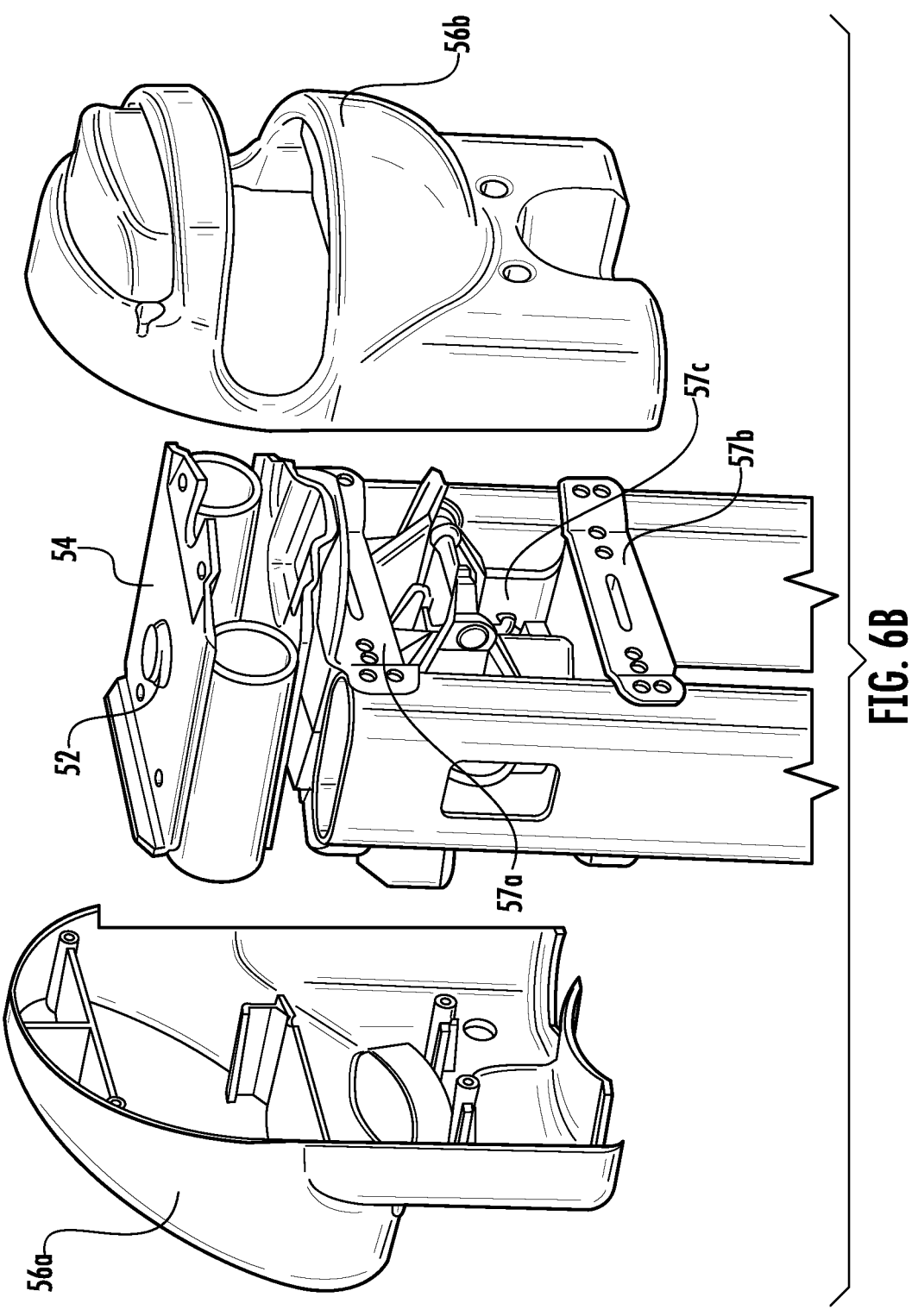
FIG. 6B is an exploded perspective view of the sway mechanism of FIG. 6A.
Figure 6C:
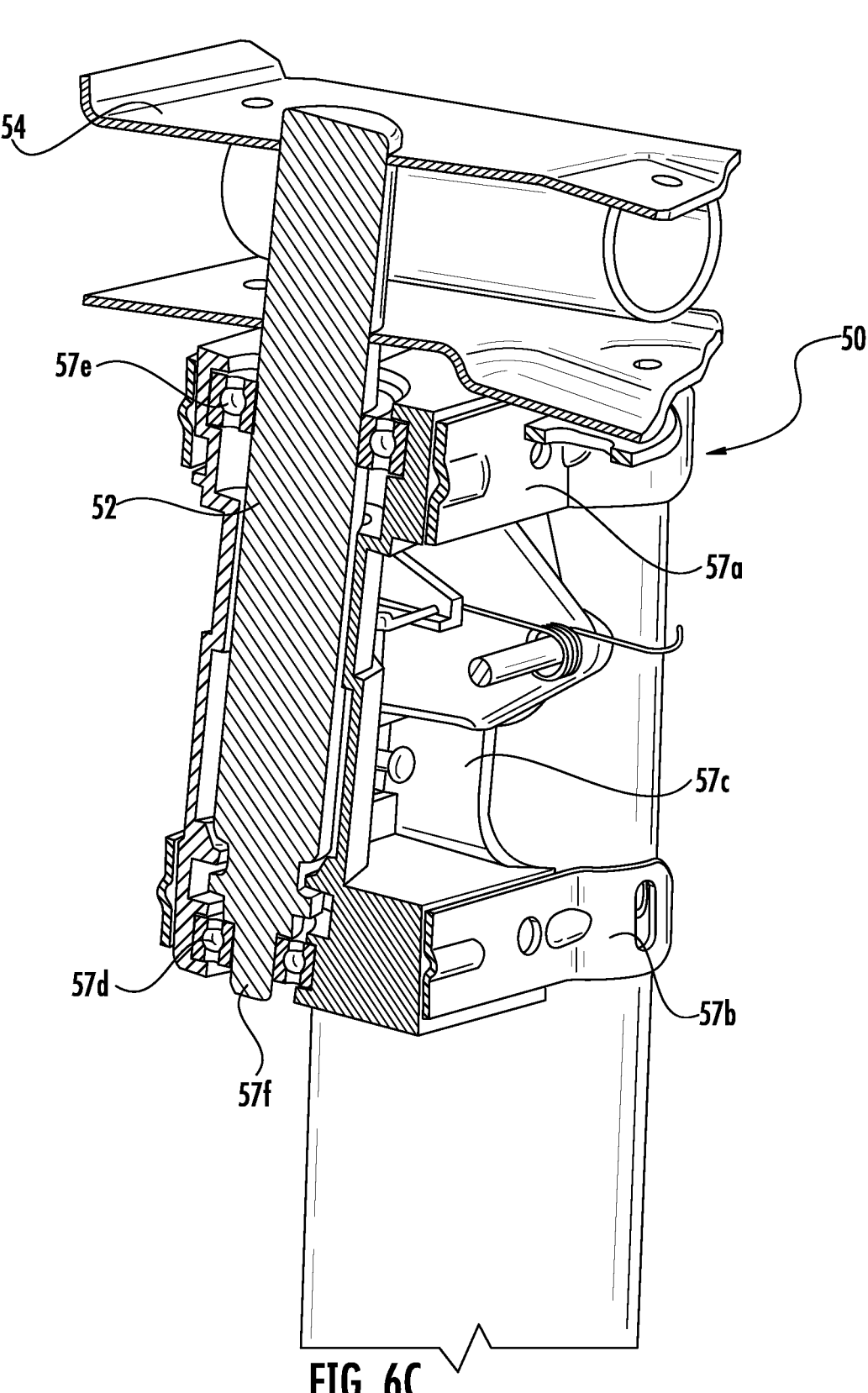
FIG. 6C is a partial cross-sectional view of the sway mechanism of FIGS. 6A and 6B.

FIGS. 6A-6C illustrate additional aspects of the sway mechanism 50. As shown in FIG. 6A, the sway mechanism 50 can be formed in the housing 56 that engages with a top portion of the frame 40. In one aspect, as shown in FIG. 6B, the housing 56a, 56b can include two housing halves, i.e. a front housing and a back housing. In addition, an opening 56c can be defined by the housing 56b. Additional details of the sway mechanism 50 are shown in FIG. 6C.

The sway mechanism 50 includes a pivot shaft support 57a, 57b, 57c that can include multiple components, such as brackets or support housing elements. In one aspect, the pivot shaft support 57a, 57b, 57c can include a pair of brackets 57a, 57b attached to the frame 40 and a main housing support 57c. A pair of bearings 57d, 57e can be arranged within the main housing support 57c at opposite ends of the pivot shaft 52. Based on these bearings 57d, 57e, as well as the other support components, the pivot shaft 52 is freely rotatable within the frame 40. As used with respect to the pivot shaft 52, the term freely rotatable means that the pivot shaft 52 can rotate or impart pivoting motion in an unimpeded manner, particularly when something connected or attached to the pivot shaft 52 (i.e. the bassinet support 60 and bassinet 20) is pushed. Any force, motion, or push applied to the bassinet support 60 and bassinet 20 is translated to the pivot shaft 52 via the attachment component 54. Because the pivot shaft 52 is freely rotatable, the bassinet support 60 and the bassinet 20 will continue to sway for a period of time after being pushed. In another aspect, the term freely rotatable as used with respect to the pivot shaft 52 means that the pivot shaft 52 can freely rotate for a predetermined extent. For example, rotational stops or end stops can be provided for the pivot shaft 52 that limit the rotational or pivoting motion.

Figure 6D:
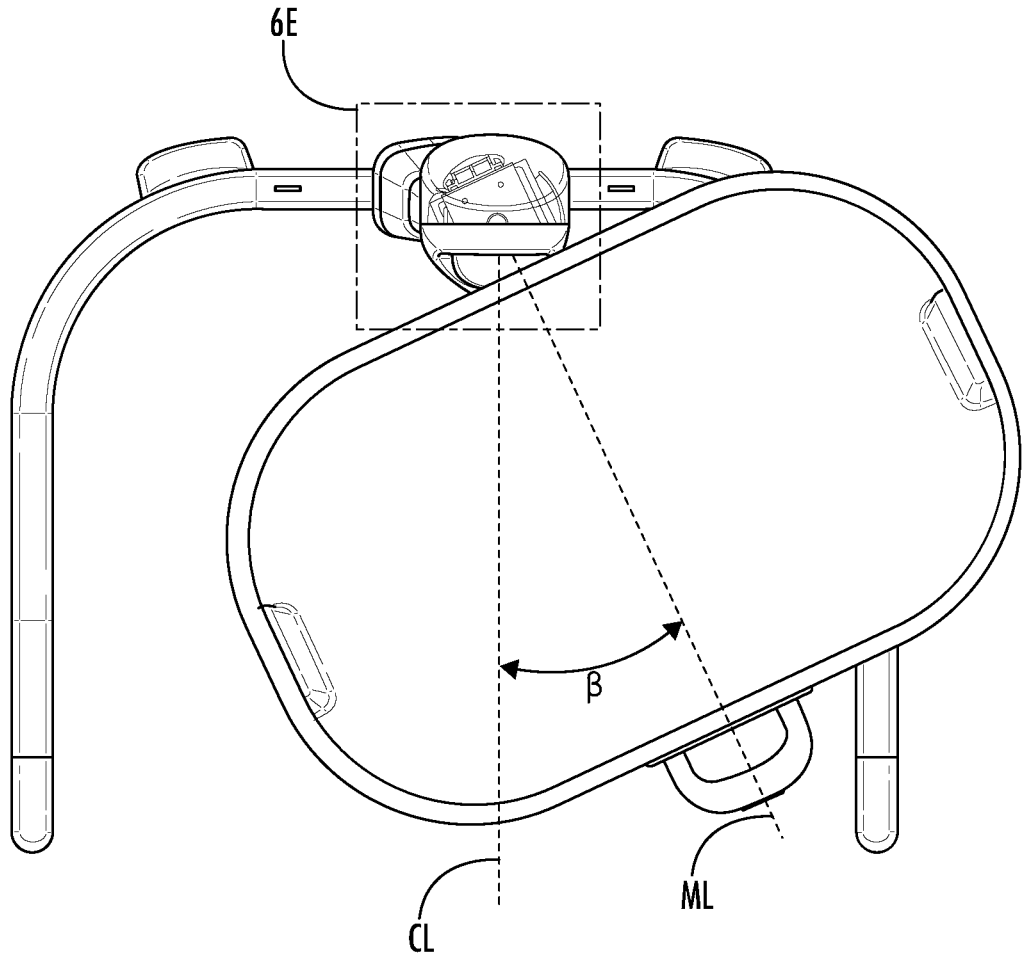
FIG. 6D is a top view of the bassinet assembly with the sway mechanism in an extreme swinging position.

As shown in FIG. 6D, a sway angle (β) of the bassinet 20 is illustrated. As shown in FIG. 6D, the sway angle (β) is at least 25 degrees defined between a centerline (CL) and a midline (ML) of the bassinet 20 in an extreme sway position. One of ordinary skill in the art would understand that the sway angle (β) can be adjusted, and can be larger or smaller than 25 degrees (i.e. 50 degrees total).

Figure 6E:
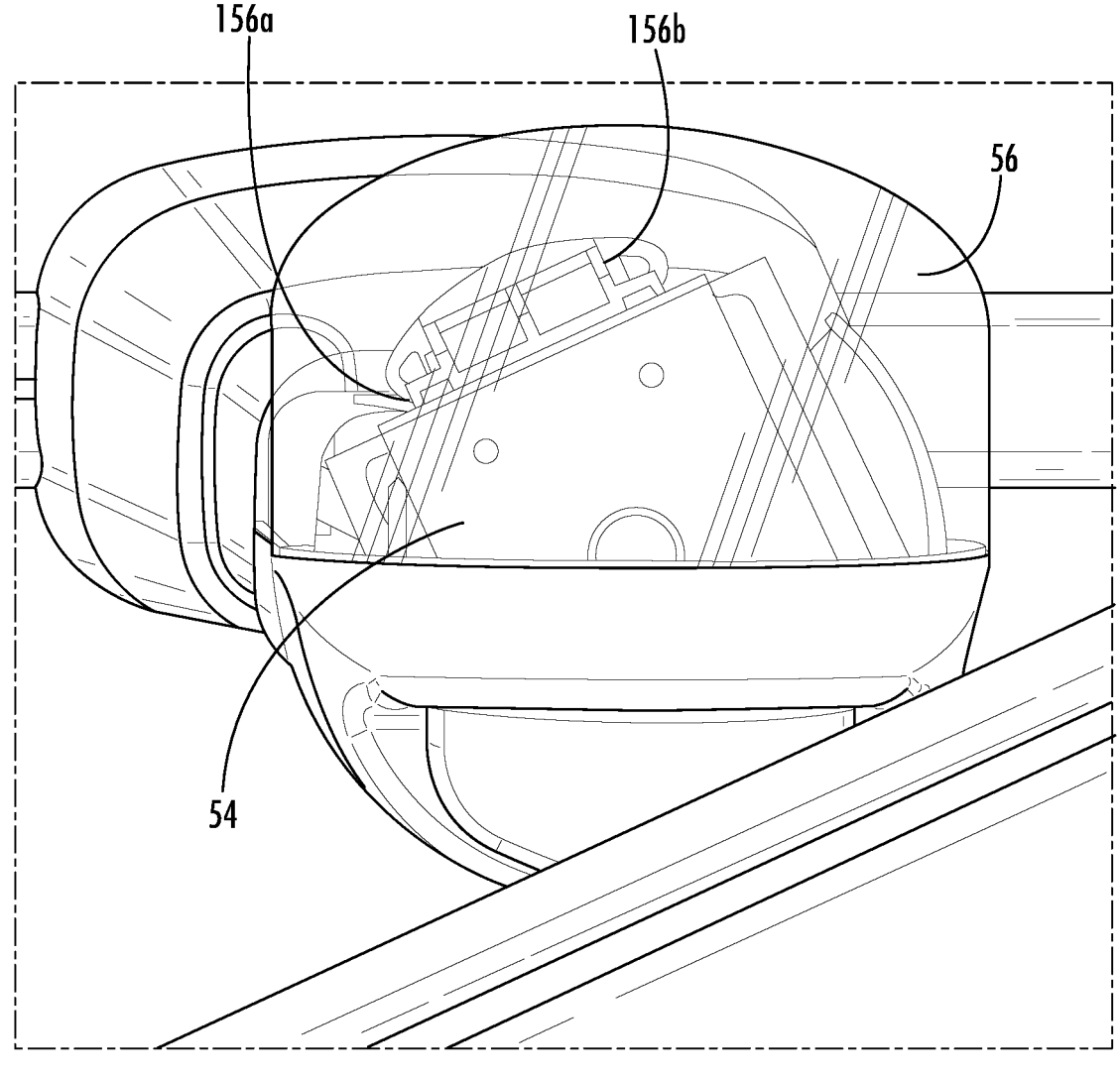
FIG. 6E is a magnified view of area "6E" from FIG. 6D.

FIG. 6E illustrates a magnified portion "6E" from FIG. 6D. As shown in FIG. 6E, a pair of stops 156a, 156b can be provided in the housing 56. In one aspect, the pair of stops 156a, 156b are defined on the bracket 57a. The pair of stops 156a, 156b can include stop surfaces that include rubber ends, such as a thermoplastic elastomer, that act as bumpers for the attachment component 54. Other stop arrangements or assemblies can be used.

The brackets 57a, 57b can be formed separately or integrally with the main housing support 57c. These support components generally secure the sway mechanism 50 to the frame 40. The components of the pivot shaft support 57a, 57b, 57c may be attached to the frame 40 via any connection means or configurations, such as welding, riveting, snapping, press or interference fit, or any other connection or attachment. The pivot shaft support 57a, 57b, 57c and the bearings 57d, 57e house the pivot shaft 52 and support the pivot shaft 52 in the radial and axial direction. As shown in FIG. 6C, an axial end 57f of the pivot shaft 52 having a reduced diameter is supported by bearing 57d.

Figures 7A, 7B, 7C:
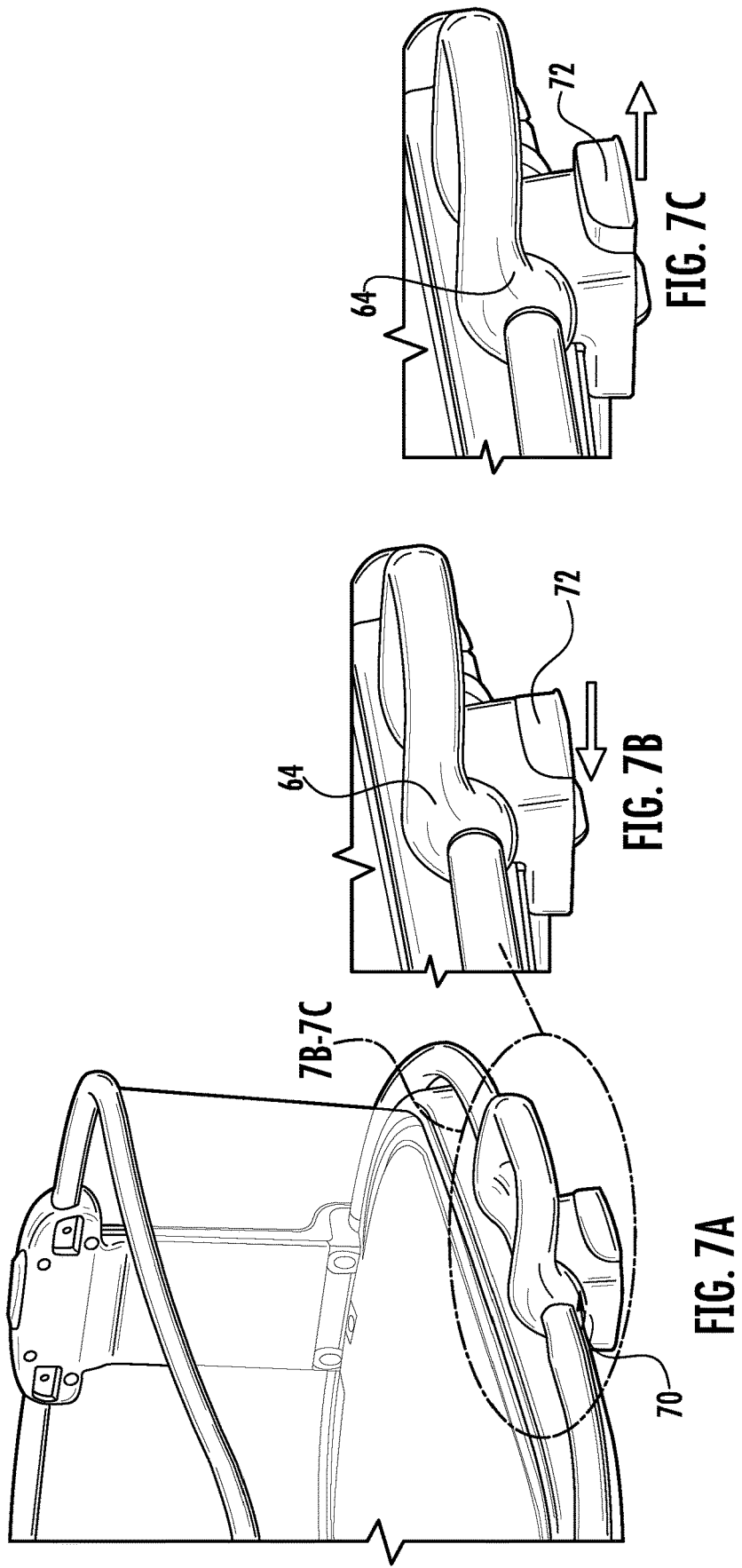
FIG. 7A is a perspective view of a front handle portion of a sway locking assembly according to one aspect.
FIG. 7B is a magnified view of portion "7B-7C" from FIG. 7A with a front handle portion in a first position.
FIG. 7C is a magnified view of portion "7B-7C" from FIG. 7A with the front handle portion in a second position.

The present disclosure provides a configuration in which the swaying motion can be locked or prevented. A sway locking assembly 70 is provided that is configured to lock the bassinet 20 in a stationary position. As shown in FIGS. 7A-7C, the sway locking assembly 70 can be arranged in a front handle portion 64 of the bassinet support 60. As shown in the Figures, the front handle portion 64 is located away from or terminally positioned relative to the frame 40. One skilled in the art would understand that the locking feature could also be provided on the frame 40 itself or on the bassinet support 60 in a region adjacent to or proximal to the frame 40, among any other location.

The sway locking assembly 70 includes a locking handle, actuator, or a first sway lock interface 72 configured to be engaged by a user. The locking handle 72 is illustrated in an inward position relative to the front handle portion 64 in FIG. 7B and an outward position relative to the front handle portion 64 in FIG. 7C. The locking handle 72 is configured to be driven inward and outward, in one embodiment. One skilled in the art would understand that the locking handle 72 can include any type of actuator that is configured to be engaged by a user. The arrangement of the locking handle 72 in FIG. 7B corresponds to a locking position for swaying and FIG. 7C corresponds to a swaying position. These positions can be switched. Additionally, the locking handle 72 could alternatively include a knob or other type of interface.

Figure 8A:
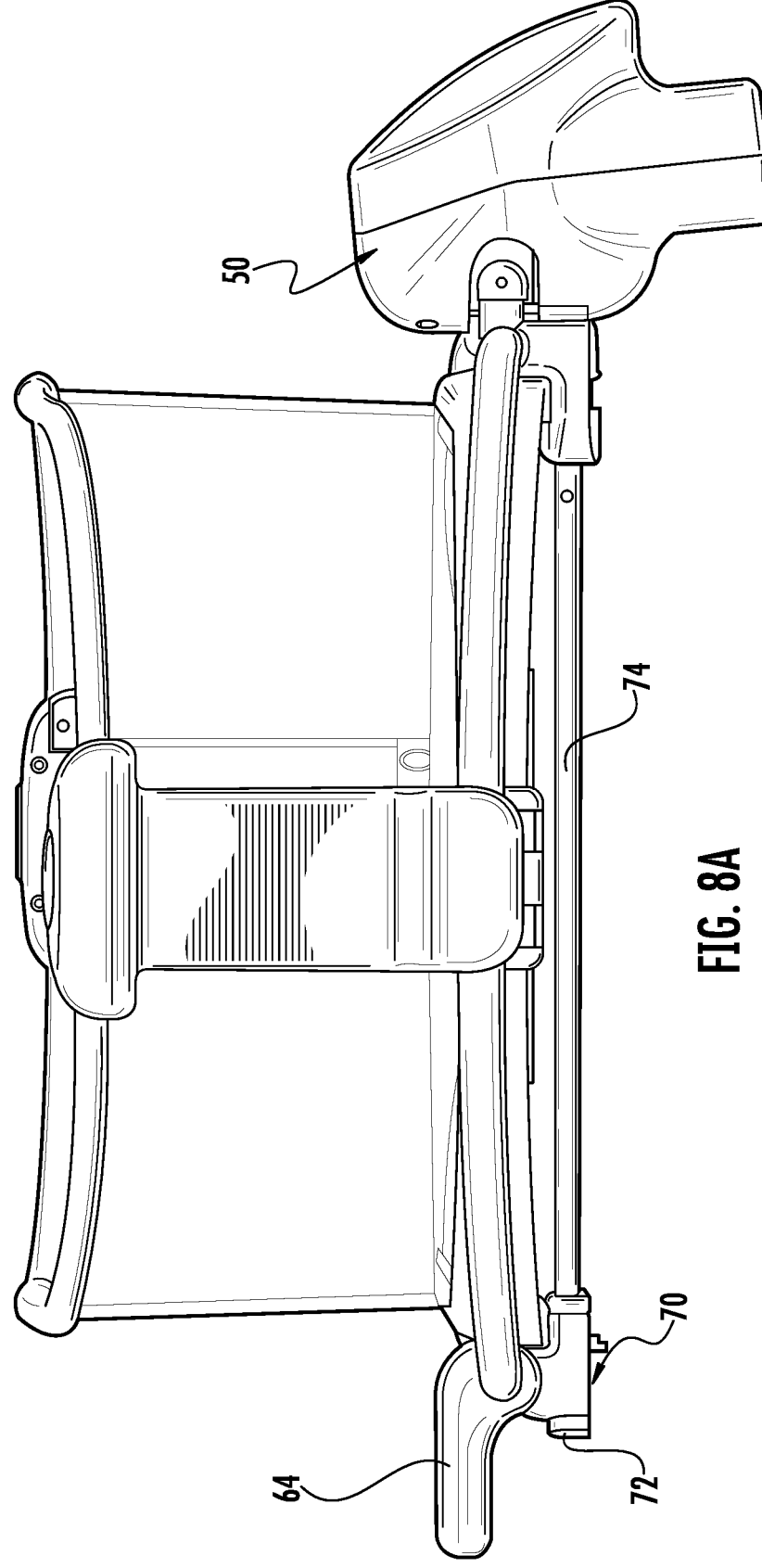
FIG. 8A is a front view of the bassinet assembly showing a latch tube arranged under the bassinet.

FIG. 8A provides another view of the sway locking assembly 70. As shown in FIG. 8A, the locking handle 72 is connected to a latch tube 74. In one aspect, the handle 72 and the latch tube 74 are joined to each other. In another aspect, the handle 72 and the latch tube 74 are integrally formed with each other. The latch tube 74 is connected at a terminal end to the locking handle 72 and at a proximal end to the sway mechanism 50.

Figure 8B:
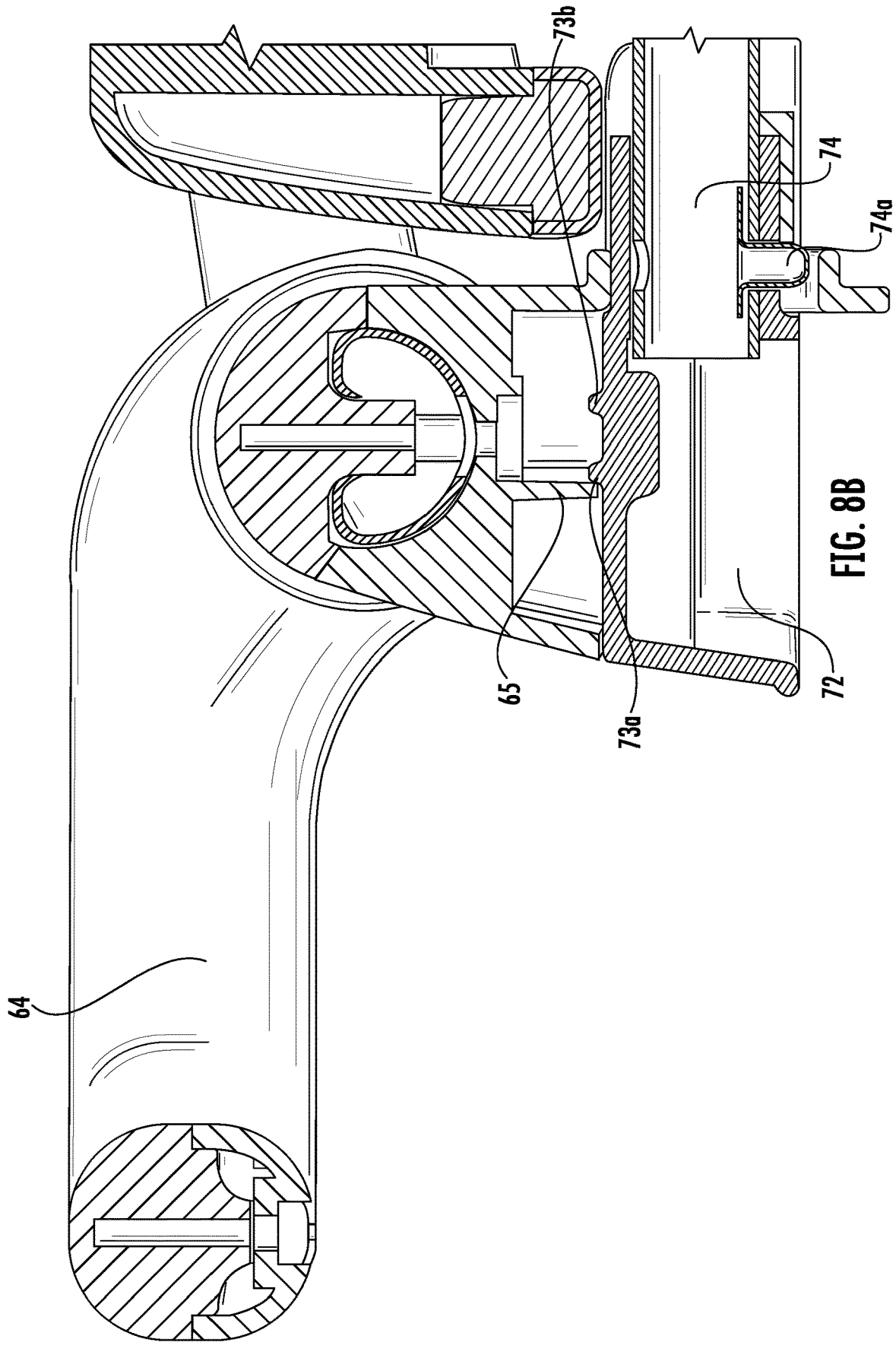
FIG. 8B is a magnified cross-sectional view of the front handle portion and sway locking assembly with the swaying lock in a first state.
Figure 8C:
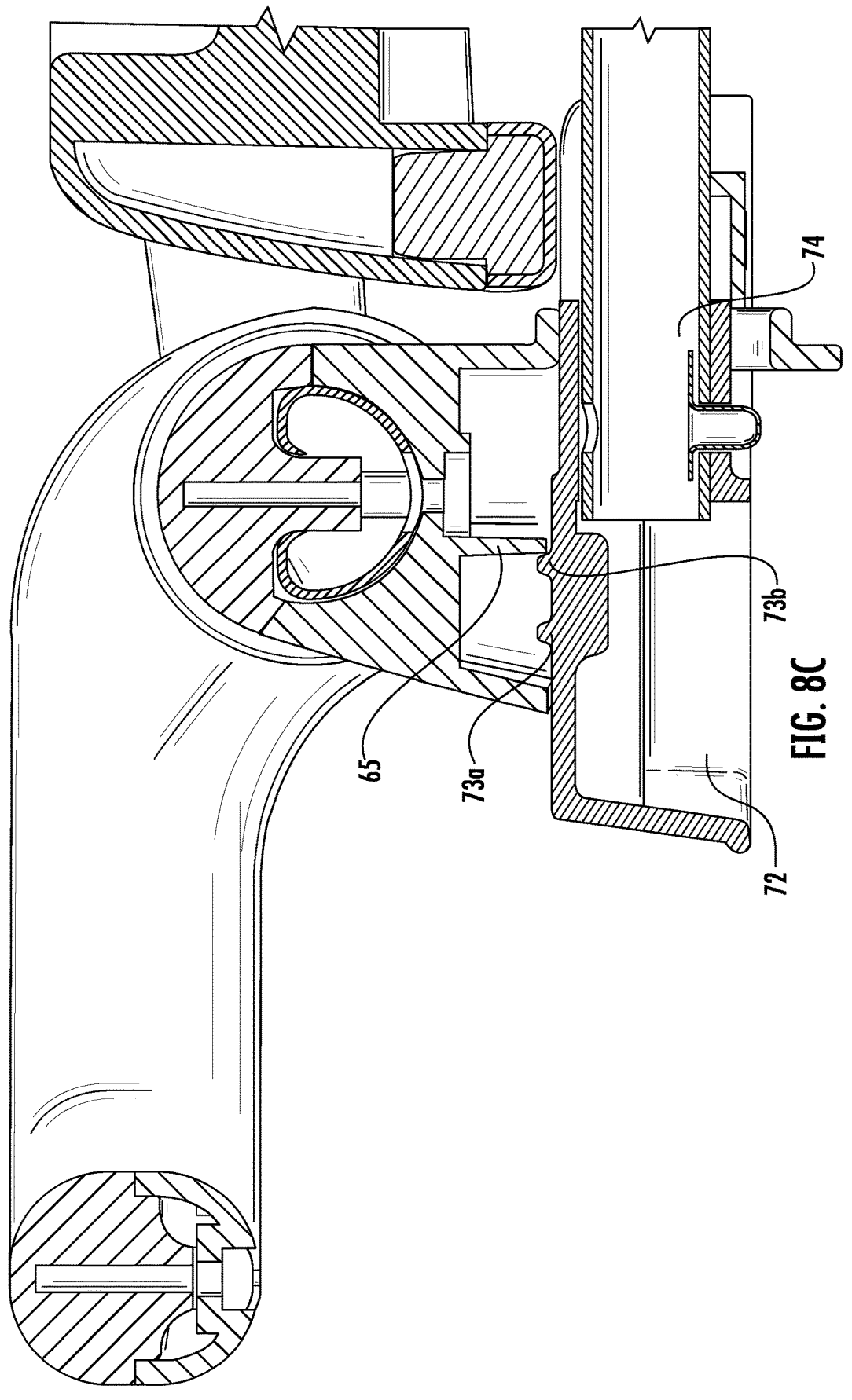
FIG. 8C is a magnified cross-sectional view of the front handle portion and sway locking assembly with the swaying lock in a second state.

FIGS. 8B and 8C illustrate a magnified cross-sectional view of the sway locking assembly 70 from FIG. 7B. As shown in FIG. 8B, the locking handle 72 is in a locked position. The locking handle 72 includes at least one locating rib 73a, 73b. As shown in FIG. 8B, the at least one locating rib 73a, 73b is provided on a top surface of the locking handle 72. The front handle portion 64 includes a mating element for engaging the at least one locating rib 73a, 73b. The mating element on the front handle portion 64 can include a biased or spring finger 65. The spring finger 65 is cantilevered from a main portion of the front handle portion 64. One skilled in the art would understand that any type of mating configuration could be used to provide an interface between the front handle portion 64 and the locking handle 72.

FIG. 8B illustrates the sway locking assembly 70 in the inward position corresponding to a locked position and FIG. 8C illustrates the sway locking assembly 70 in an outward position corresponding to an unlocked or swaying position. In the locked position of FIG. 8B, the spring finger 65 is engaged against a first one of the locating ribs 73a and the locking handle 72 is generally aligned with the front handle portion 64. In the swaying position of FIG. 8C, the second locating rib 73b is pulled beyond the spring finger 65 and the locking handle 72 is pulled outward relative to the front handle portion 64. A stop 74a can be provided on an underside of the latching tube 74, and can be configured to engage with a portion of the bassinet support 60 when the handle 72 is pushed inward as shown in FIG. 8B.

Figure 9A:
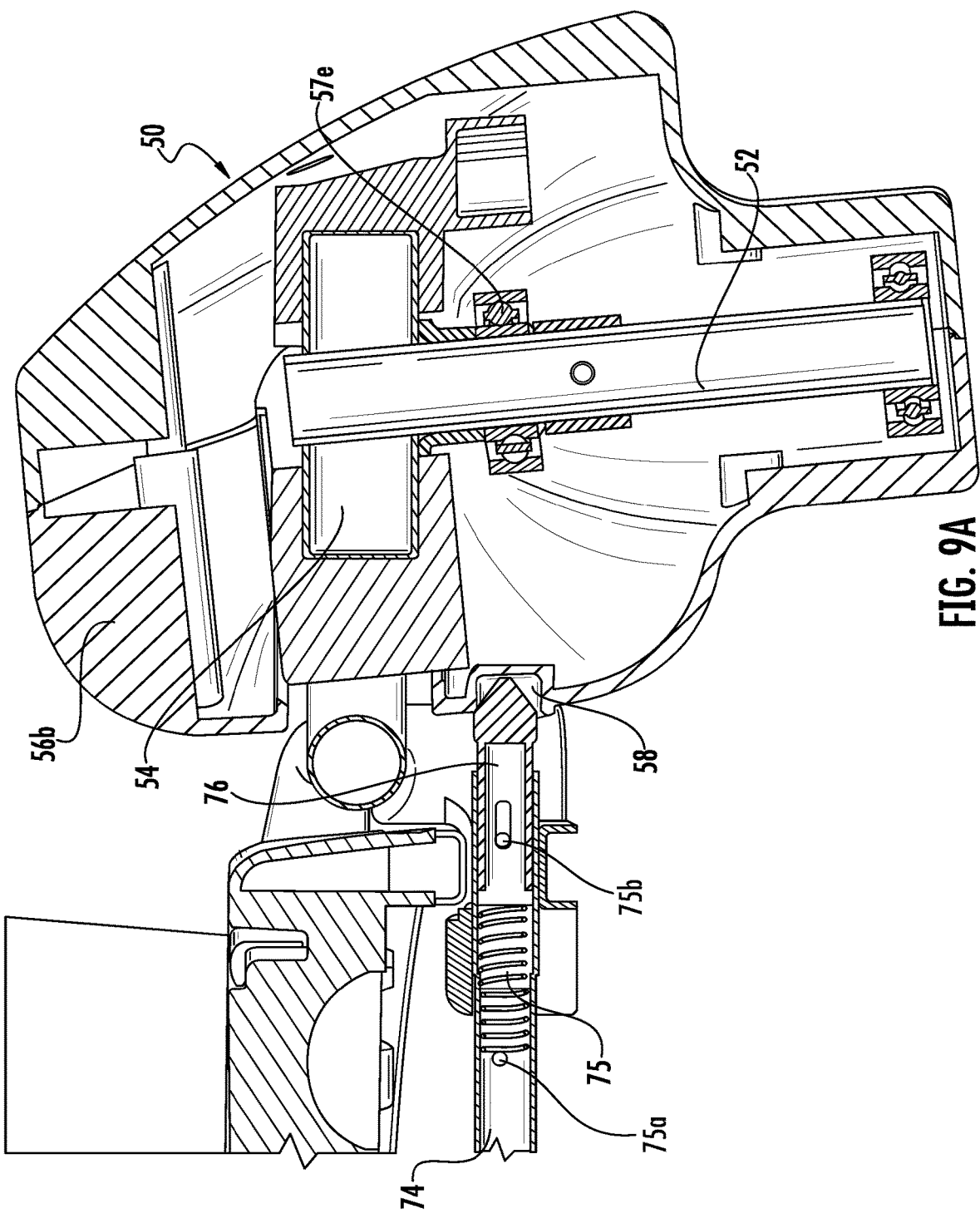
FIG. 9A is a side cross-sectional view of a proximal region of a swaying mechanism in a first state with a plunger engaged within a corresponding groove.
Figure 9B:
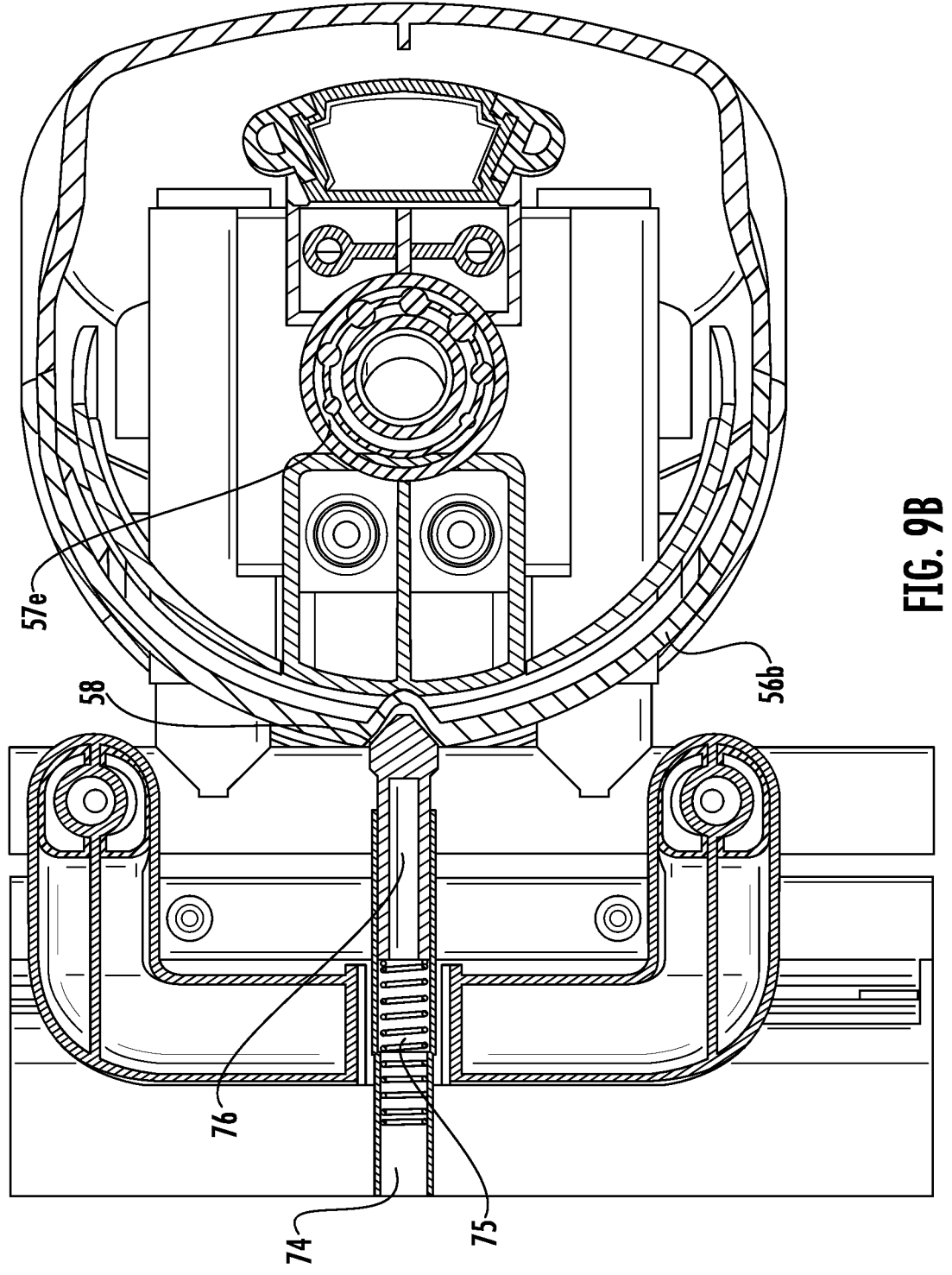
FIG. 9B is a bottom cross-sectional view of the arrangement shown in FIG. 9A.
Figure 9C:
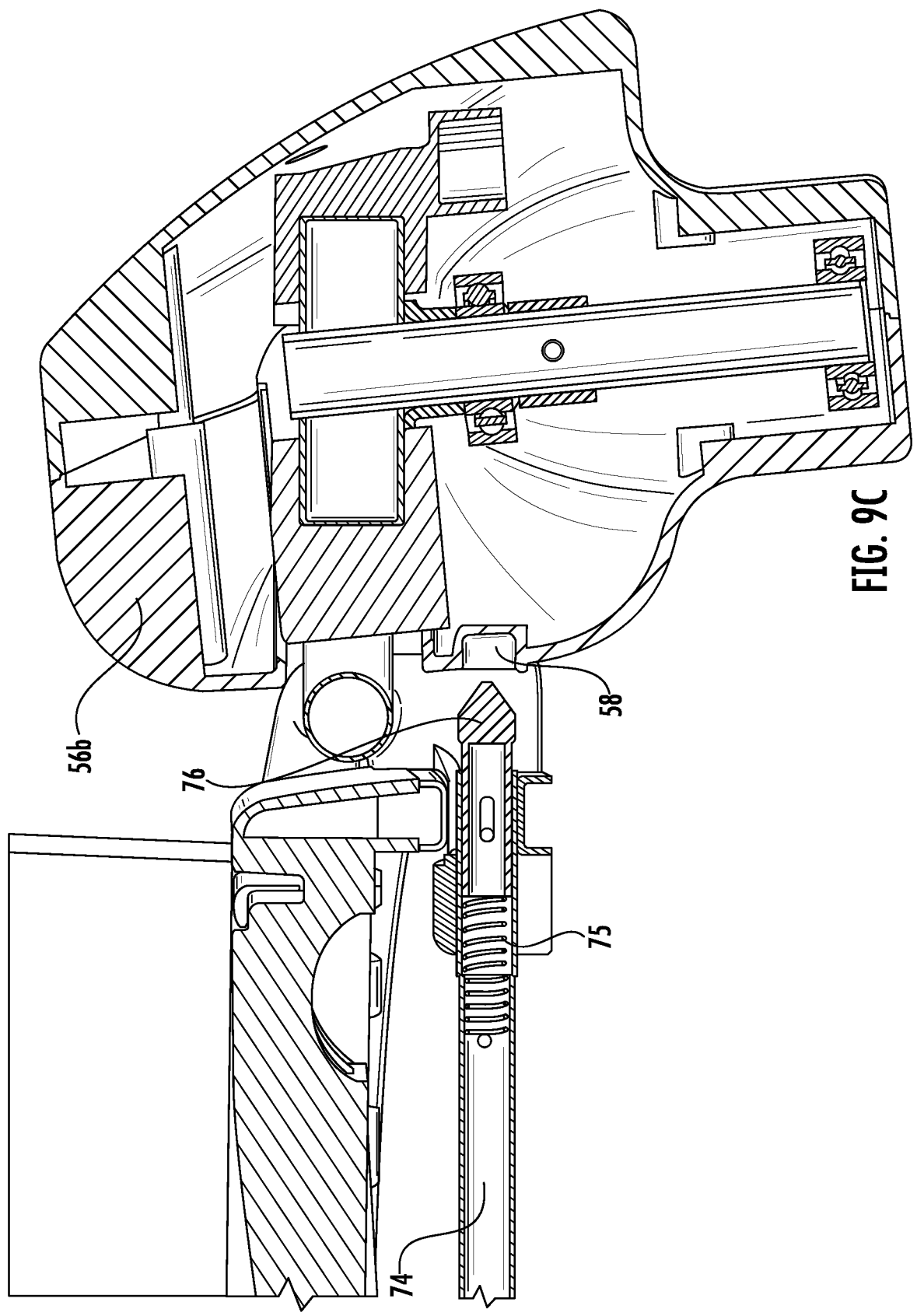
FIG. 9C is a cross-sectional view of the proximal region of the swaying mechanism in a second state with the plunger disengaged from the corresponding groove.
Figure 9D:
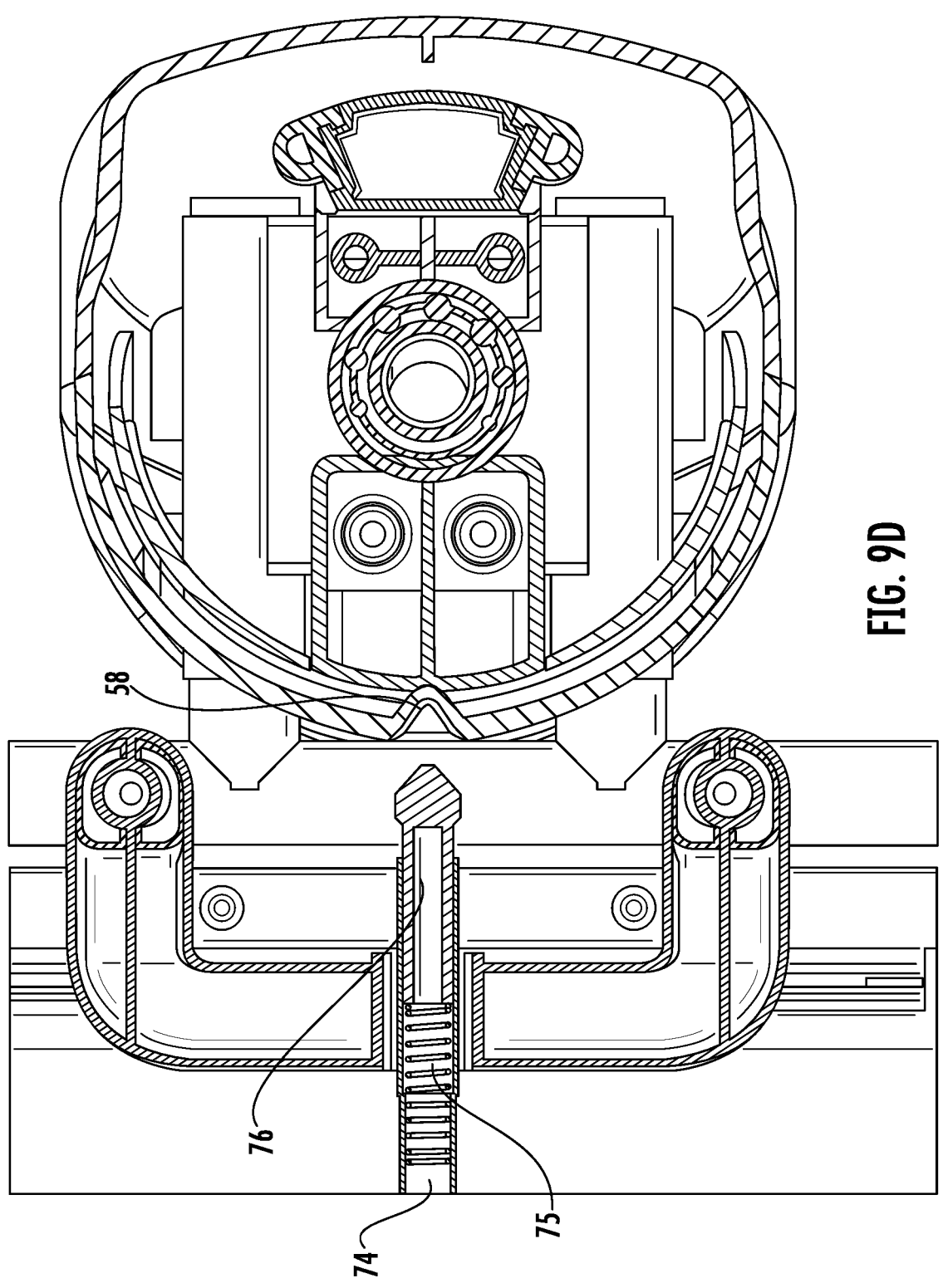
FIG. 9D is a bottom cross-sectional view of the arrangement shown in FIG. 9C.

FIG. 9A is a partial sectional view showing an interface of the sway mechanism 50 and a proximal end of the latch tube 74. As shown in FIG. 9A, the proximal end of the latch tube 74 includes a plunger spring 75 and a plunger 76. The housing 56b includes a groove 58 that is dimensioned to receive a portion of the plunger 76. As shown in FIG. 9A, a first pin 75a can be configured as a stop pin for an end of the spring 75, and a second pin 75b can be configured as a linkage pin for connecting the latch tube 74 to the plunger 76. As shown in FIG. 9A, the plunger 76 includes an enlarged head that has a tapered profile. One skilled in the art would understand that the exact shape and configuration of the plunger 76 and groove 58 interface can vary. In one aspect, the plunger 76 and the groove 58 have complementary shaped interfaces with each other. As shown in FIG. 9A, the sway mechanism 50 is in an inward or locked position. FIG. 9B is another view of the same arrangement from FIG. 9A from a bottom view. FIG. 9C shows the plunger 76 disengaged from the groove 58 such that the sway mechanism 50 is in a sway position. FIG. 9D shows the arrangement from FIG. 9C from a bottom view.

When the sway mechanism 50 is in the inward position or locked position, the latch tube 74 is pushed towards the housing 56a, 56b. The plunger 76 is biased by the plunger spring 75 such that the plunger 76 is pushed into engagement with the groove 58. The sway mechanism 50 is retained in the locked position by the spring finger 65 on the front handle portion 64 engaging against the locating rib 73a.

Figures 9E, 9F:
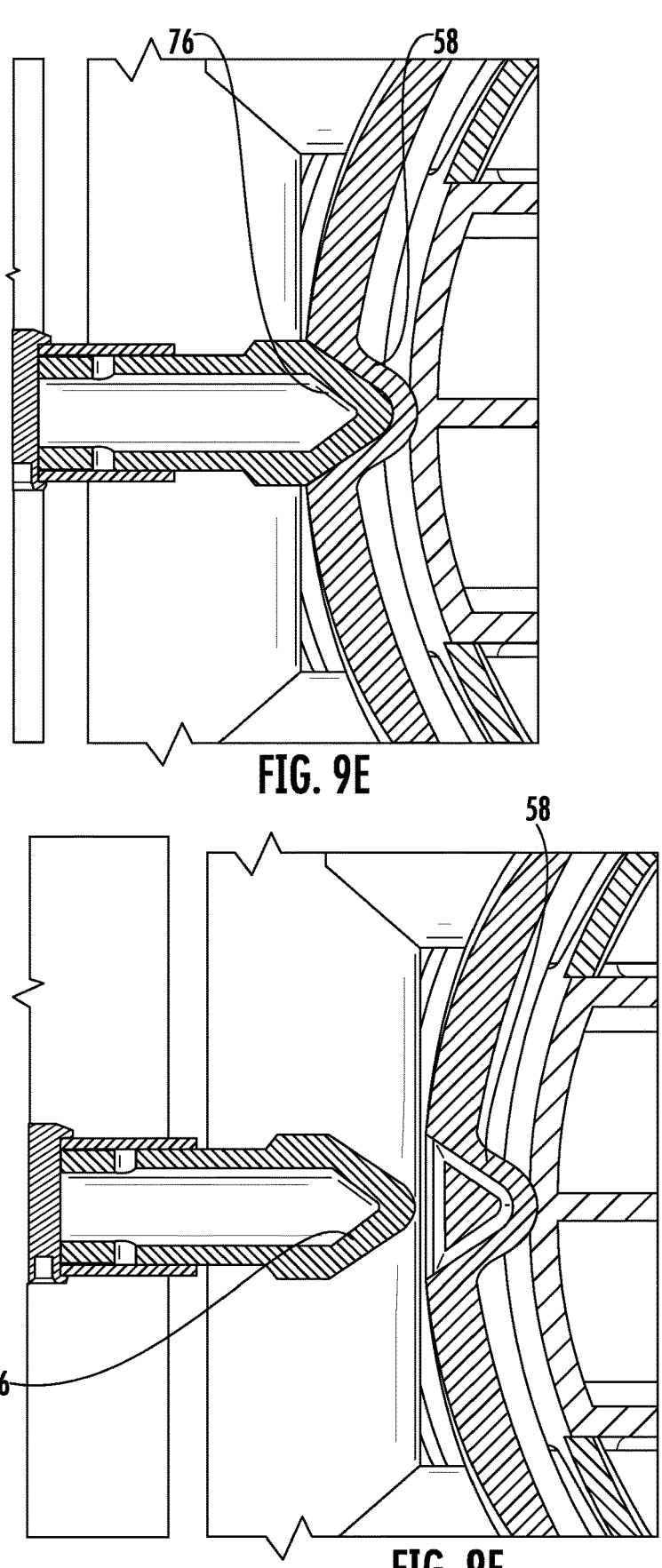
FIG. 9E is a magnified view of the plunger and groove from FIGS. 9A and 9B.
FIG. 9F is a magnified view of the plunger and groove from FIGS. 9C and 9D.

A magnified view of the interface between the plunger 76 and the groove 58 is shown in FIGS. 9E and 9F. As shown in these Figures, the head of the plunger 76 has a tapered or angled profile that generally matches a corresponding tapered or angled profile of the groove 58. Based on the interface between the plunger 76 and the groove 58, in the event of a strong force or bump against the bassinet 20 when the sway mechanism 50 is in the locked position, the plunger 76 will be forced out of engagement with the groove 58 based on the impact force overcoming the biasing force of the plunger spring 75. The plunger spring 75 provides a damping element that absorbs any impact to the bassinet 20. Accordingly, the bassinet assembly 10 includes a protective feature or assembly, including at least the plunger spring 75, plunger 76, groove 58, etc., that protects the mechanical aspects of the bassinet assembly 10, and in particular the sway mechanism 50, from damage in the event of an unintended force being applied to the bassinet assembly 10 or bumping the bassinet assembly 10. This will result in the bassinet 20 then being free to rotate or sway, thereby preventing any damage. The plunger spring 75 allows the sway mechanism 50 to be placed in the inward position for locking even when the plunger 76 is not aligned with the groove 58. When the bassinet 20 is rotated to a position where the plunger 76 and the groove 58 are rotationally combined, the tapered end of the plunger 76 is urged into the groove 58, thereby ensuring that the bassinet 20 will be in the locked position.

Figure 10A:
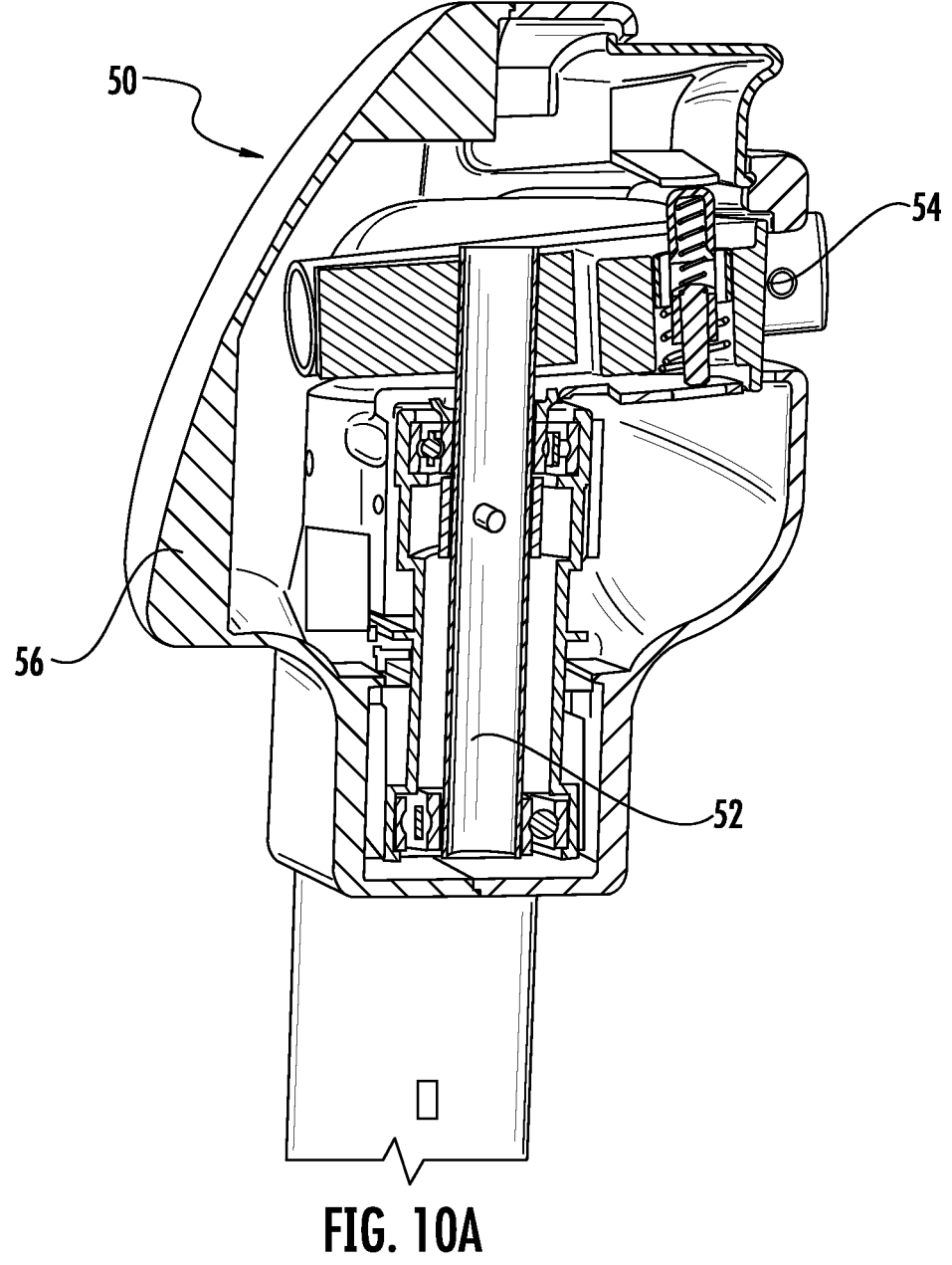
FIG. 10A is a cross-sectional view of a sway locking mechanism according to another aspect.
Figure 10B:
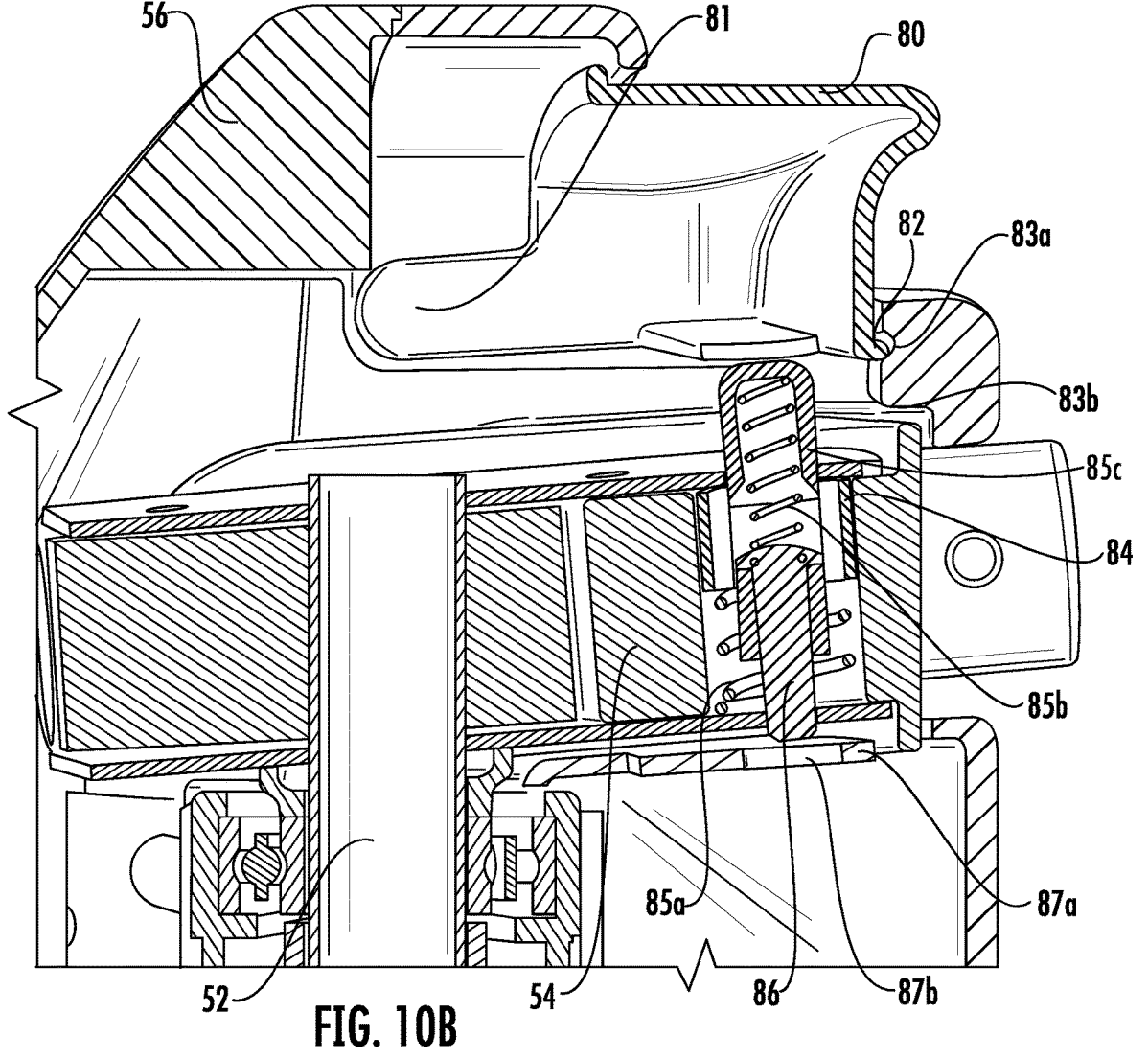
FIG. 10B is a magnified cross-sectional view of the sway locking mechanism from FIG. 10A in a first state.
Figure 10C:
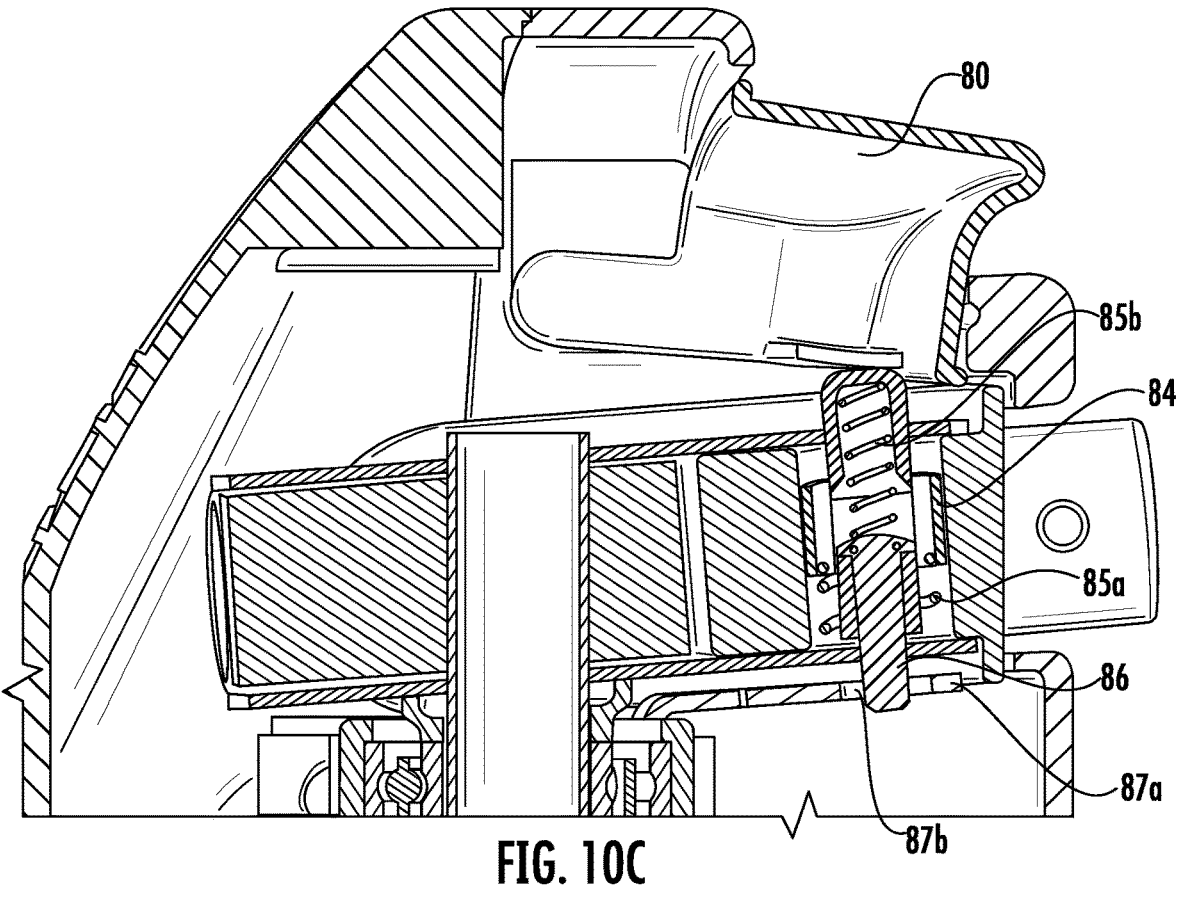
FIG. 10C is a magnified cross-sectional view of the sway locking mechanism from FIG. 10A in a second state.

FIGS. 10A-10C illustrate another aspect of a sway locking interface or mechanism. FIG. 10B corresponds to an unlocked or swaying position and FIG. 10C corresponds to a locked or non-swaying position. As shown in FIGS. 10B and 10C, the sway mechanism 50 includes a lock interface 80 that is exposed from the housing 56. As used herein, the term lock interface refers to a lever, actuator, handle, or other component that is configured to activate and release the locking function of the sway mechanism 50. The lock interface 80, which is also referred to as a second sway lock interface 80, includes a housing having a pivoting connection 81 and an engagement rib 82. The engagement rib 82 is configured to engage with a respective recess 83a, 83b formed on the housing 56. The sway locking mechanism is provided directly on the housing 56 in this embodiment instead of terminal region on the bassinet support 60. One of ordinary skill in the art would understand that either the first sway lock interface 72 or the second sway lock interface 80 can be provided to prevent the swaying motion.

The lock interface 80 is pivotally mounted to the housing 56 via the pivot connection 81. This arrangement allows the lock interface 80 to be rotated upward to the swaying position and downward to the locked position. The lock interface 80 is retained in either of these positions via the engagement rib 82 engaging within either an upper recess 83a or a lower recess 83b formed on the housing 56.

When the lock interface 80 is in the upward position, a locking pin housing 84 is biased in an upward position (i.e. the swaying position). As shown in FIG. 10B, this biasing configuration is provided by a primary spring 85a. In this upward position, an engagement pin 86, which is partially housed in the locking pin housing 84 is in a generally upward position as shown in FIG. 10B.

When the lock is actuated, the locking pin housing 84 is driven downward along with the engagement pin 86, causing the engagement pin 86 to extend within an engagement plate 87a. Specifically, the engagement pin 86 is driven inside of an engagement hole 87b defined on the engagement plate 87a. This engagement locks the bassinet 20 in a stationary position.

A secondary spring 85b can be provided within a spring housing 85c that is connected to the attachment component 54. As shown in FIG. 10B, the spring housing 85c protrudes upwards from the attachment component 54 and contacts a bottom surface of the lock interface 80. The spring housing 85c can include a generally cylindrical body with a slot or opening in a medial region. As shown in FIG. 10B, the engagement pin 86 can be configured to engage the slot of the spring housing 85c. In the event that the lock interface 80 is pushed downward (i.e. the sway position) when the engagement pin 86 and the engagement hole 87b are not aligned or oriented with each other, the secondary spring 85b biases the engagement pin 86 generally downward and against the engagement plate 87a. This arrangement ensures that the engagement pin 86 bears against the engagement plate 87a until the attachment component 54 is rotated such that the engagement pin 86 and the engagement hole 87b are aligned. When the engagement pin 86 and the engagement hole 87b are aligned, then the secondary spring 85b pushes the engagement pin 86 into the engagement hole 87b. As shown in FIGS. 10B and 10C, the secondary spring 85b engages an end surface of the locking pin housing 84 at one end and engages an end surface of the engagement pin 86 at a second end. The primary spring 85a has a first end engaging an internal surface of the attachment component 54 and a second end engaging the locking pin housing 84. The engagement pin 86 is arranged inside of the primary spring 85a, in one aspect.

Figure 12A:
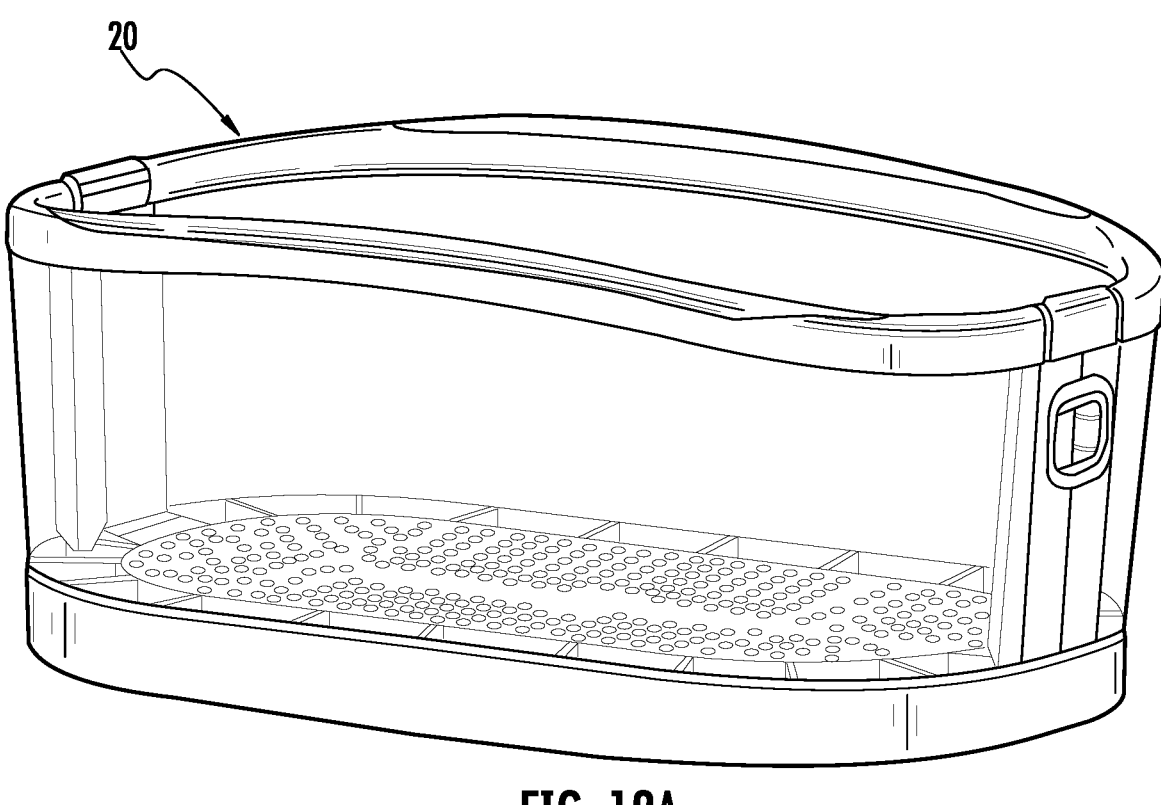
FIG. 12A is a perspective view of the bassinet.
Figure 12B:
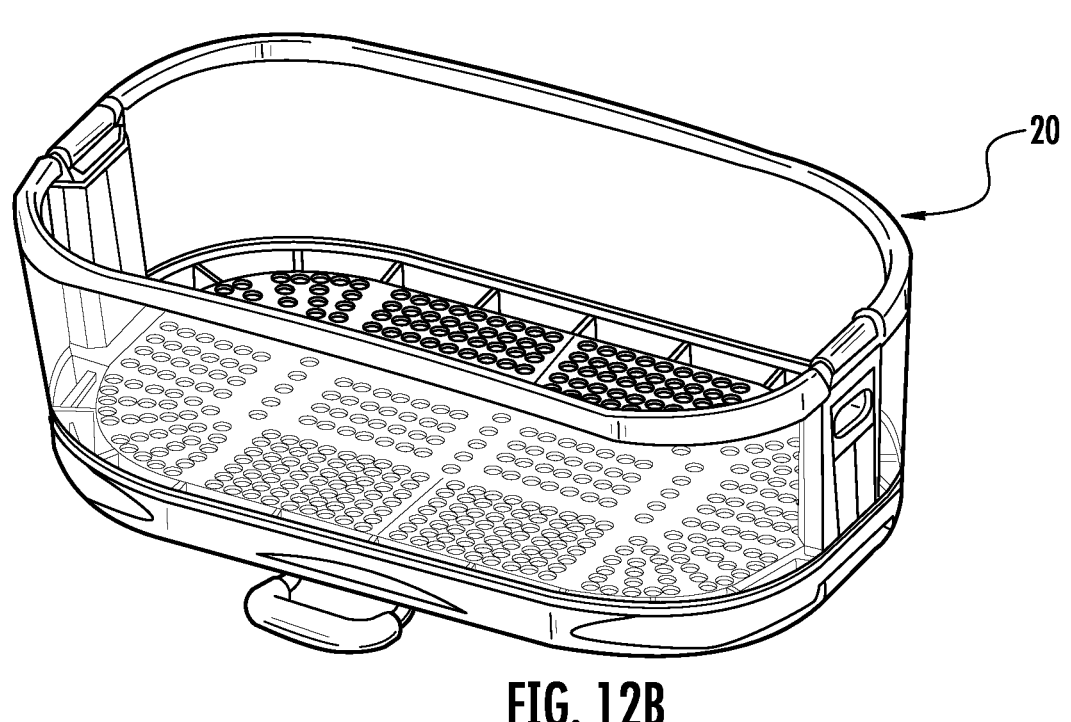
FIG. 12B is another perspective view of the bassinet.

FIGS. 12A-12J illustrate further details of the bassinet 20. As shown in FIGS. 12A and 12B, the bassinet 20 can be completely decoupled, removed, or detached from the bassinet support 60, and the bassinet 20 can be used as a completely stand-alone infant cradling device.

Figure 12C:
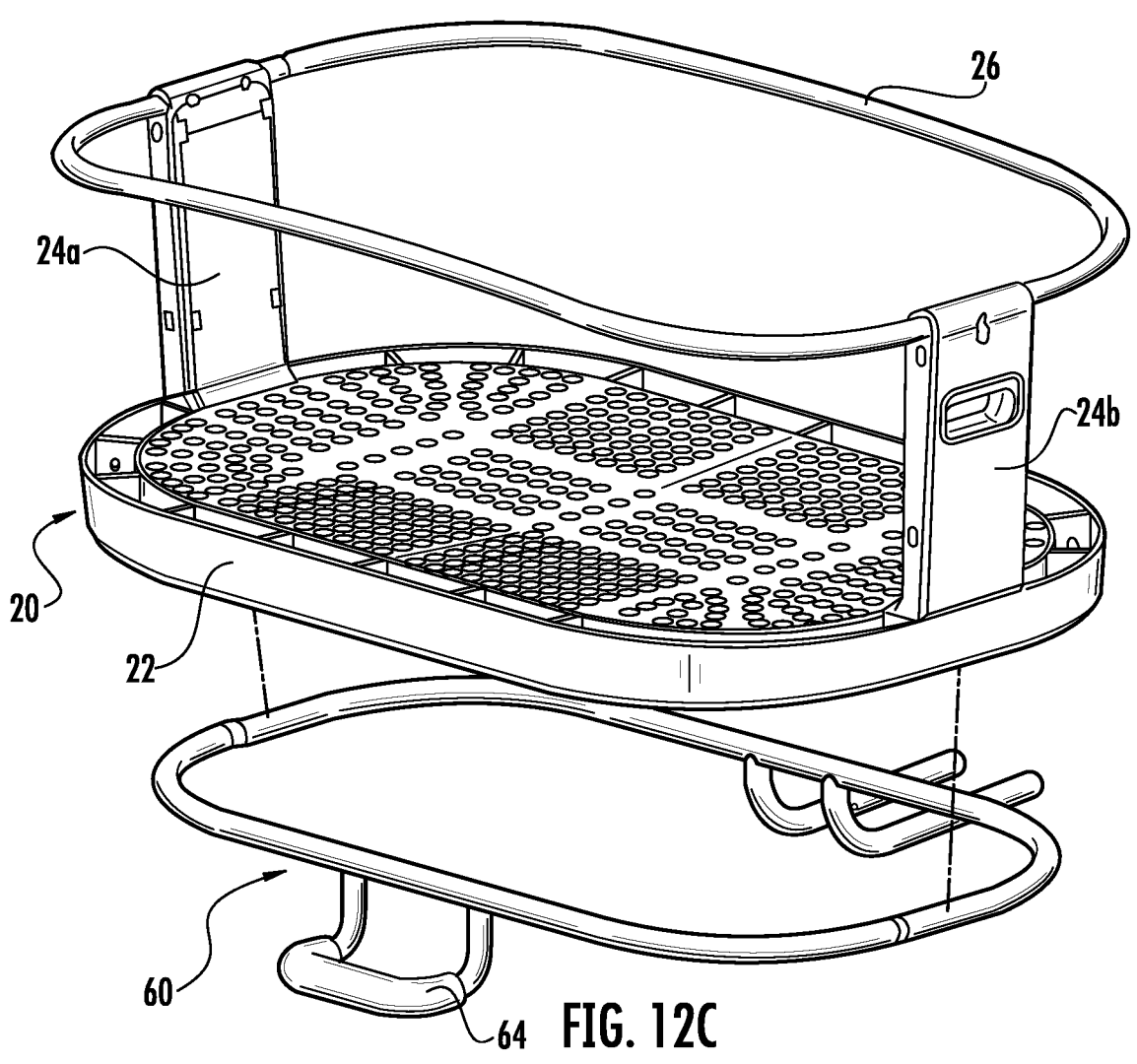
FIG. 12C is a partially exploded view of the bassinet detached from a bassinet support.
Figure 12D:
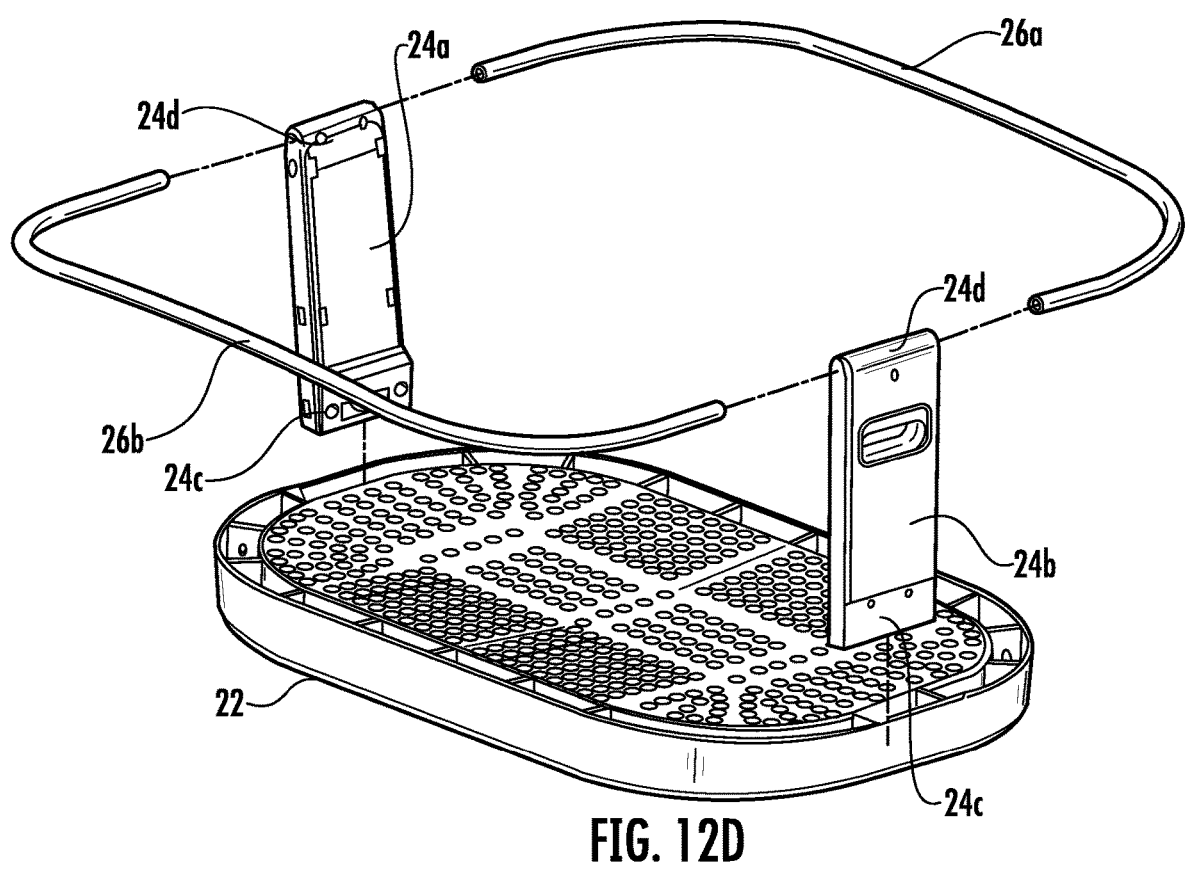
FIG. 12D is a further exploded view of the bassinet.

As shown in FIGS. 12C and 12D, the bassinet 20 includes a base 22 that generally defines a sleep surface on a top side or first side. In one aspect, the base 22 can be an injection molded plastic component. One skilled in the art would understand based on this disclosure that other materials and formation methods could be used to form the base 22. The bassinet 20 also includes at least one housing 24a, 24b and an upper frame 26. As shown in FIG. 12C, the at least one housing 24a, 24b extends generally vertically between the base 22 and the upper frame 26. The at least one housing 24a, 24b has a first end 24c attached the base 22 and a second end 24d extending away from the base 22 and connected to the upper frame 26. The upper frame 26 can include two halves 26a, 26b as shown in FIG. 12D, or can be formed as a single tube or rod. An enclosure, such as a soft material or goods enclosure, is configured to wrap around at least a portion of the bassinet 20. Additionally, a mattress or other form of padding is configured to be arranged on or secured to the base 22.

Figure 12E:
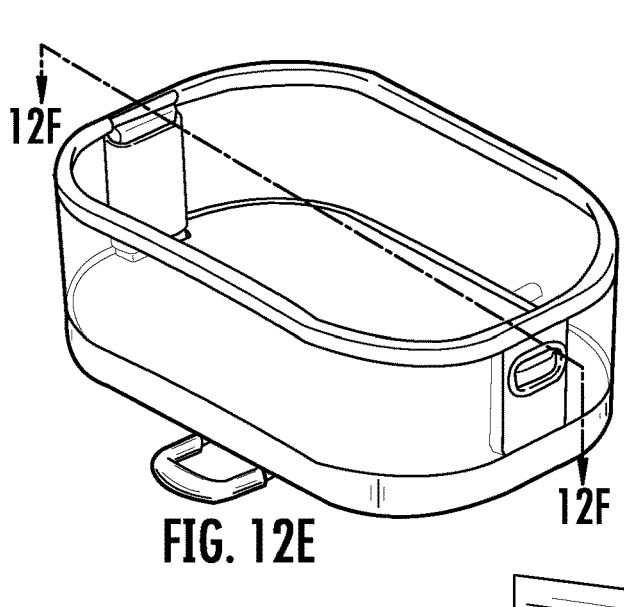
FIG. 12E is another perspective view of the bassinet.
Figure 12F:
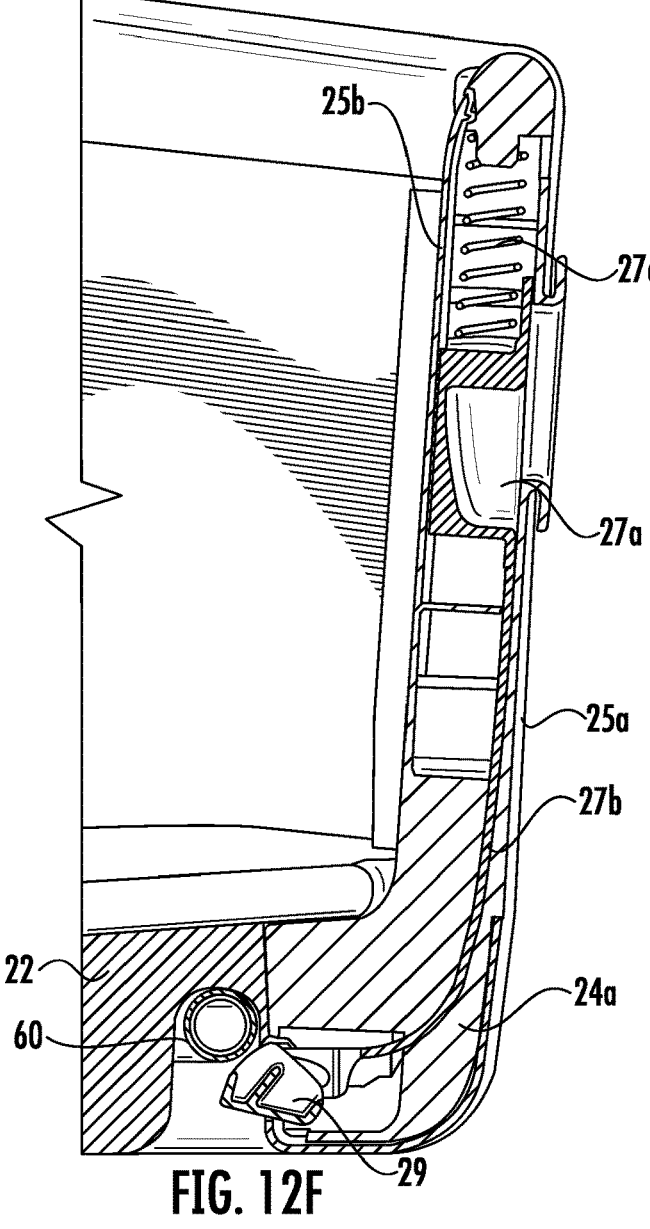
FIG. 12F is a cross-sectional view along plane "12F-12F" from FIG. 12E.

FIG. 12F includes a magnified view of the housing 24a along a portion of plane 12F-12F from FIG. 12E. As shown in FIG. 12F, the housing 24a includes an outer housing 25a and an inner cover 25b, which are fastened to each other. One skilled in the art would understand that the housing could also be formed as a unitary housing. Between the outer housing 25a and the inner cover 25b, a release actuator 27a is arranged. In one aspect, the release actuator 27a is formed as a release handle. As shown in FIG. 12F, the release handle 27a is completely recessed within the bassinet 20. The release handle 27a is biased by a spring 27c to a downward position, which generally corresponds to a state in which the bassinet 20 is secured to the bassinet support 60.

A cable 27b is connected to the release handle 27a at a proximal end and is connected to a latch 29 at a terminal end.

The term latch as used in this respect refers to any type of release mechanism or element that is configured to engage with another component. The latch 29 is also referred to as herein as an engagement feature.

The cable 27b can be pivotally connected to a boss molded with the latch 29, in one embodiment. The latch 29 is a configured to pivot and is ordinarily biased to engage with the bassinet support 60 when the release handle 27a is not being pulled. In one aspect, a spring can be provided to bias the latch 29 into engagement with the bassinet support 60. Other biasing elements or arrangements can be used. As shown in FIG. 12F, the latch 29 is configured to nest or reside within a cavity 23 defined in a bottom surface of the base 22, opposite from the sleep surface. In one aspect, the cavity 23 acts as an engagement feature with the bassinet support 60. One of ordinary skill in the art would understand that other engagement features can be provided. The latch 29 prevents the bassinet 20 from being lifted off of or otherwise removed from the bassinet support 60 by engaging the bassinet support 60. In one aspect, the cavity 23 is a first engagement feature and the latch 29 is a second engagement feature configured to engage relative to the cavity 23. Although a latch and cavity are shown in the drawings as engagement features, one of ordinary skill in the art would understand that other types of configurations may be used to secure the bassinet to the bassinet support.

Figures 12G, 12H:
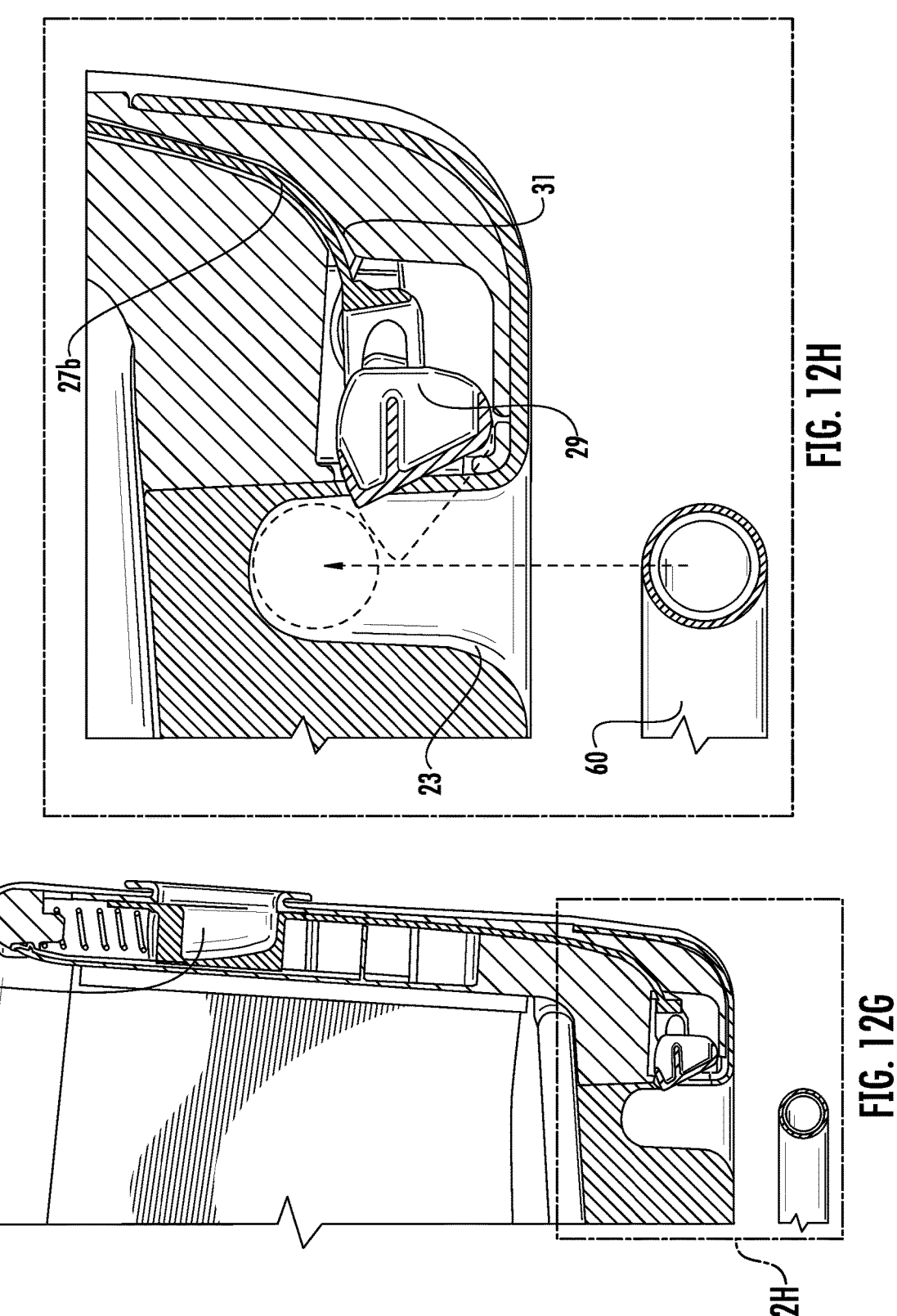
FIG. 12G is a cross-sectional view of the bassinet after being removed from the bassinet support.
FIG. 12H is a magnified view of region "12H" from FIG. 12G.

FIGS. 12G and 12H illustrate the latch 29 being disengaged from the bassinet support 60 while pulling the handle 27a. FIG. 12H is a magnified view of portion "12H" shown in FIG. 12G. As the handle 27a is pulled upward against the force of the spring 27c, the latch 29 rotates clockwise around its pivoting axis and becomes recessed from its extended position shown in FIG. 12F, thereby moving out of the cavity 23. When the handle 27a is pulled (shown by arrow (A) in FIG. 12H), the cable 27b is guided by a track 31 molded into the housing 24a. The end of the cable 27b pulls on the latch 29 causing it to rotate clockwise as shown by motion (B) in FIG. 12H. This movement of the latch 29 away from the bassinet support 60 and into the housing 24a clears the cavity 23 of the latch 29, thereby allowing the bassinet 20 to be removed via lifting the bassinet 20 relative to the bassinet support 60.

Figures 12I, 12J:
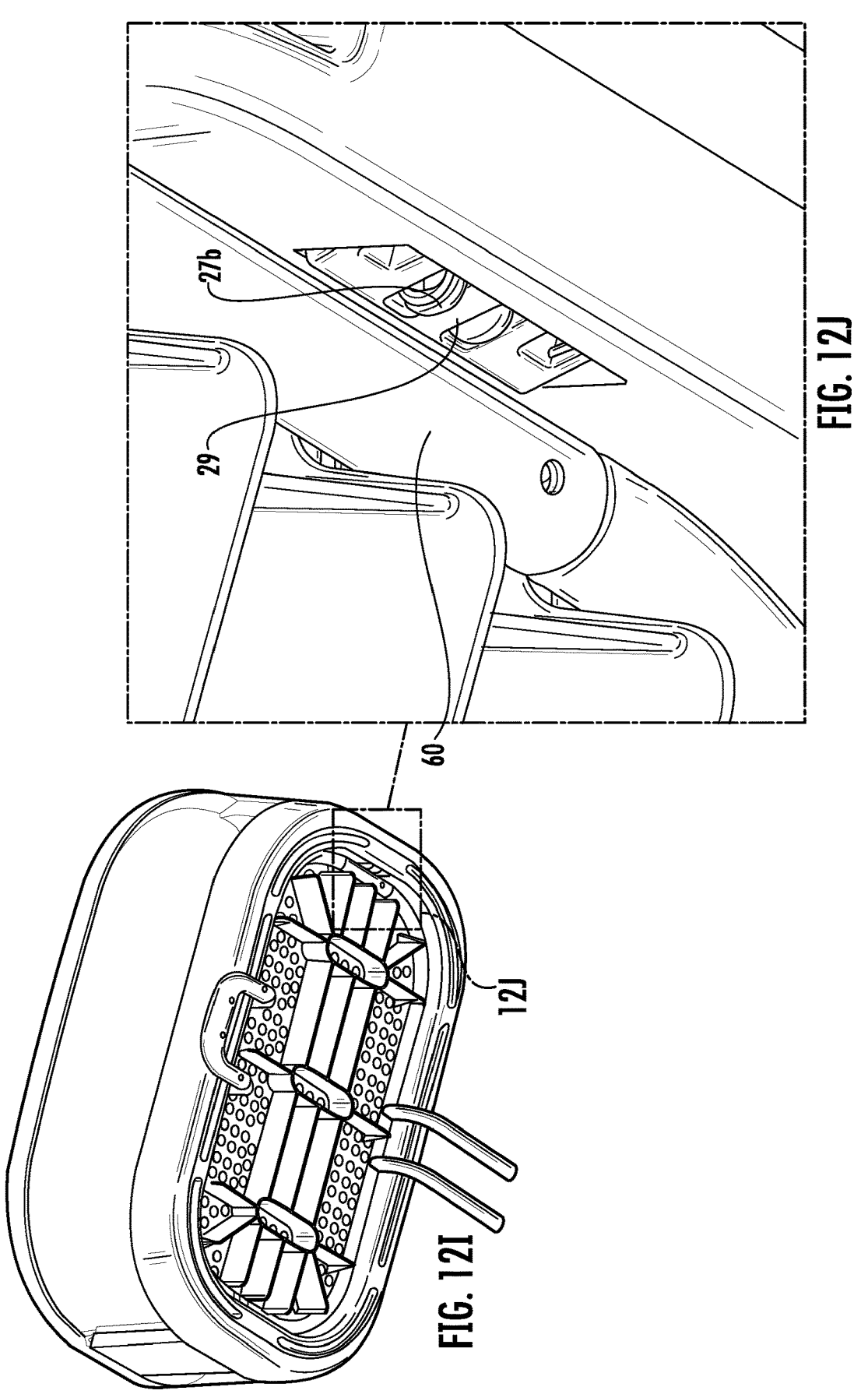
FIG. 12I is a bottom perspective view of the bassinet and bassinet support.
FIG. 12J is a magnified perspective view of region "12J" from FIG. 12I.

FIG. 12I shows a bottom view of the bassinet 20. FIG. 12J is a magnified portion of area "12J" from FIG. 12I. As shown in FIG. 12J, the latch 29 is in a disengaged position relative to the support tube 12. The latch 29 is shown in the fully inwardly rotated position based on the handle 27a being pulled to the upward or release position. Slots can be defined in both the cable 27b end and the front face of the latch 29. Because of these slots, the latch 29 can rotate independently of the handle 27a, such as when the bassinet 20 is being installed onto bassinet support 60.

Figures 13A, 13B:
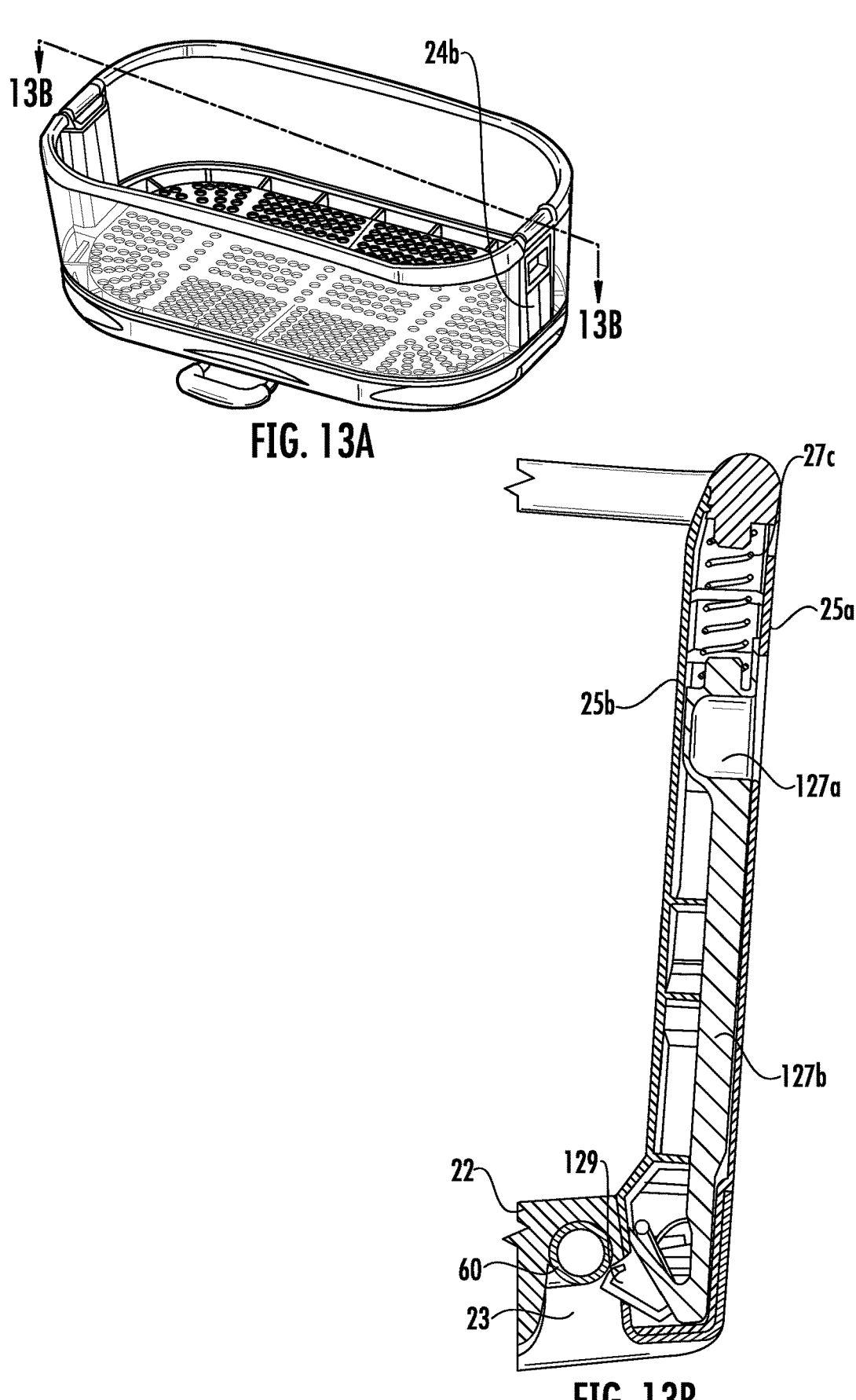
FIG. 13A is a perspective view of the bassinet according to another aspect.
FIG. 13B is a cross-sectional view along plane 13B-13B from FIG. 13A in a region of an end housing in a first state.

FIGS. 13A-13E illustrate further aspects and features of the bassinet 20. Specifically, FIGS. 13A-13E illustrate another aspect of a bassinet release assembly, similar to the configurations shown in FIGS. 12A-12J As shown in FIG. 13B, the release handle 127a is biased by a spring 27c to a downward position. The release handle 127a is arranged at a first end of a connector body 127b. A second end of the connector body 127b includes a pivoting latch 129. The pivoting latch 129 generally engages with the bassinet support 60 to ensure that the bassinet 20 is held in position. The bassinet support 60 is dimensioned to fit within a cavity 23 defined on an underside of the bassinet 20.

Figures 13C, 13D:
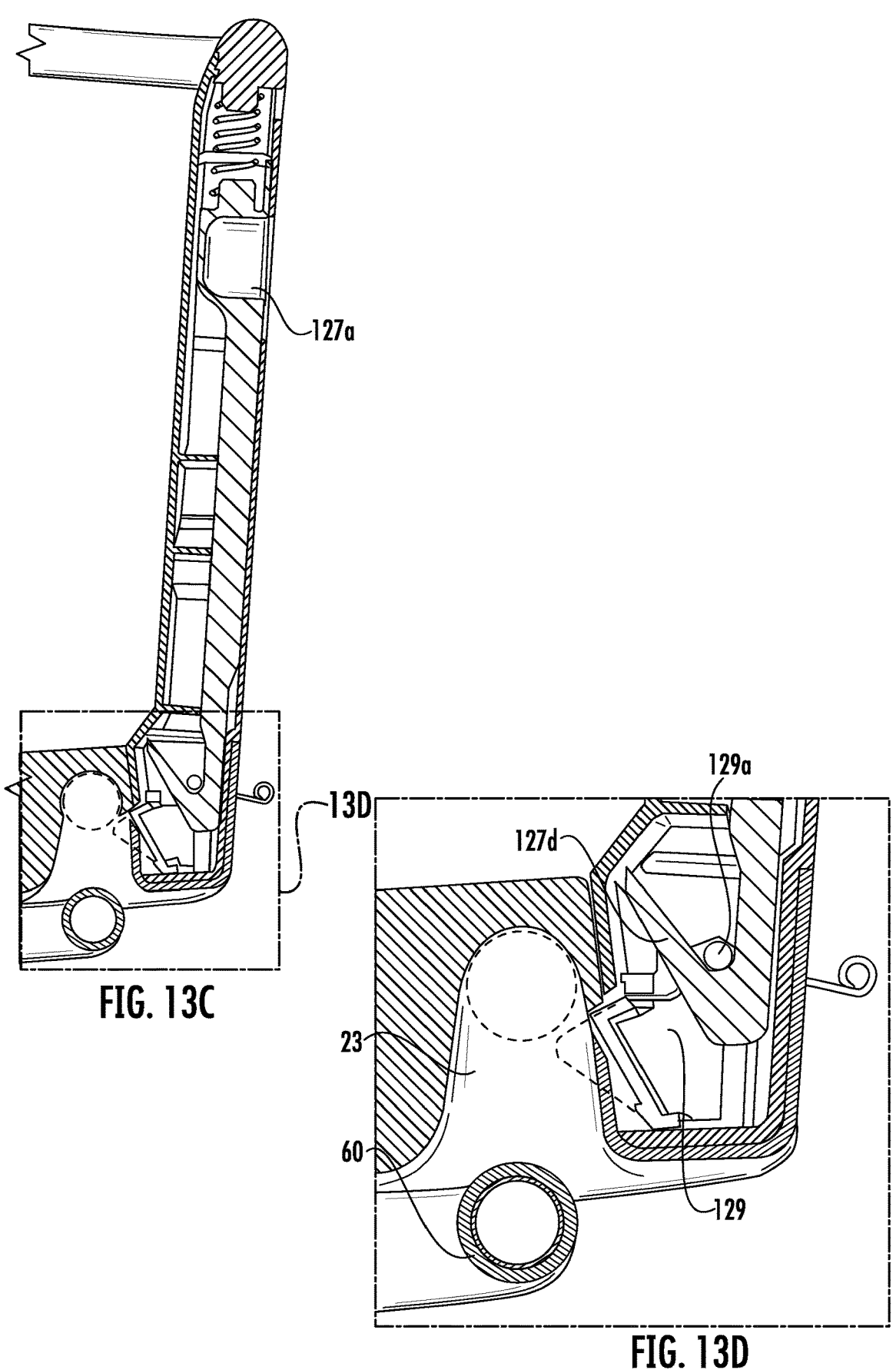
FIG. 13C is another side cross-sectional view of the end housing of FIG. 13B in a second state.
FIG. 13D is a magnified view of region "13D" from FIG. 13C.

As shown in more detail in FIGS. 13C and 13D, a cam 127d is provided on the connector body 127b and the cam 127d engages with a portion of the pivoting latch 129.

Specifically, the cam 127d can be configured to wrap around a post or pin 129a formed on the pivoting latch 129. In one aspect, the handle 127a, the connector body 127b, and the cam 127d are integrally formed with each other.

Figure 13E:
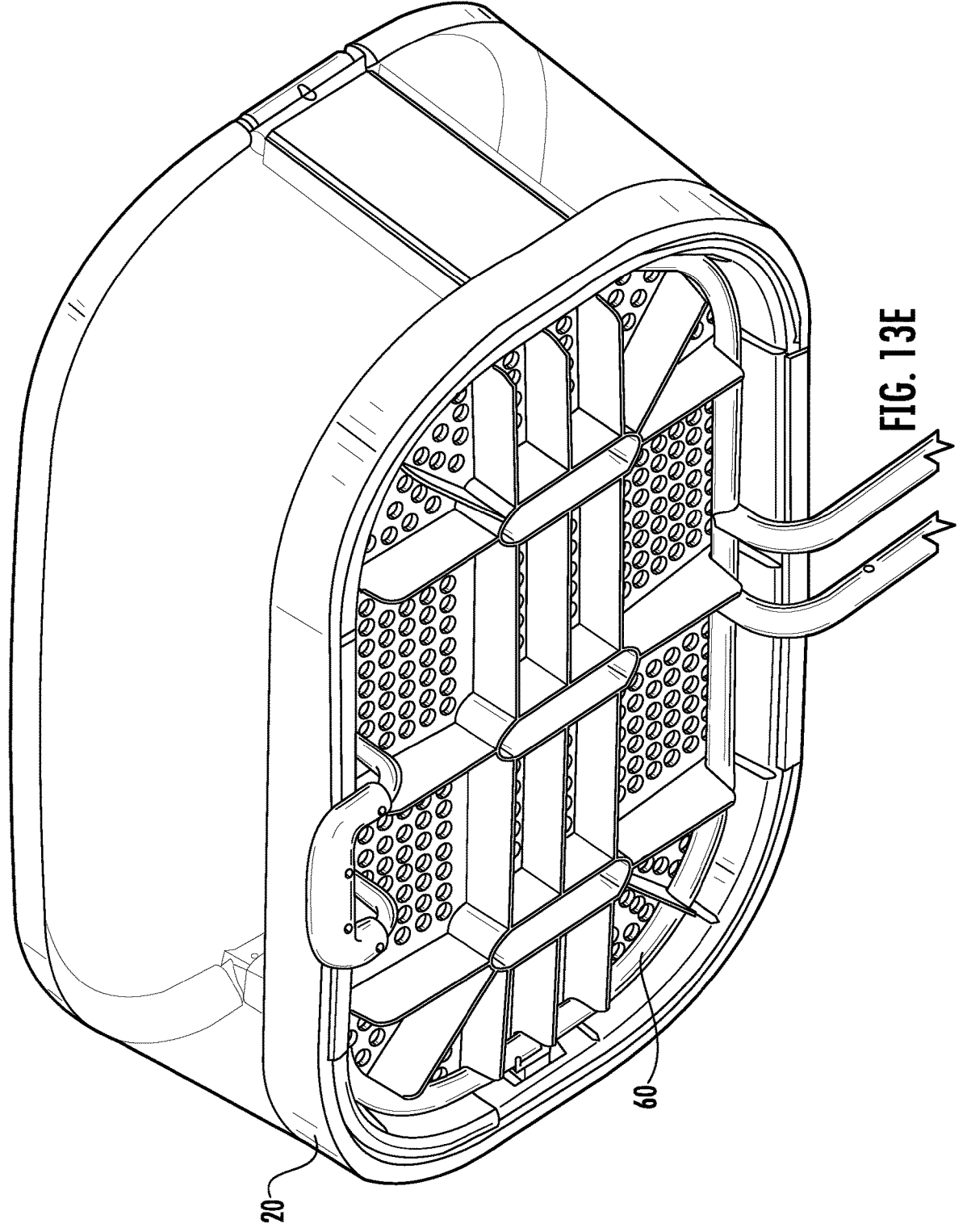
FIG. 13E is a bottom view of the bassinet and bassinet support.

An underside view of the bassinet 20 and the bassinet support 60 is provided in FIG. 13E to illustrate how the bassinet 20 is secured on the bassinet support 60.

Figure 11A:
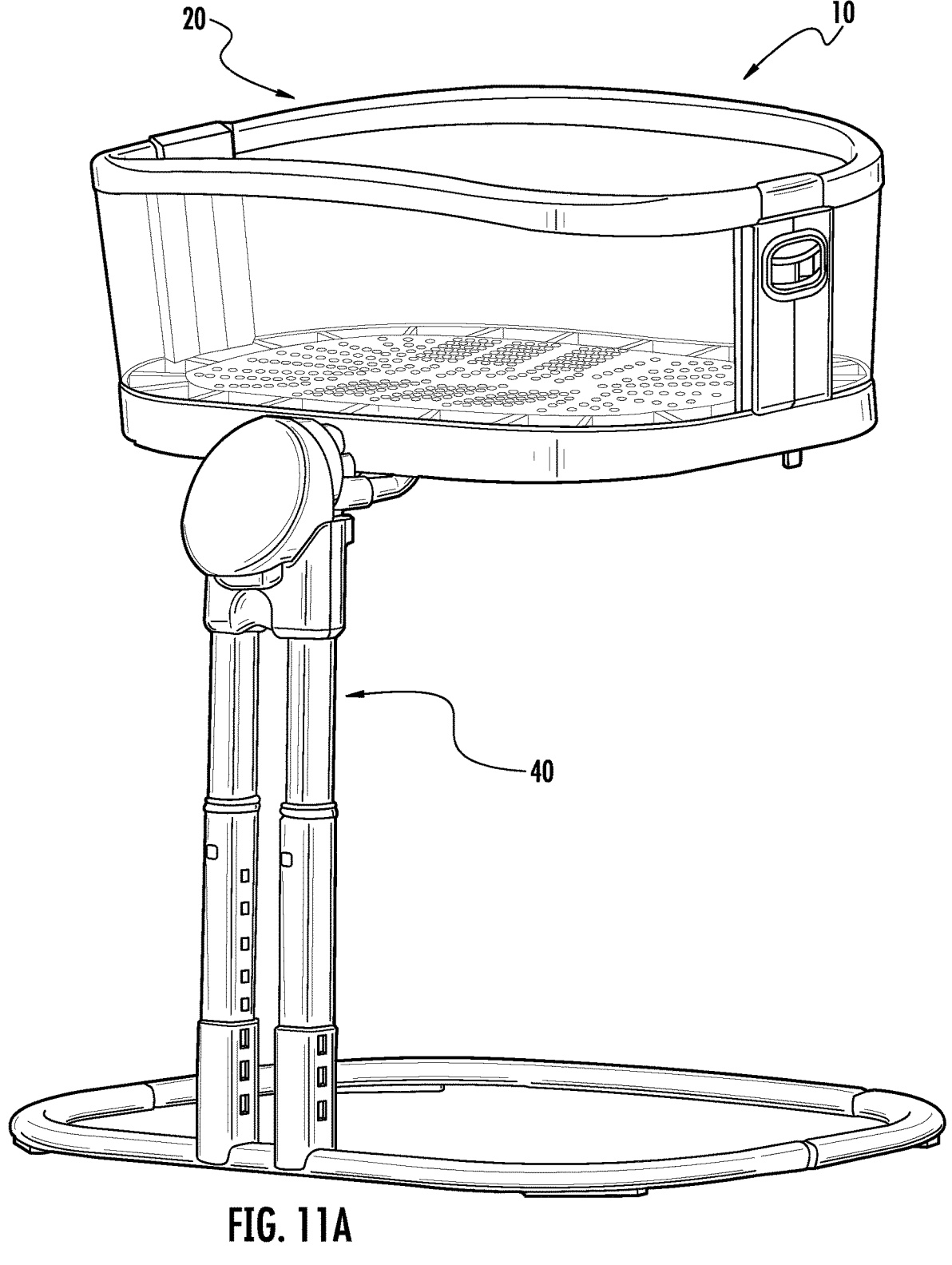
FIG. 11A is a perspective view of a bassinet assembly according to another aspect.
Figure 11B:
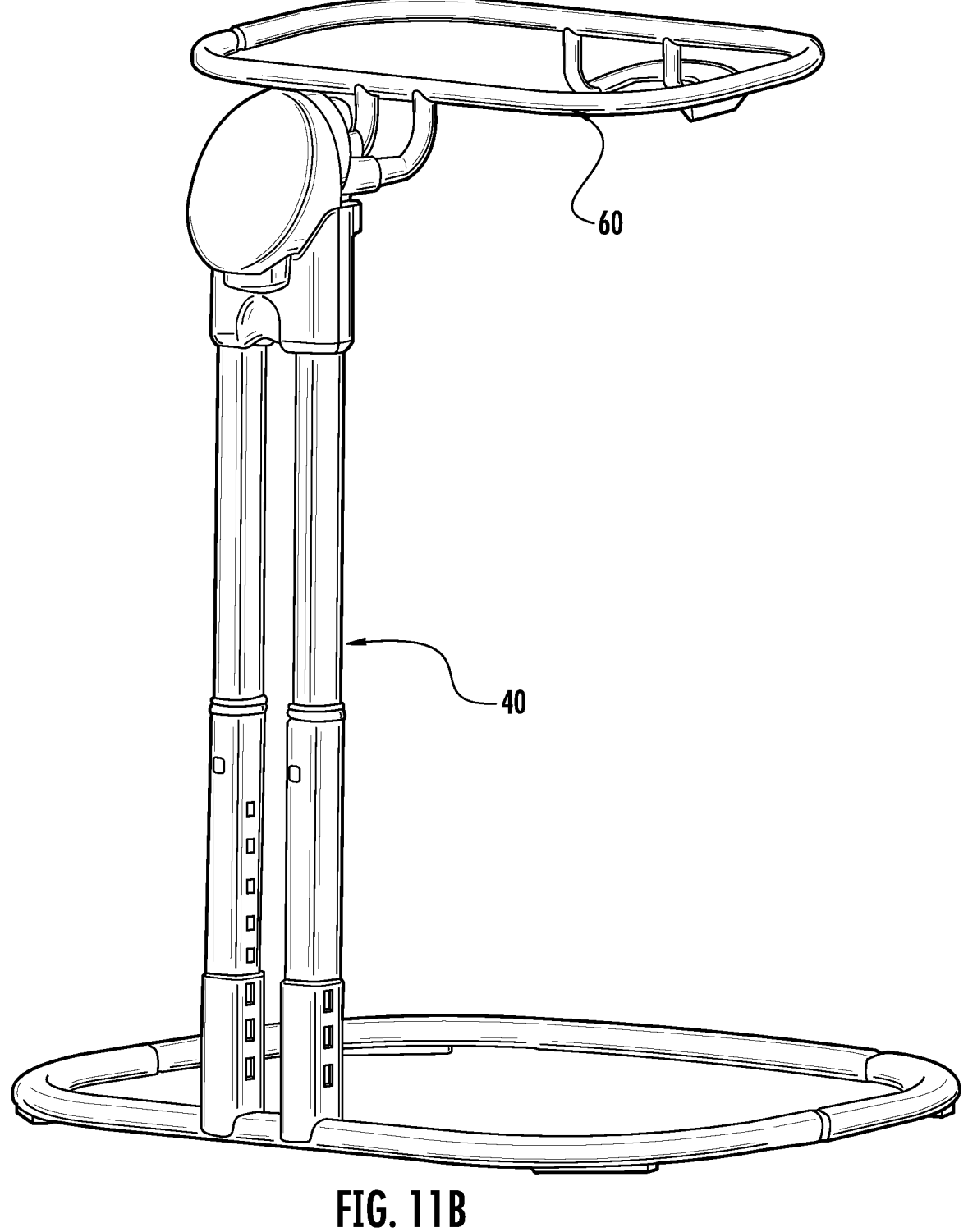
FIG. 11B is a perspective view of a frame of the bassinet assembly of FIG. 11A with the bassinet removed.
Figure 11C:
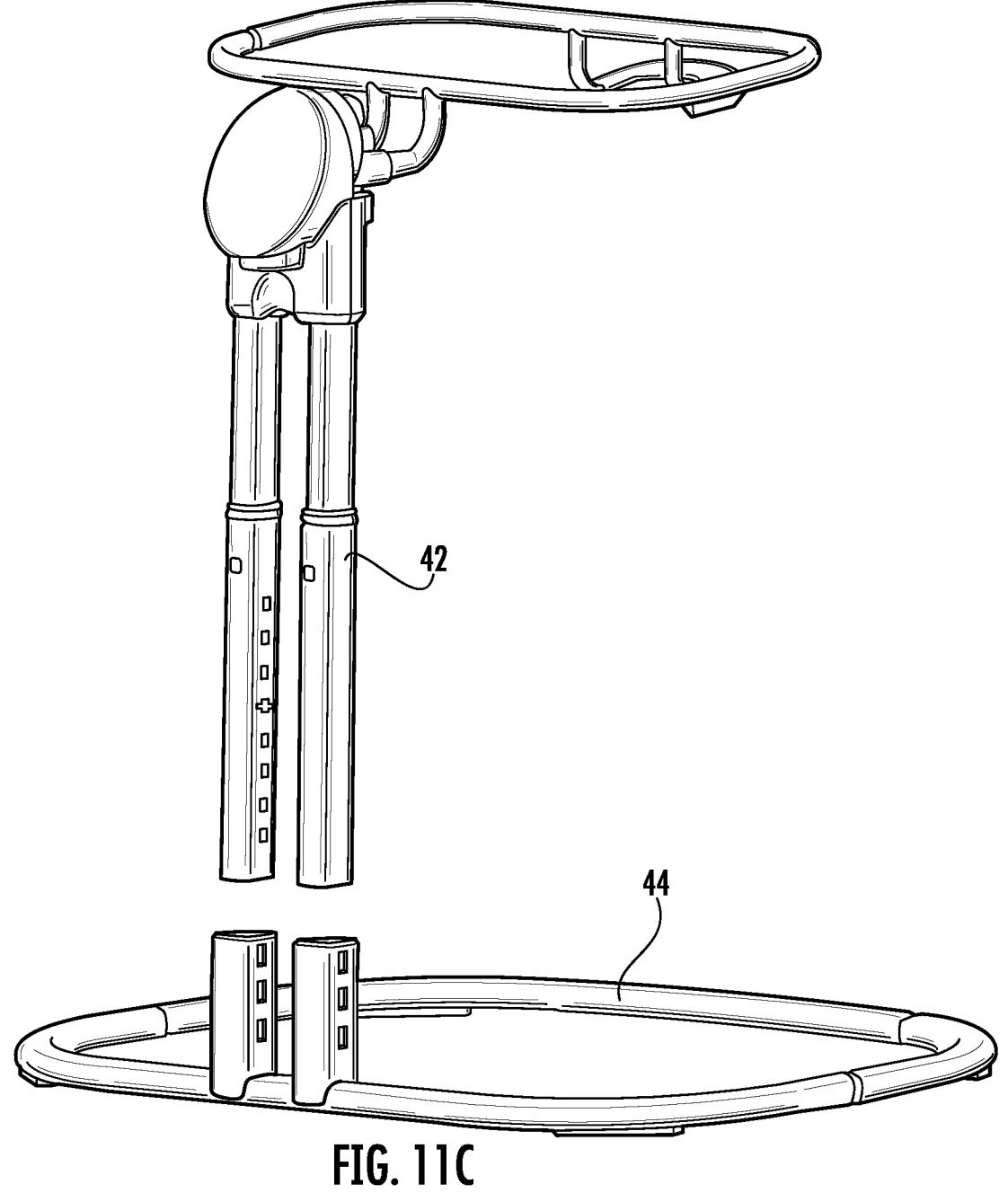
FIG. 11C is a perspective view of the bassinet assembly of FIGS. 11A and 11B with an upright portion removed from a base portion.
Figure 11D:
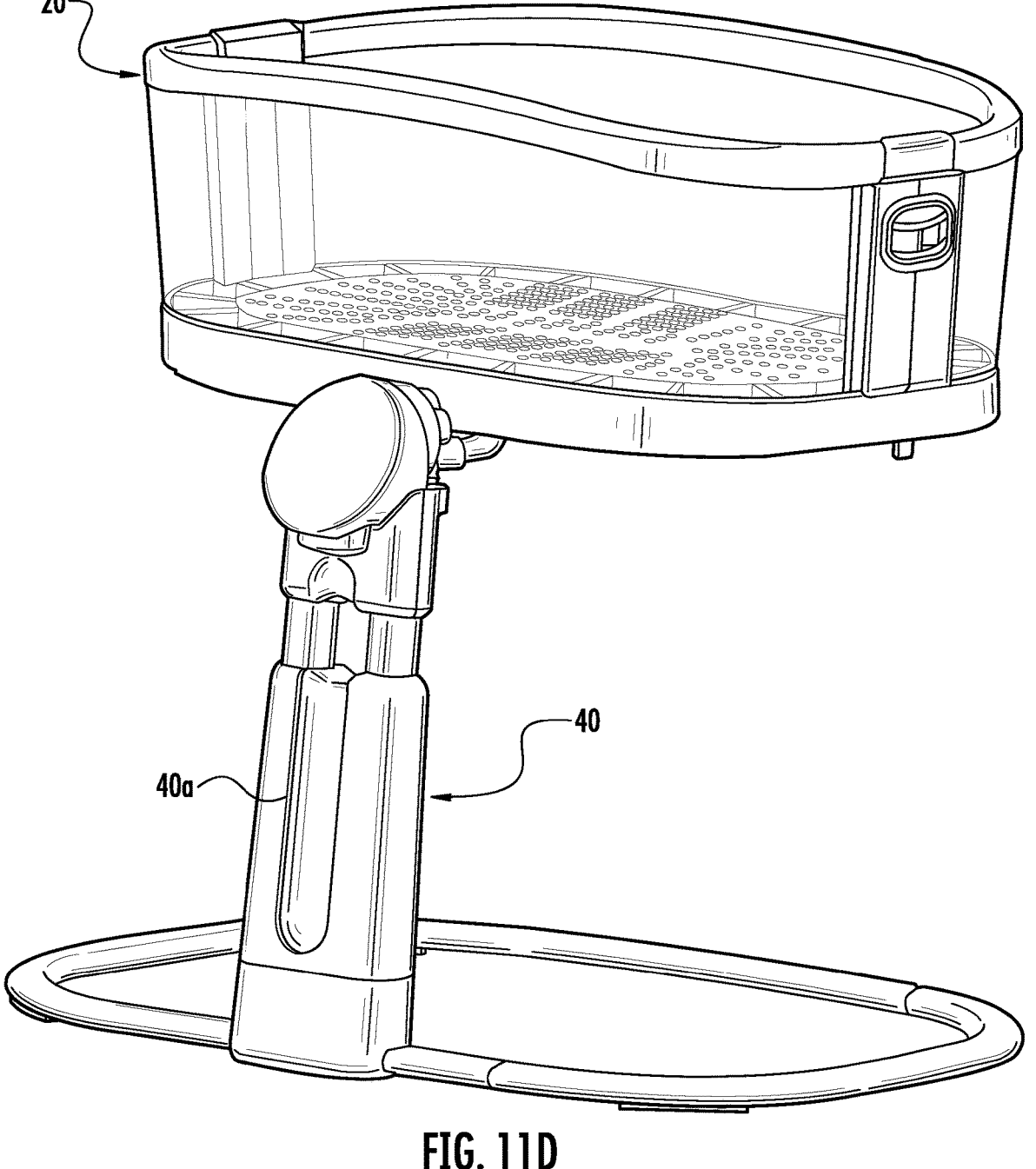
FIG. 11D is another perspective view of the bassinet assembly of FIG. 11A in a lower position with a frame shell enclosing a bottom portion of the frame.
Figure 11E:
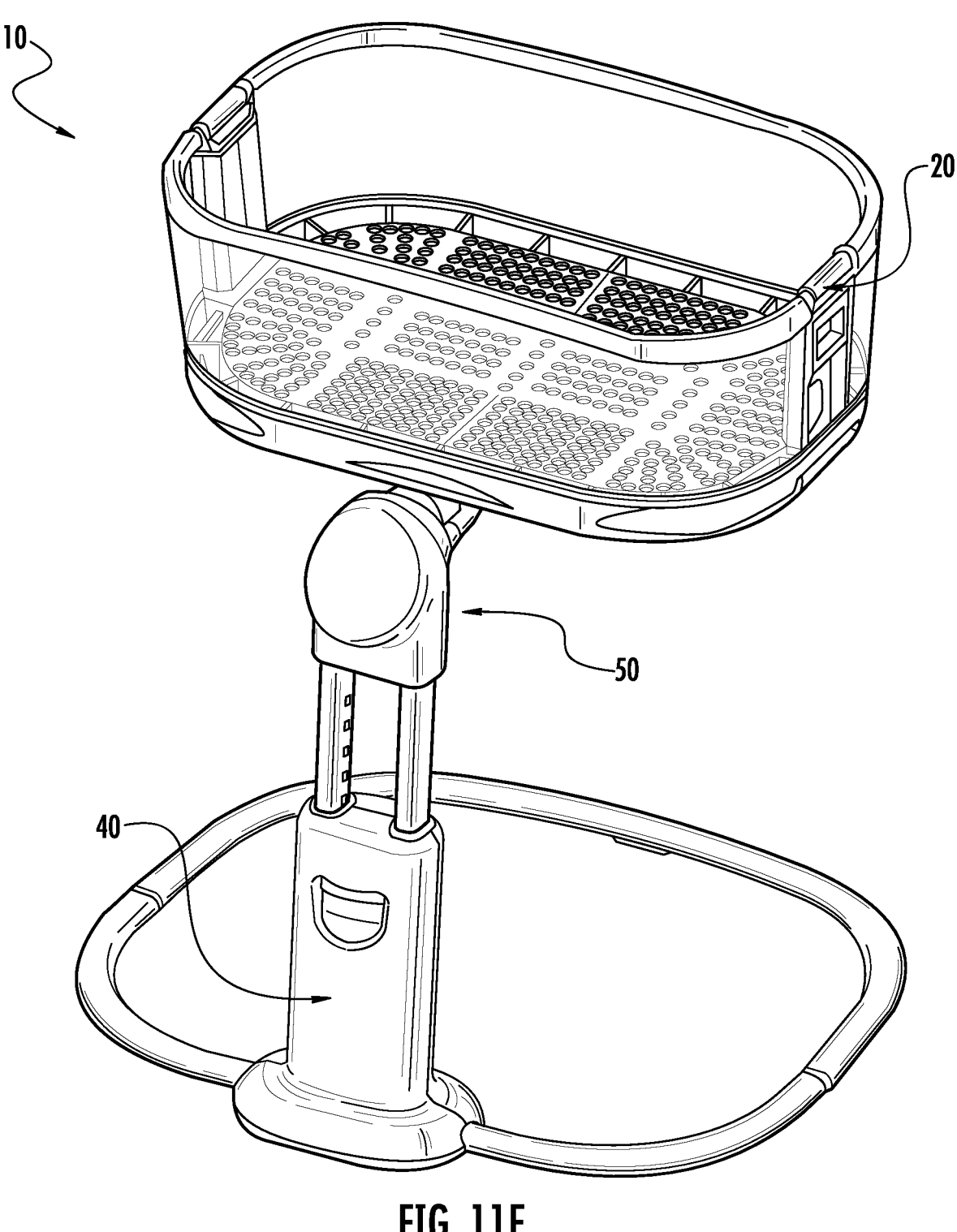
FIG. 11E is another perspective view of a bassinet assembly.
Figure 11F:
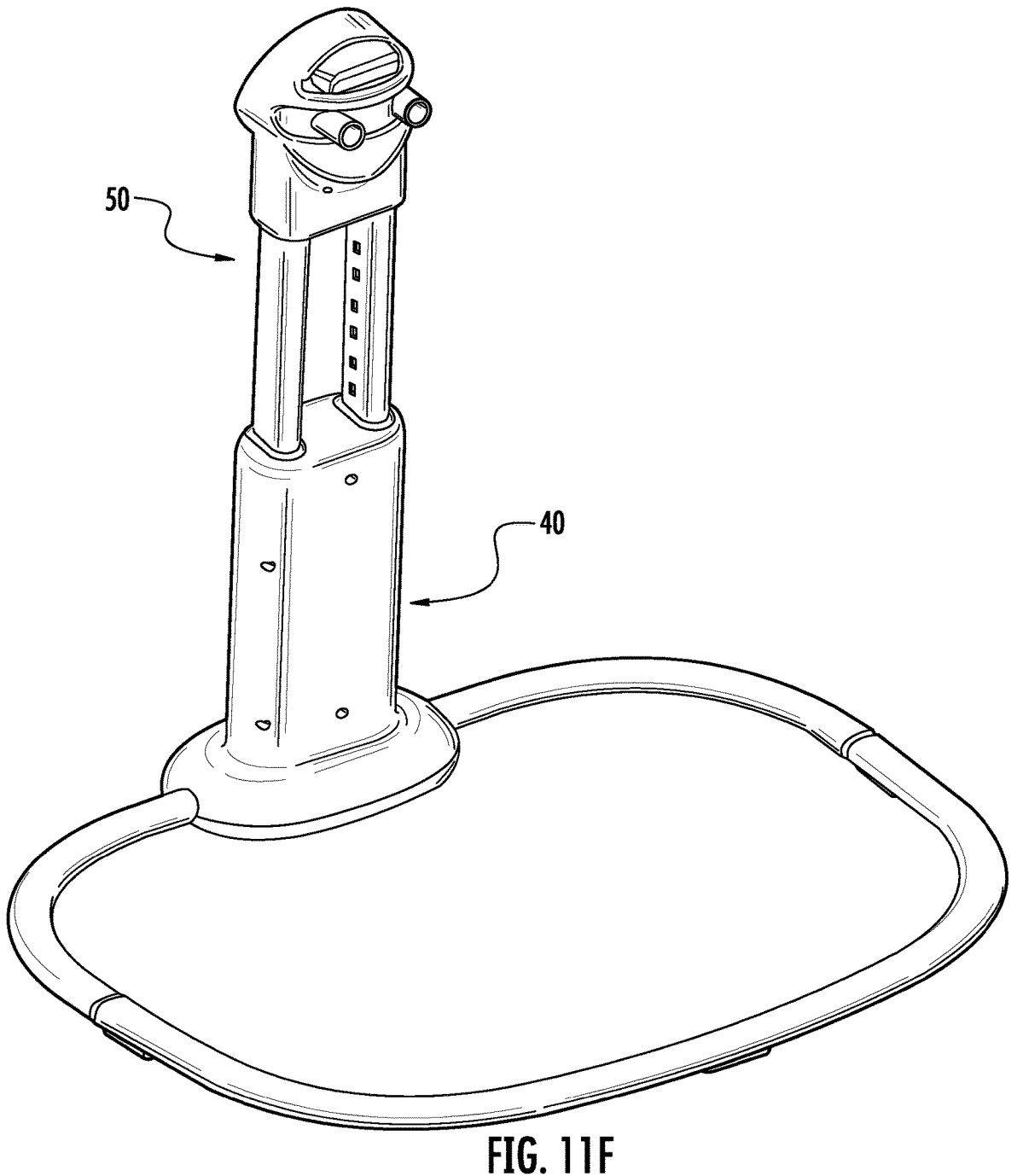
FIG. 11F is a perspective view of a frame of the bassinet assembly of FIG. 11E with the bassinet removed.

FIGS. 11A-11D disclose additional features of a bassinet assembly 10 that includes the bassinet 20, the frame 40, and the bassinet support 60. The bassinet 20 is adjustable to multiple height positions, as shown in FIGS. 11A and 11B. The frame 40 is shown in a lower position in FIG. 11A with the bassinet 20 attached to the frame 40. The frame 40 is shown in a raised position without the bassinet 20 in FIG. 11B. FIG. 11C shows further features of the frame 40. Specifically, the frame 40 includes both an upright portion 42 and a base portion 44. As used in this context, the term upright means generally vertically but not necessarily normal to a ground surface. FIG. 11D illustrates another configuration for the bassinet assembly 10 in which the frame 40 is in its lowest position. A frame shell 40a is shown in FIG. 11D that is configured to enclose a bottom portion of the frame 40. FIG. 11E illustrates another view of the bassinet assembly 10, and FIG. 11F illustrates the bassinet assembly 10 of FIG. 11E without the bassinet 20 or bassinet support 60.

Figure 14A:
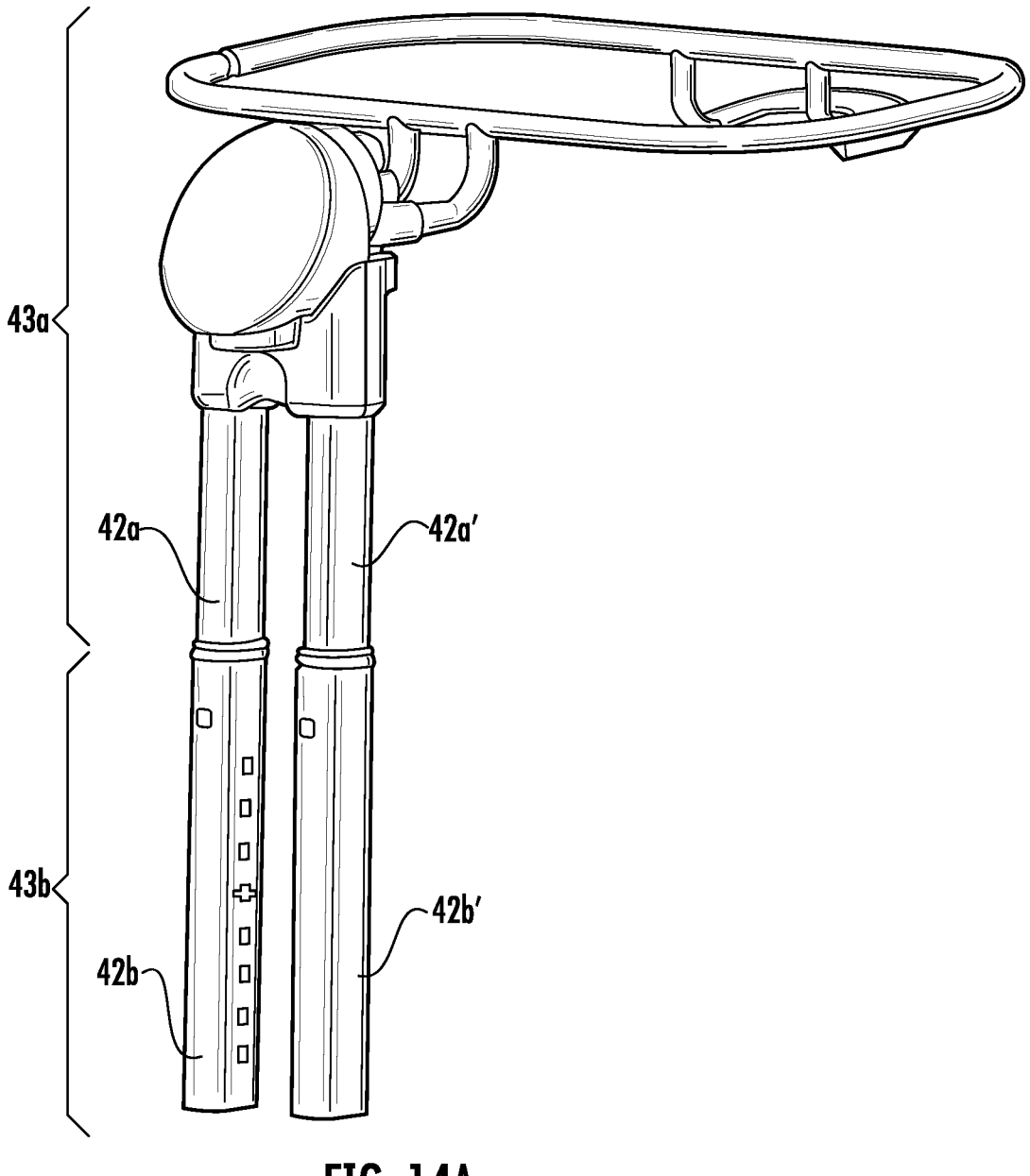
FIG. 14A is a perspective view of telescoping tubes of the bassinet frame.
Figure 14B:
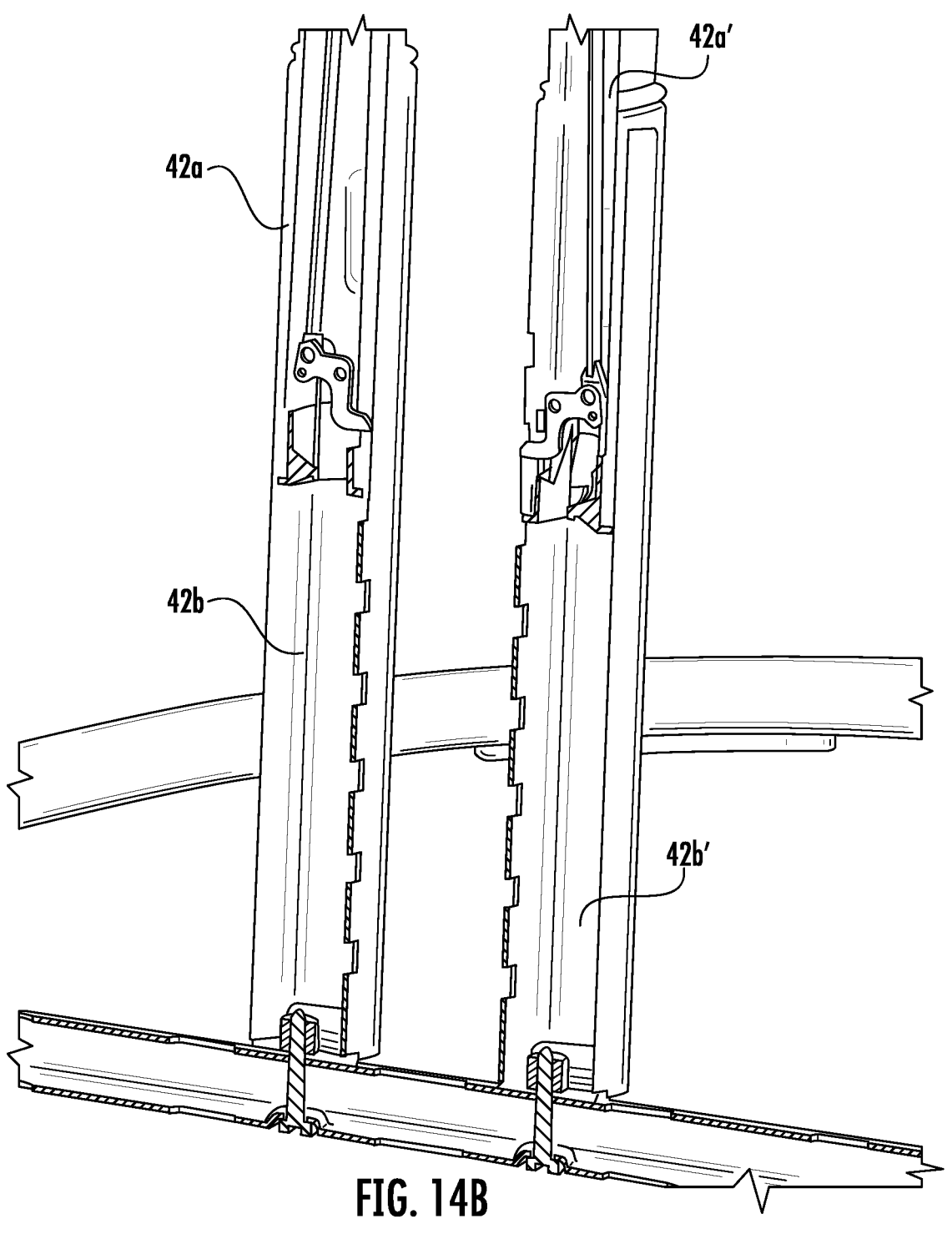
FIG. 14B is a magnified cross-sectional view of a lower region of the telescoping tubes of FIG. 14A.

FIGS. 14A-16C illustrate further aspects of height adjustment features of the present disclosure. As shown in FIG. 14A, the upright portion 42 of the frame 40 includes at least one upper telescopic tube 42a and at least one lower telescopic tube 42b. As shown in the drawings, the at least one upper telescopic tube 42a can include two tubes 42a, 42a' and the at least one lower telescopic tube 42b includes two tubes 42b, 42b'. Collectively, the upper half of the upright portion 42 of the frame is identified as the upper telescopic portion 43a in FIG. 14A and the bottom half is identified as the lower telescopic portion 43b in FIG. 14A. The height adjustable feature of the frame 40 generally occurs via telescopic motion between the upper telescopic portion 43a and the lower telescopic portion 43b. This aspect is shown in FIG. 14B, which shows a cross-sectional view of an interface between these components. Adjustment movement or motion occurs between the at least one upper telescopic tube 42a and the at least one lower telescopic tube 42b.

Figure 14C:
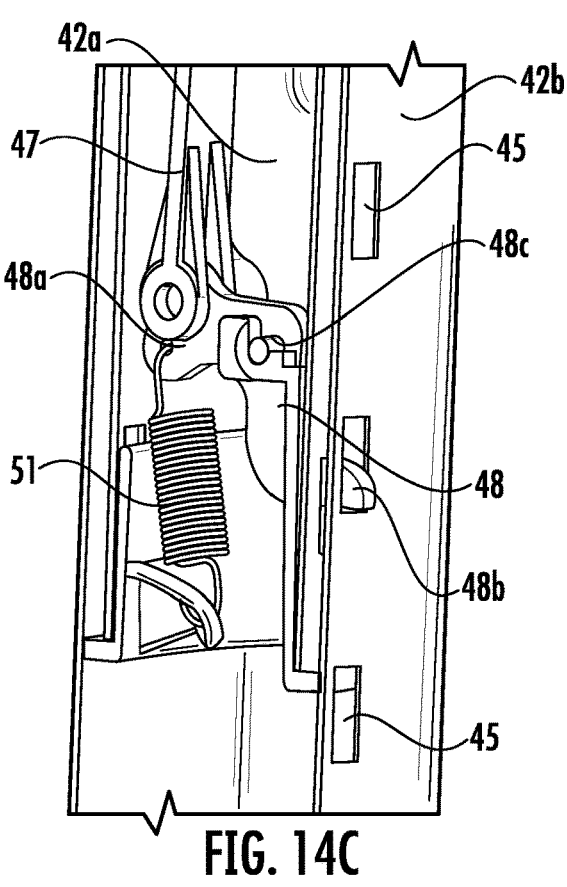
FIG. 14C is a magnified cross-sectional view of an interface between an upper tube and a lower tube of the bassinet frame in a first state.
Figure 14D:
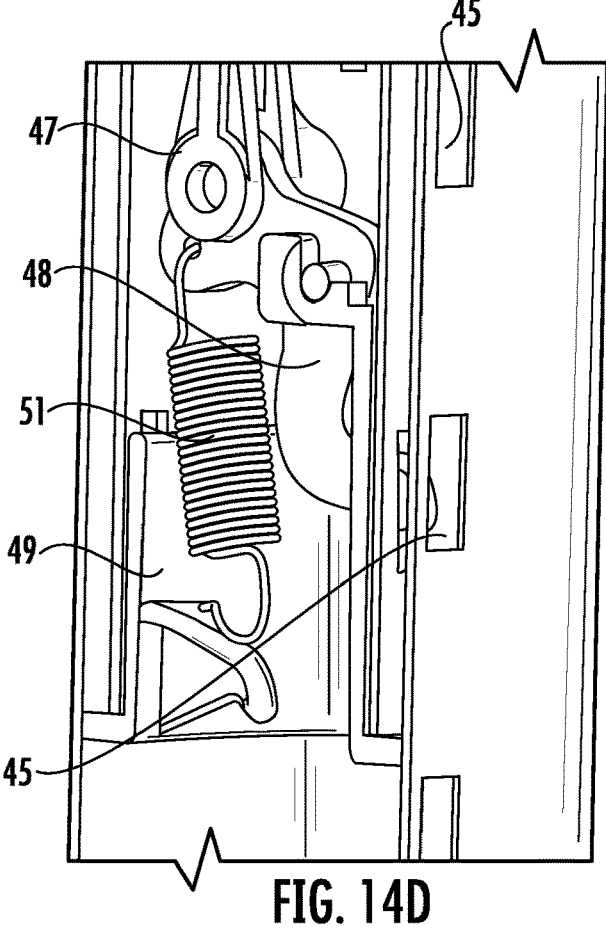
FIG. 14D is a magnified cross-sectional view of the interface between the upper tube and the lower tube of the bassinet frame in a second state.

Additional details regarding the interface between the upper telescopic portion 43a and the lower telescopic portion 43b are shown in FIGS. 14C and 14D. FIG. 14C is a sectional of the upper telescopic portion 43a and the lower telescopic portion 43b. This configuration includes a release connector 47 which is connected to an actuator 68 at one end 47a, as described in more detail herein. The release connector 47 is attached to a pawl 48 at another end. The pawl 48 includes a first end 48a connected to the release connector 47 and a second end 48b defining a projection extending through height adjustment slots 45 of the lower telescopic tube 42b. A spring 51 is attached at one end to the pawl 48 and is anchored or secured at a second end to a support structure 49 within the upper telescopic tube 42a.

Figures 15A, 15B:
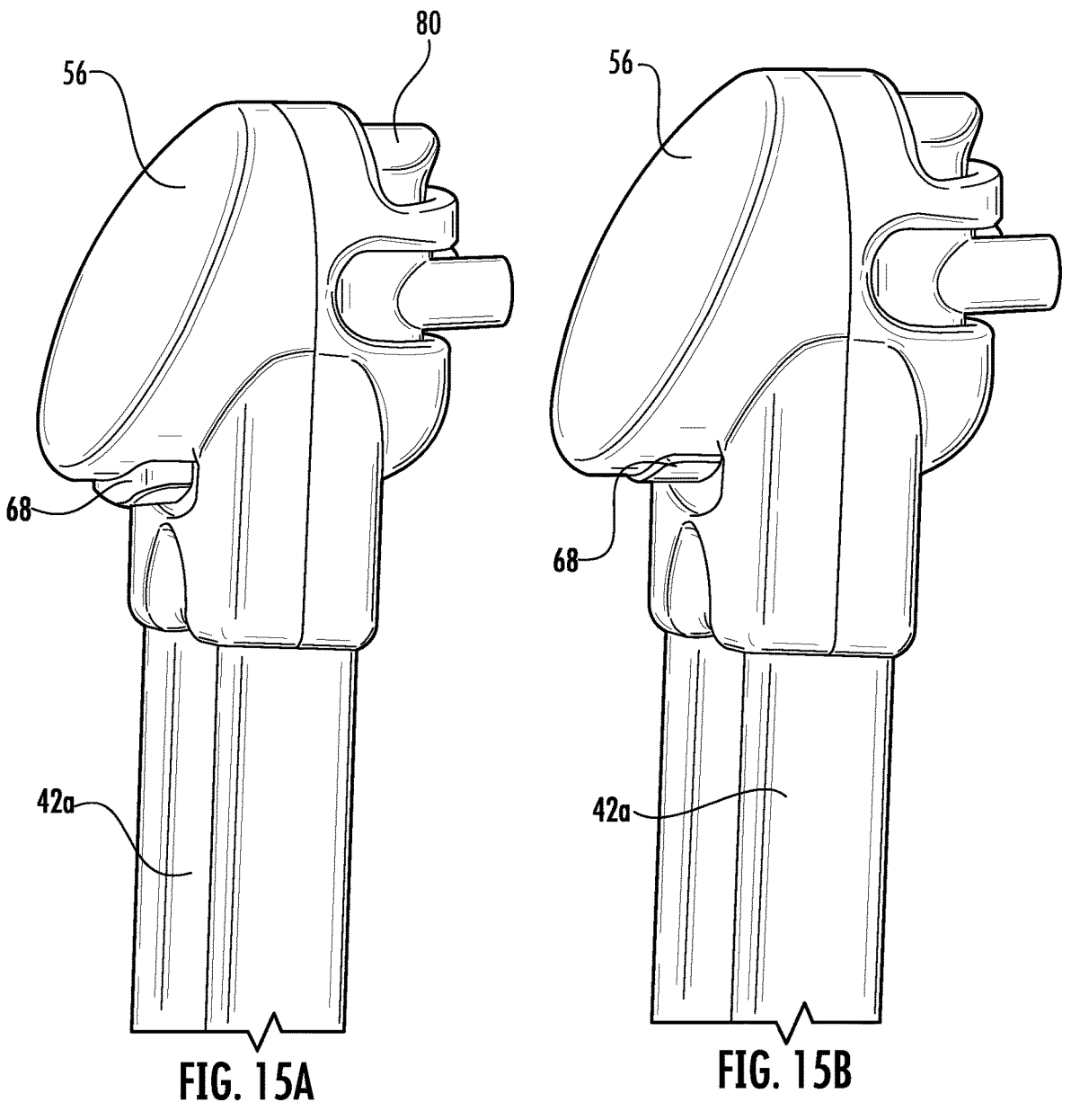
FIG. 15A is a side perspective view of a height adjustment housing in a first state.
FIG. 15B is a side perspective view of the height adjustment housing in a second state.

Adjustment or motion between the upper telescopic portion 43a and the lower telescopic portion 43b is provided by the pivoting pawl 48 in the upper telescopic tube 42a. The pawl 48 pivots around the pivot pin 48c and is biased counterclockwise by the spring 51. The bias from spring 51 causes the pawl 48 to selectively pass through one of the slots 45 in the upper telescopic tube 42a. Engagement of the pawl 48 with these slots fixes the height of the frame 40 by securing the upper telescopic tube 42a with the lower telescopic tube 42b. To adjust the height between the upper telescopic portion 43a and the lower telescopic portion 43b, the pawl 48 is rotated clockwise via engagement with actuator 68, which disengages the pawl 48 from the slots 45 in the upper telescopic tube 42a. Pulling or actuation of the release connector 47 drives the pawl 48 out of disengagement with the slots 45. The upper telescopic portion 43a attaches to housing 56 formed at the top of the frame 40, as shown in FIGS. 15A and 15B. The housing 56 includes the height adjustment latch or actuator 68, which is shown in the resting or downward position in FIG. 15A and is shown in the engaged or upward position in FIG. 15B. As shown in FIGS. 15A and 15B, the same housing 56 can include the sway lock interface 80, which controls locking and unlocking of the sway mechanism 50, as well as the height adjustment actuator 68, which adjusts a height of the bassinet assembly.

Figures 16A, 16B, 16C:
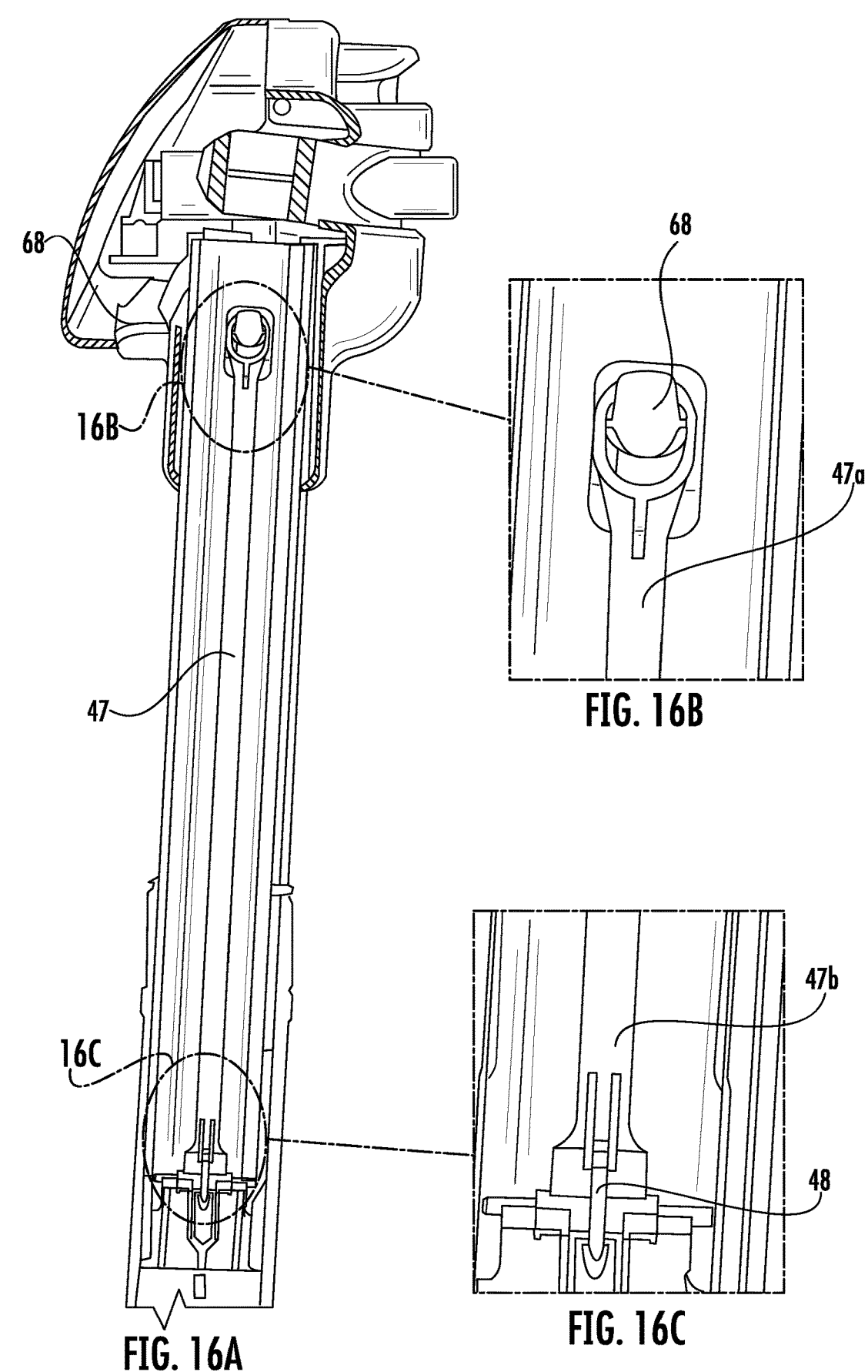
FIG. 16A is a side cross-sectional view of one aspect of the height adjustment housing.
FIG. 16B is a magnified view of portion "16B" from FIG. 16A showing an upper portion of a release connector.
FIG. 16C is a magnified view of portion "16C" from FIG. 16A showing a lower portion of the release connector.

FIGS. 16A-16C illustrate further details of the latch 68 and its interface with the release connector 47. In one aspect, the latch 68 can include a crossbar or pin that extends through a loop or opening on the end of the release connector 47. As shown in these Figures, the release connector 47 provides a connection between the pawl 48 and the latch 68. When the latch 68 is pressed upward or otherwise engaged, a tension force is applied to the release connector 47, which is translated to a force to the pawl 48 causing the pawl 48 to rotate clockwise and disengaged from slots 45, thereby allowing height adjustment of the bassinet 20.

Figure 17A:
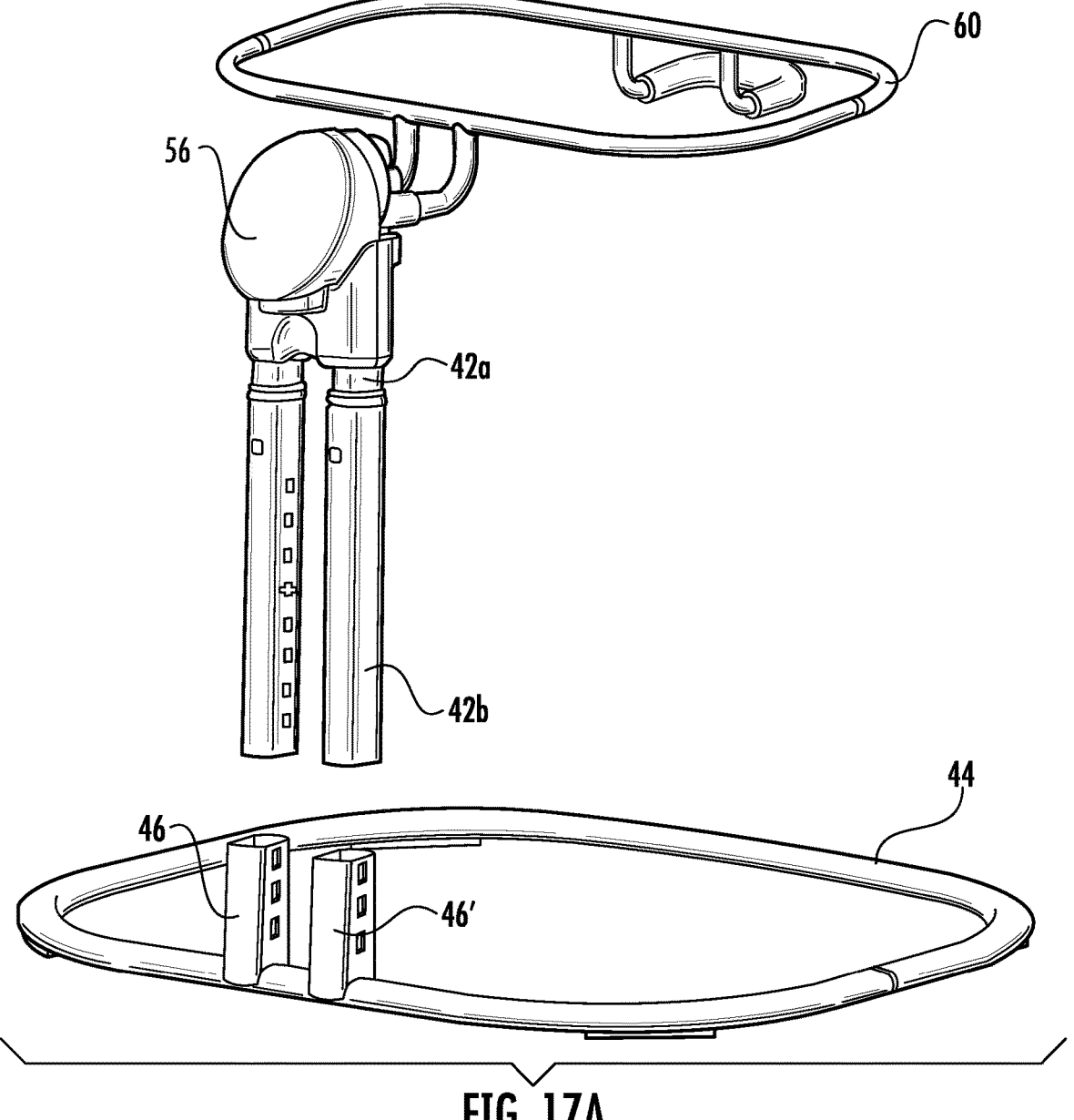
FIG. 17A is perspective view of the bassinet assembly in a partially assembled state.

To achieve a relatively small packaging size for shipping, the frame 40 is assembled to the base 44 using connection elements. As shown in FIG. 17A, in one aspect, the base 44 is secured to the remainder of the bassinet assembly 10 via sockets or tubes 46, 46' arranged on the base 44. In one aspect, the sockets 46, 46' are welded to the base 44. The sockets 46, 46' are configured to receive the lower telescopic tubes 42b, 42b'. One skilled in the art would understand that a single socket could be provided or more than two sockets could be provided, depending on the quantity of upright support elements or tubes.

Figure 17B:
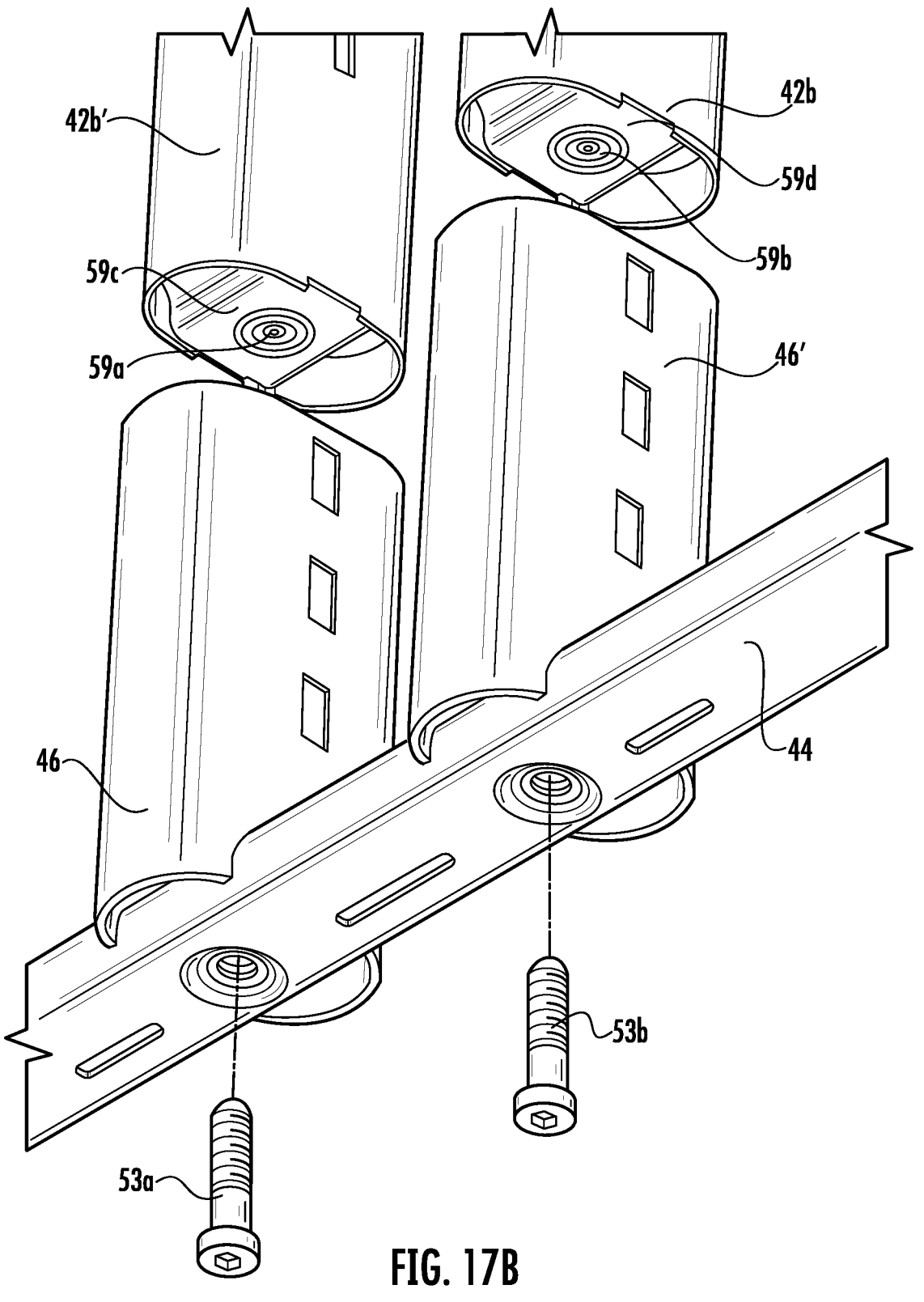
FIG. 17B is a bottom perspective view showing an interface between a base and an upright portion of the frame.
Figure 17C:
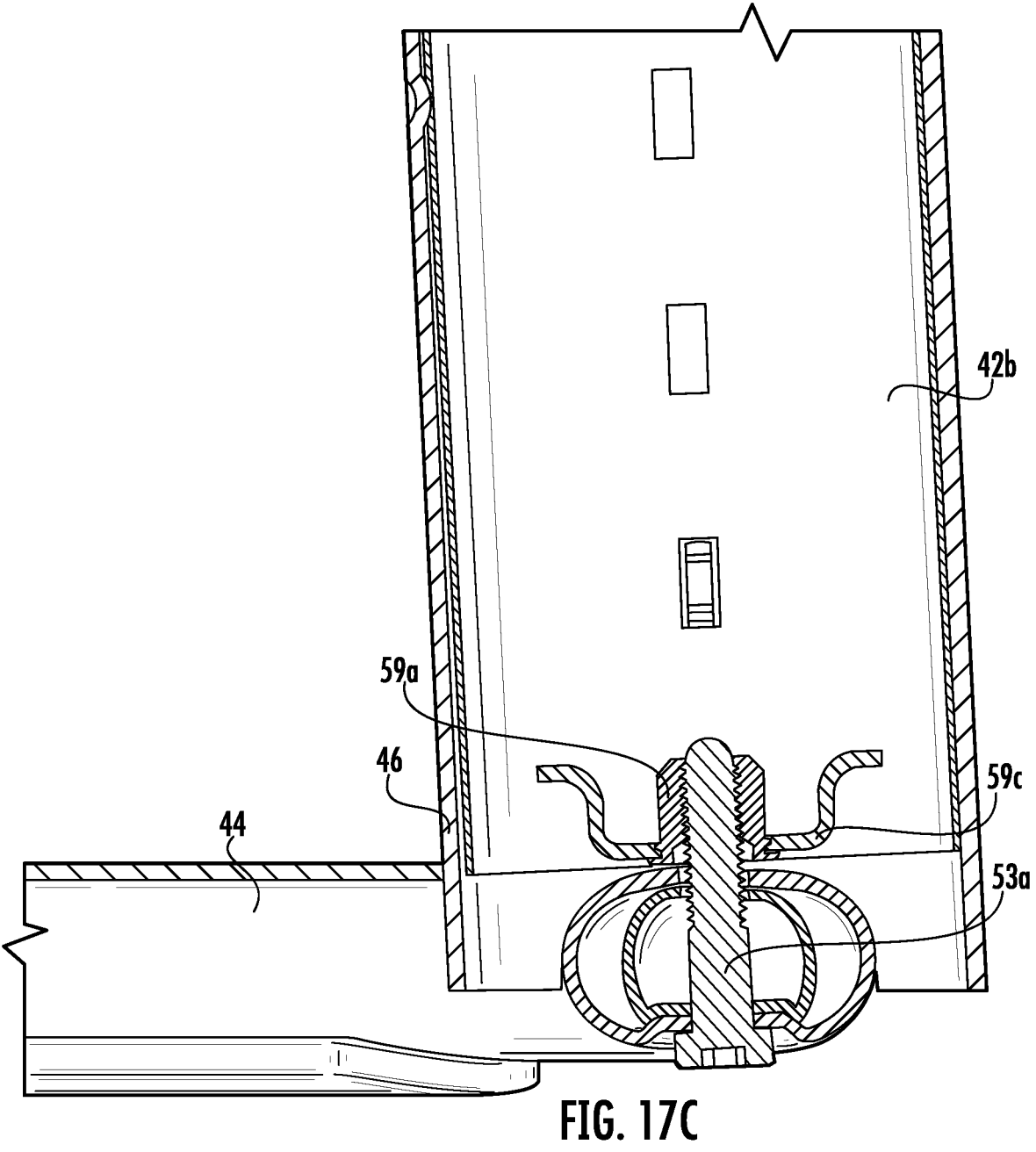
FIG. 17C is a cross-sectional view showing the interface between the base and the upright portion of the frame from FIG. 17B.
Figure 18A:
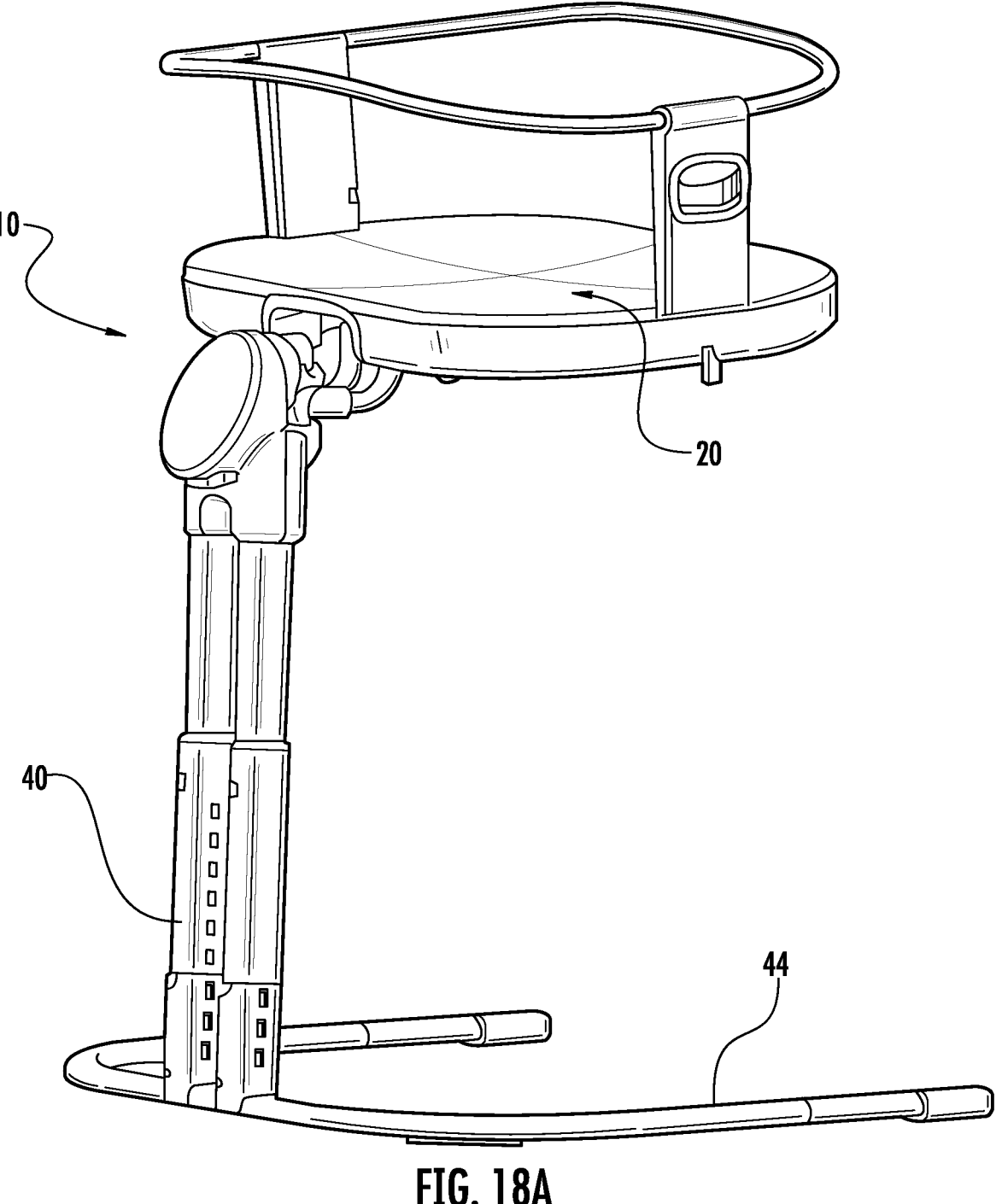
FIG. 18A is a perspective view of a bassinet assembly according to another aspect.
Figure 18B:
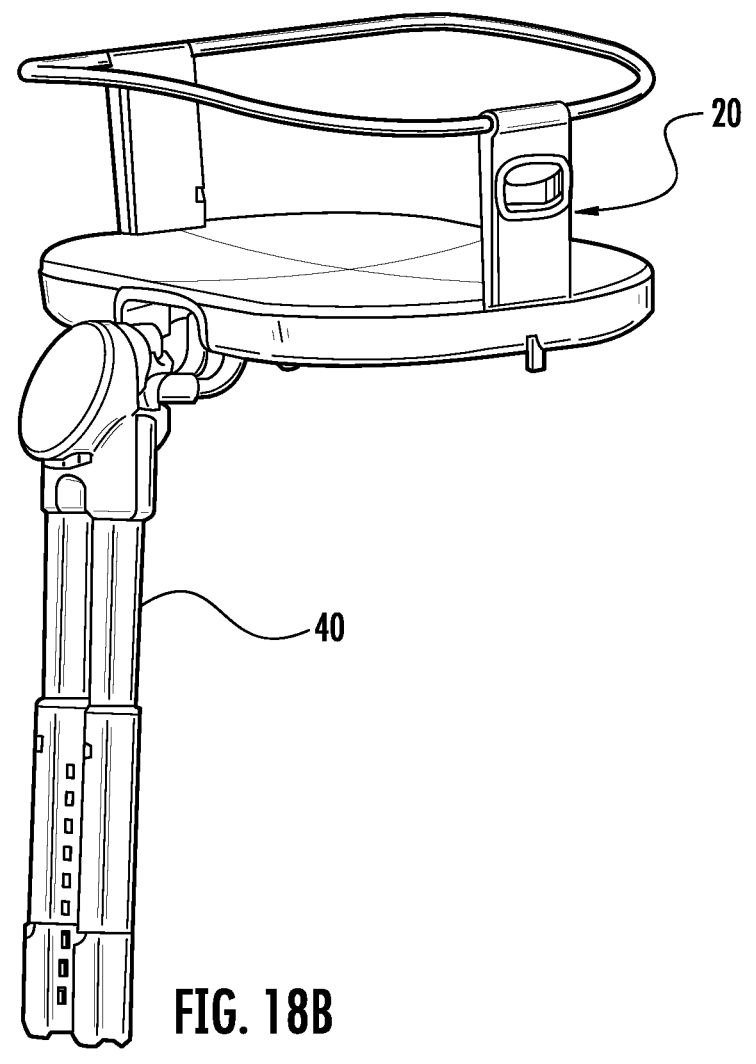
FIG. 18B is a perspective view of the bassinet assembly from FIG. 18A detached from a base.
Figure 18C:
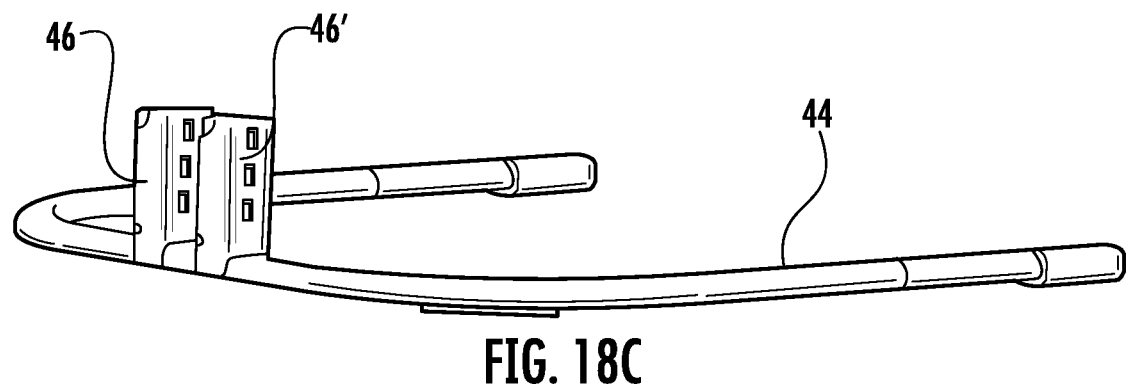
FIG. 18C is a perspective view of the base from FIG. 18A.
Figures 19A, 19B, 19C:
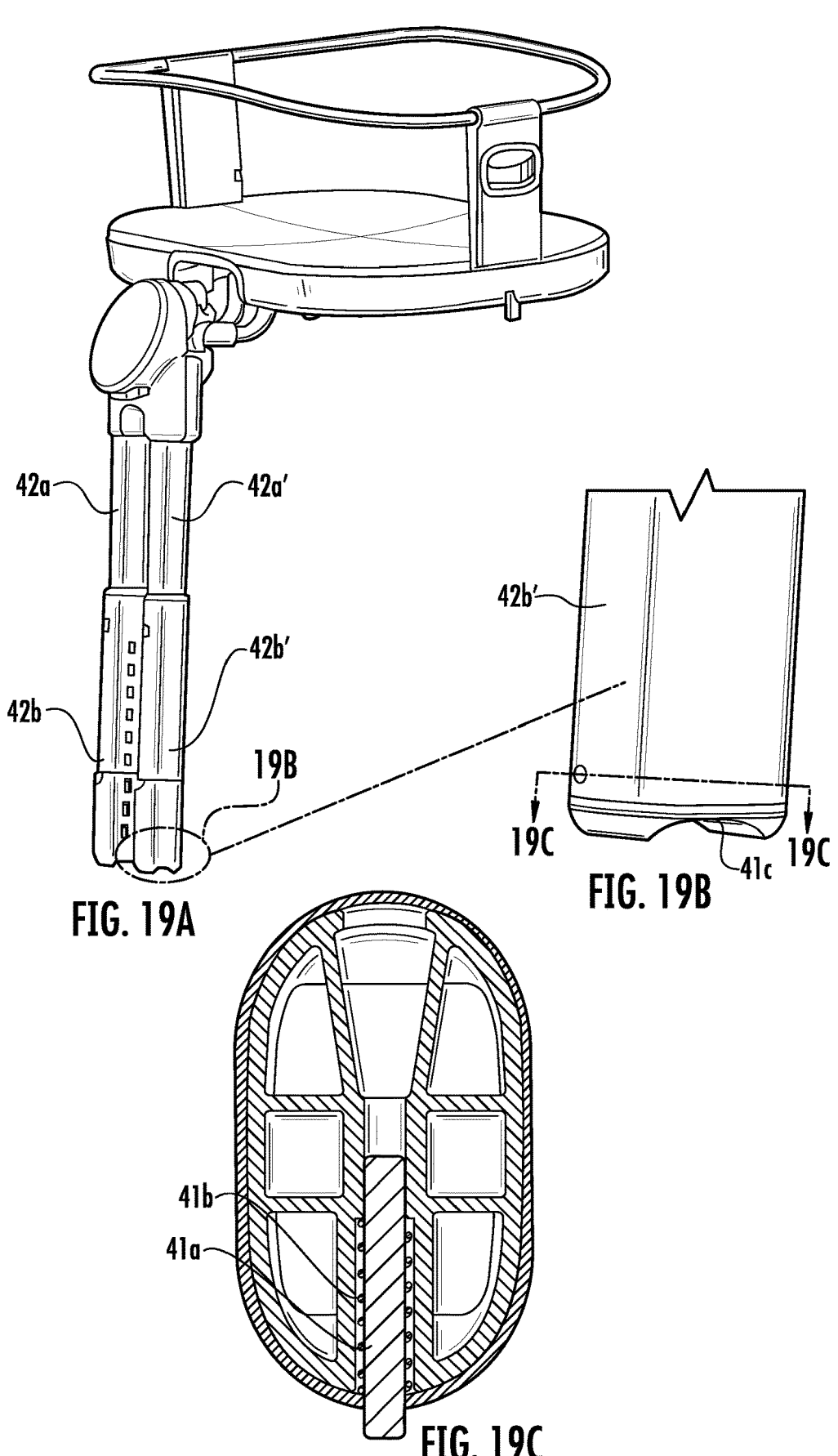
FIG. 19A is a perspective view of an upper portion of the bassinet assembly of FIG. 18A.
FIG. 19B is perspective view of portion "19B" from FIG. 19A.
FIG. 19C is a cross-sectional view along line "19C-19C" from FIG. 19B.

As shown in FIGS. 17B and 17C, fasteners 53a, 53b are provided that are configured to mate with nuts 59a, 59b. As shown in FIG. 17B, the fasteners 53a, 53b extend through the base 44 and into the sockets 46, 46'. In one aspect, the fasteners 53a, 53b are threaded bolts. The nuts 59a, 59b are arranged generally within the lower telescopic tubes 42b. In one aspect, plates 59c, 59d are secured within a hollow cavity of the lower telescopic tubes 42b. The plates 59c, 59d can be welded or otherwise secured to the lower telescopic tubes 42b. One skilled in the art would understand that the base 44 could include nuts 59a, 59b and the fasteners 53a, 53b can extend through a plate arranged on the lower telescopic tubes 42b. To keep the assembly rigid and to reduce racking, the customer installs two bolts 53a, 53b through the base 44 into the nuts 59a, 59b.

FIGS. 18A-21C, illustrate other aspects of the bassinet assembly 10. As described in more detail herein, the frame 40 can be easily assembled to the base 44. The lower portion of the frame 40 can include at least one tube, pipe, support, or other structure configured to engage with the base 44. The base 44 likewise includes at least one connector configured to matingly engage with a bottom portion of the frame 40. The frame 40 includes at least one upper tube 42a, 42a' and at least one lower tube 42b, 42b'. A bottom region of the lower tube 42b, 42b' can include a biased locking element or projection 41a. As shown in FIG. 19C, the biased locking element 41a can include a projection or pin that is biased by a spring 41b, such as a compression spring. The projection 41a is generally biased radially outward from the lower tube 42b, 42b'. As shown in FIG. 19B, the bottom surface of the lower tube 42b, 42b' includes a recess or curved surface 41c adapted to engage with the base 44.

Figures 20A, 20B:
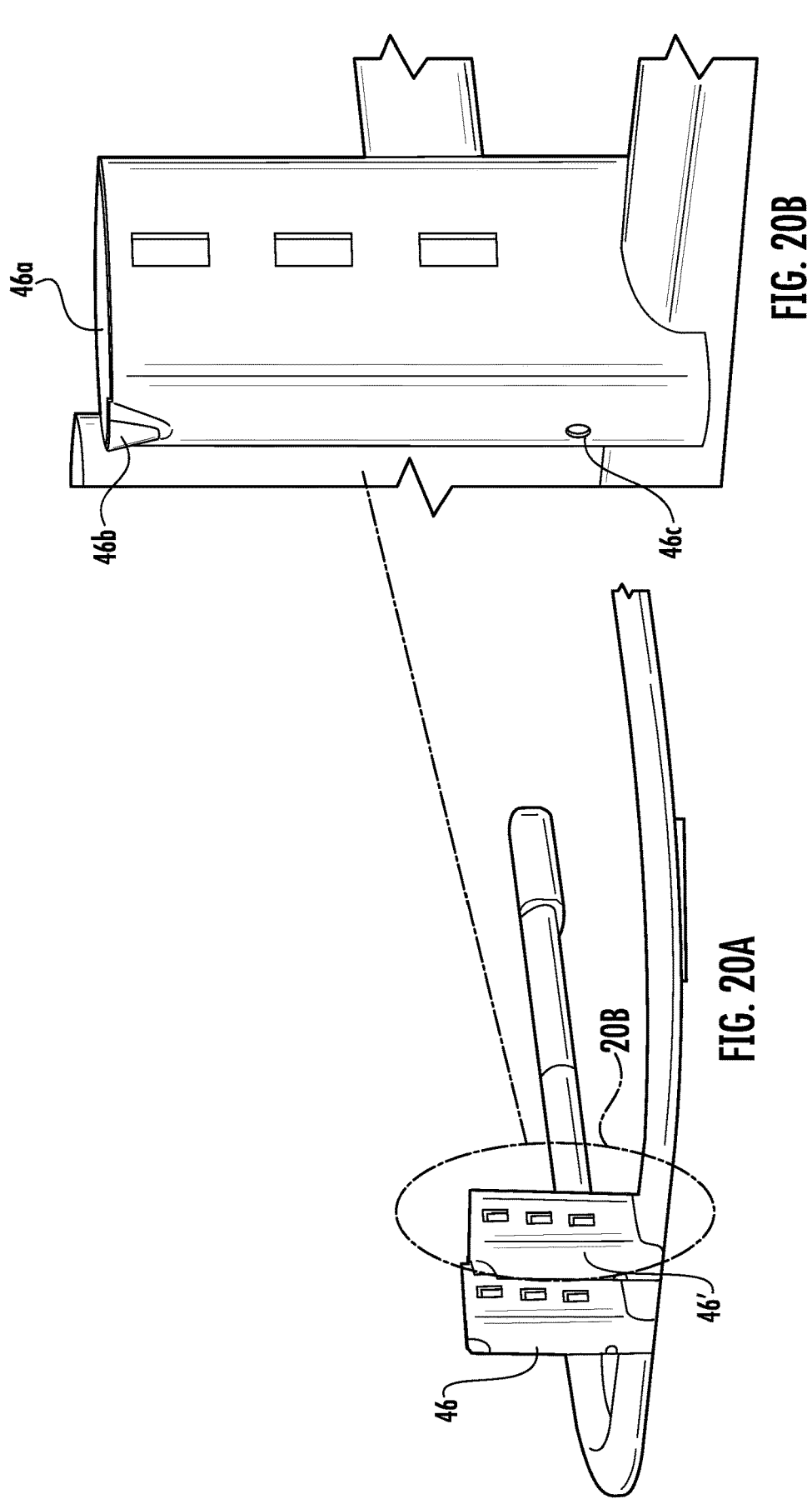
FIG. 20A is a perspective view of a portion of the base.
FIG. 20B is a magnified view of portion "20B" from FIG. 20A.

FIGS. 20A and 20B illustrate further aspects of the base 44. As shown in FIGS. 20A and 20B, at least one socket 46, 46' is attached with or formed with the base 44. The sockets 46, 46' each include a receptacle 46a generally dimensioned to receive a portion of the lower tube 42b, 42b'.

At an upper region of the sockets 46, 46', a projection lead-in feature 46b is provided that includes an enlarged opening dimensioned to receive the projection 41a. A lower region of the sockets 46, 46' includes an engagement hole, passage, or opening 46c that is configured to retain the projection 41a. One skilled in the art would understand that the receptacle 46a could be formed on the lower tube 42b, 42b' instead of the sockets 46, 46'. The receptacle 46a provides a telescoping configuration between the lower tube 42b, 42b' inside of the sockets 46, 46'.

Figures 21A, 21B, 21C:
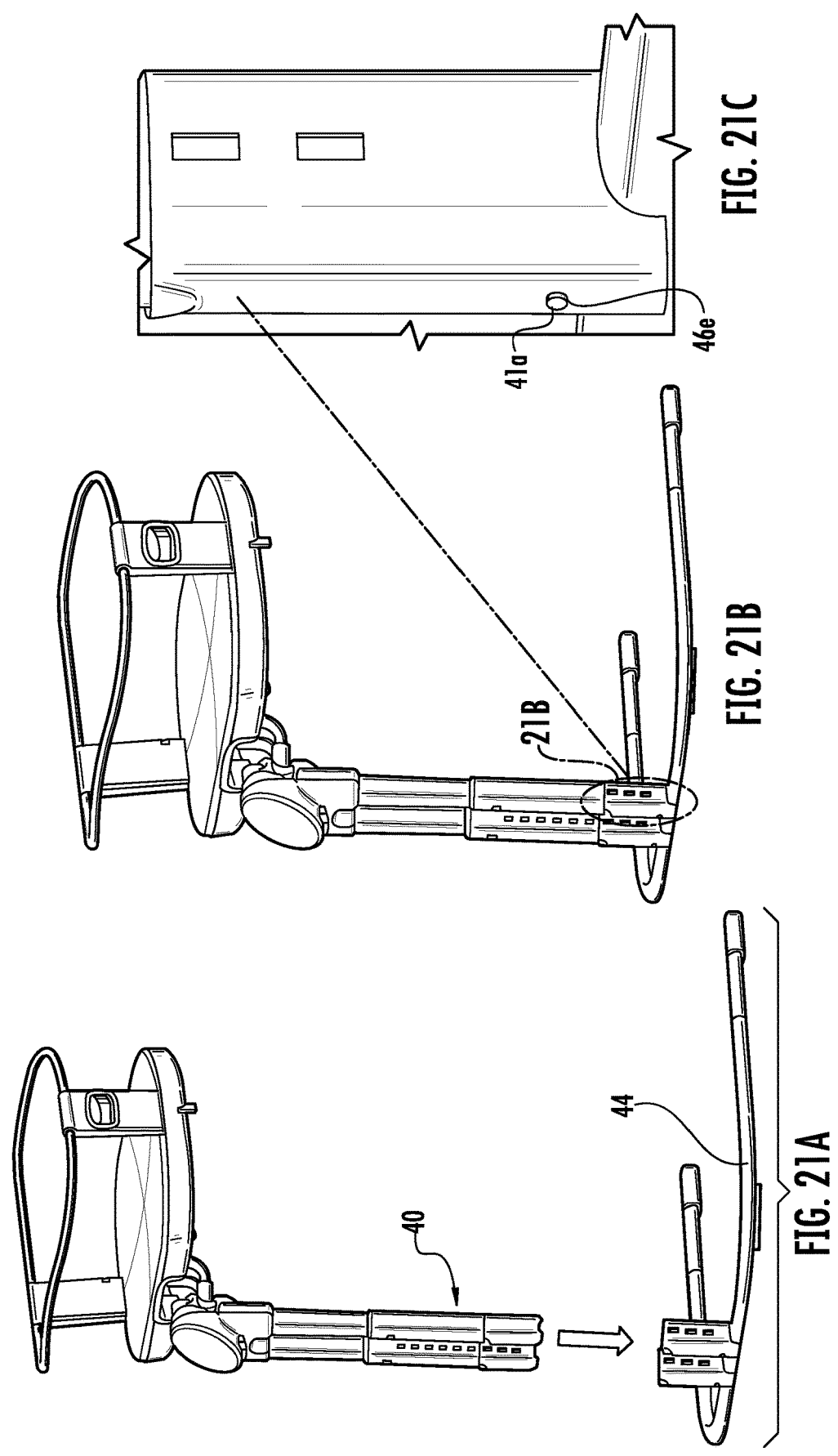
FIG. 21A is a perspective view of the frame and the base of the bassinet assembly prior to assembly.
FIG. 21B is a perspective view of the frame and the base of the bassinet assembly after assembly.
FIG. 21C is a magnified view of portion "21B" from FIG. 21C.

FIGS. 21A-21C illustrate the frame 40 and the base 44 being joined with each other. As shown in FIG. 21C, the projection 41a extends outward from the lower tube 42b, 42b' and through the hole 46c in the sockets 46, 46'. Once the projection 41a extends through the hole 46c, then the frame 40 and the base 44 are secured with each other. Locking or engagement features between the frame 40 and the base 44 can provided in a variety of different forms, so long as a mating or engagement interface is provided between the two components. For example, a spring may not be provided and instead a bolt can be configured to extend through an opening by a user to ensure that the frame 40 is fixed with the base 44. In another aspect, the mating interface can be provided by a cantilevered spring finger. Additionally, or alternatively, the projection 41a and the spring 41b could be combined into a single spring and pin component.

During assembly, the projection lead-in feature 46b, which can be formed on either the lower tubes 42b, 42b' or sockets 46, 46', provides a ramped surface for engagement with the projection 41a. As the lower tubes 42b, 42b' engage the sockets 46, 46', the projection 41a engages the lead-in feature 46b, thereby causing the projection 41a to retract. As the lower tubes 42b, 42b' engage within or around the sockets 46, 46', the projection 41a aligns with the engagement hole 46c, thereby allowing the projection 41a to extend into the engagement hole 46c.

The configurations disclosed in FIGS. 21A-21C allows a user to quickly assemble the bassinet base and frame by inserting the lower tubes 42b, 42b' or the sockets 46, 46' within the other component. The lead-in feature or ramped surface 46b has a profile that easily and quickly depresses the projection 41a until the projection 41a is aligned with the engagement hole 46c. Once the projection 41a extends through the engagement hole 46c, the frame 40 and the base 44 are secured to each other. In order to disassemble or remove the base 44 from the frame 40, a user simply just pushes the projection 41a inward such that it clears the engagement hole 46c.

Figure 22A:
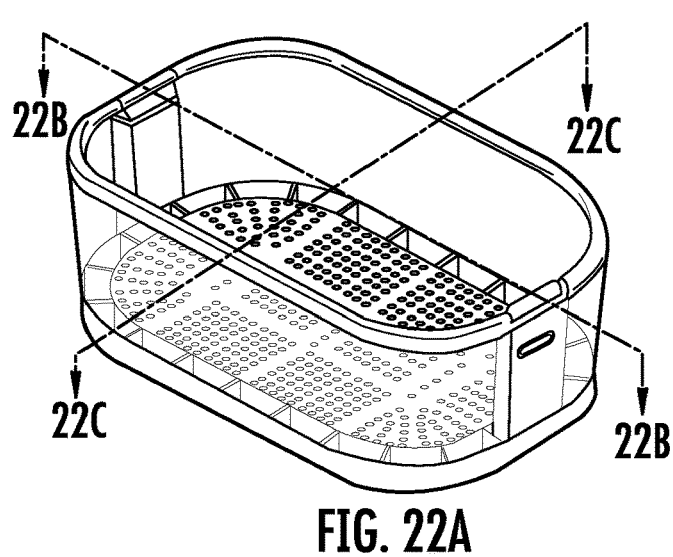
FIG. 22A is another perspective view of the bassinet.
Figure 22B:
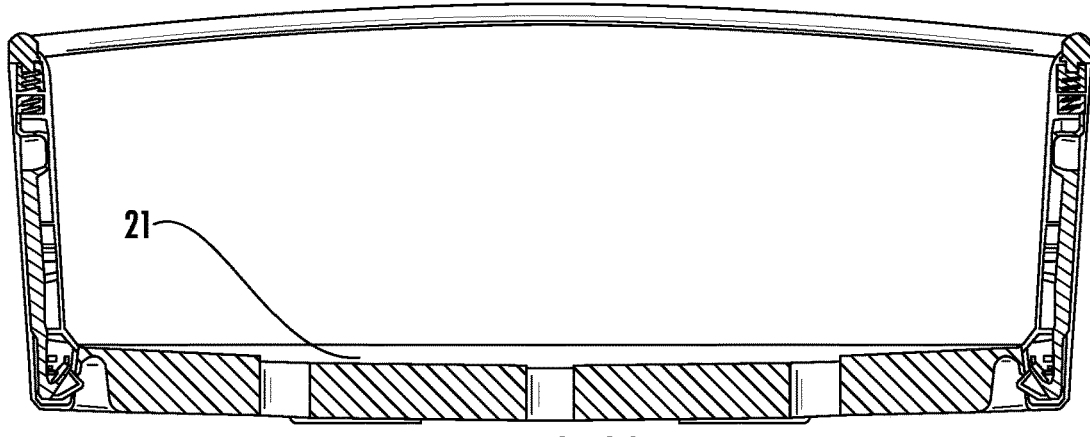
FIG. 22B is a cross-sectional view along plane "22B" from FIG. 22A.
Figure 22C:
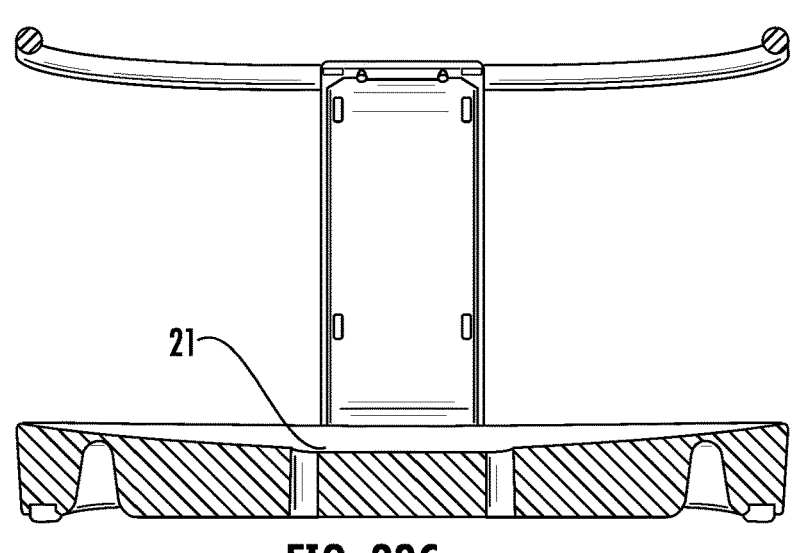
FIG. 22C is a cross-sectional view along plane "22C" from FIG. 22A.

FIGS. 22A-22C illustrate further aspects of the bassinet 20. As shown in FIGS. 22A-22C, an infant support surface 21 (i.e. sleeping surface) of the bassinet 20 has a curved profile. Specifically, the infant support surface 21 has a concave profile when viewed in at least one direction. In one aspect, the infant support surface 21 has the concave profile when viewed in both the lateral direction (FIG. 22C) and the longitudinal direction (FIG. 22B). This infant support surface 21 generally aids and encourages an infant within the bassinet to remain in a central region of the bassinet 20, especially during swaying movement. Additionally, this curved infant support surface 21 assists to maintain an infant's head is positioned above the infant's heart during swaying. In other words, the curved infant support surface 21 positions the infant's heart relatively lower (i.e. in the lowermost concave portion of the surface 21) to the infant's head which is arranged along the outer edge of the concave portion of the infant support surface 21.

Figures 23A, 23B:
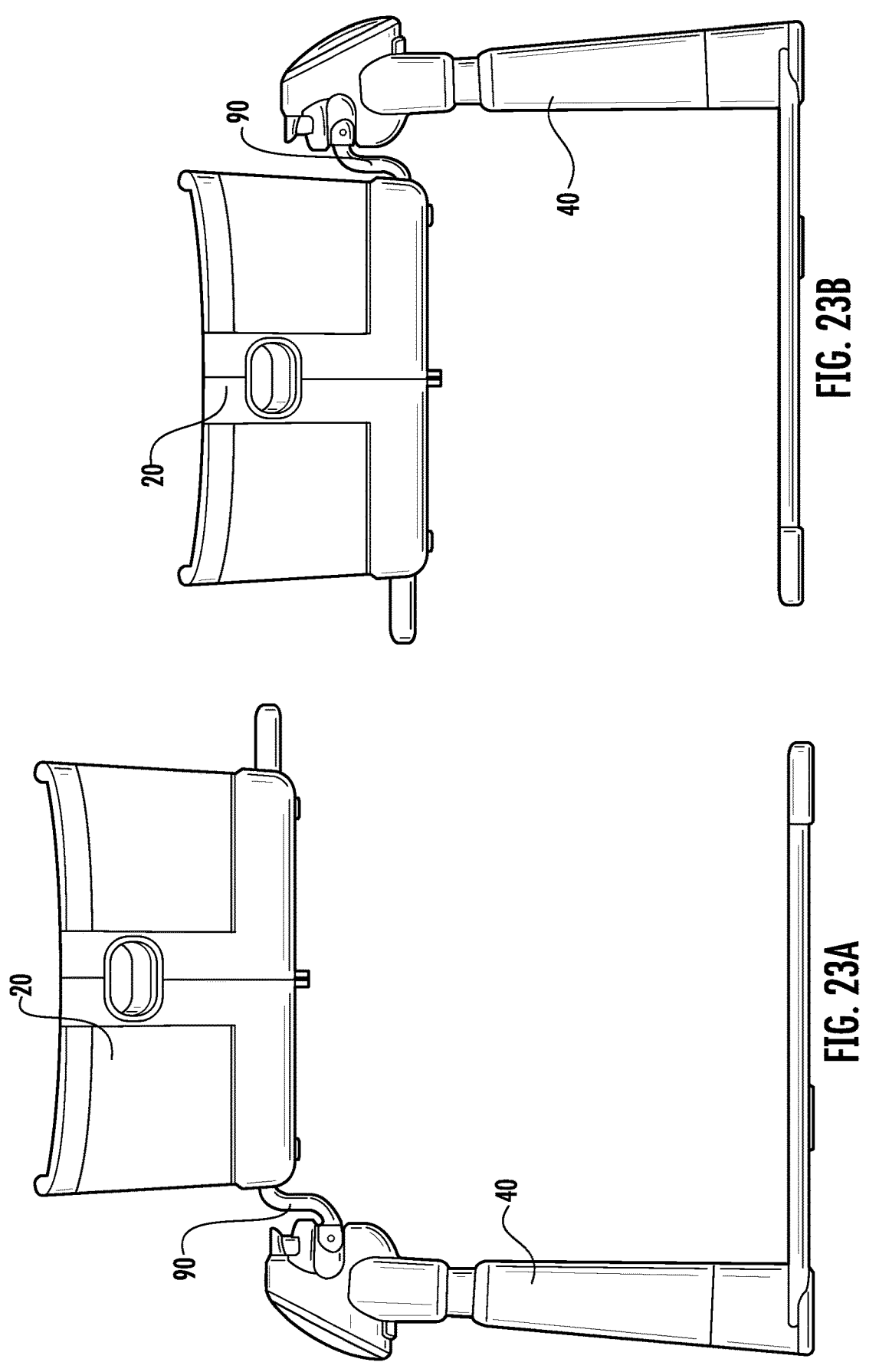
FIG. 23A is a front view of a bassinet assembly including an offset support member between the bassinet and the frame in a first position.
FIG. 23B is a front view of the bassinet assembly including the offset support member between the bassinet and the frame in a second position.
Figure 23D:
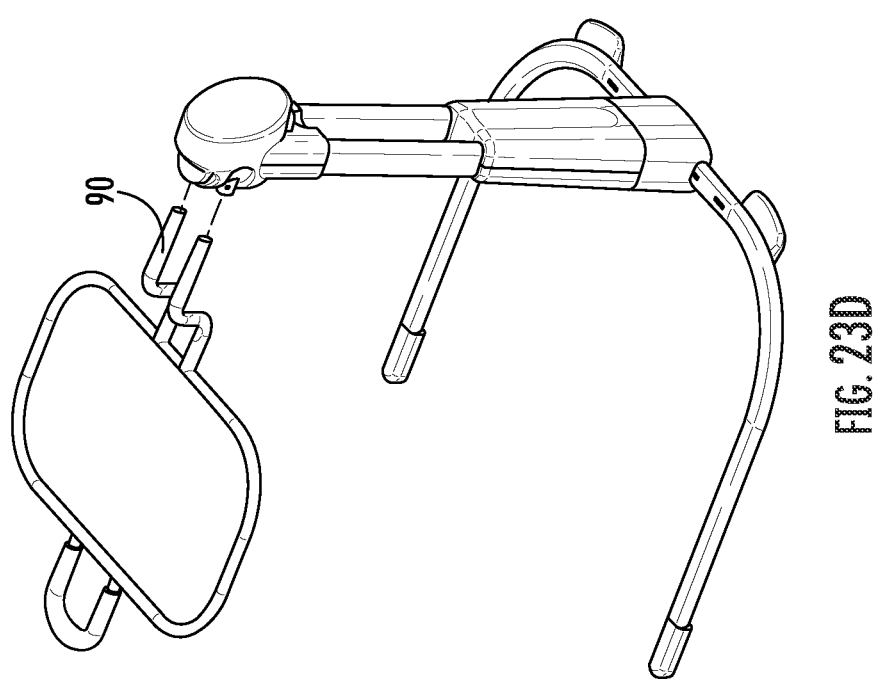
FIG. 23D is a perspective view of the offset support member in a second position prior to attachment with a frame.
Figure 23C:
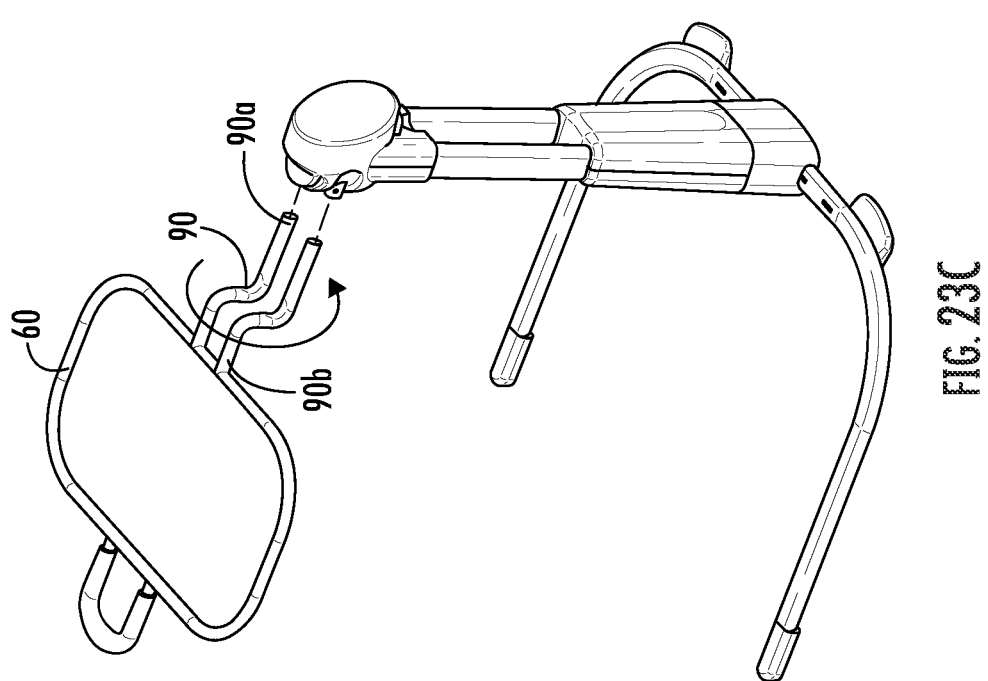
FIG. 23C is a perspective view of the offset support member in a first position prior to attachment with a frame.
Figure 23F:
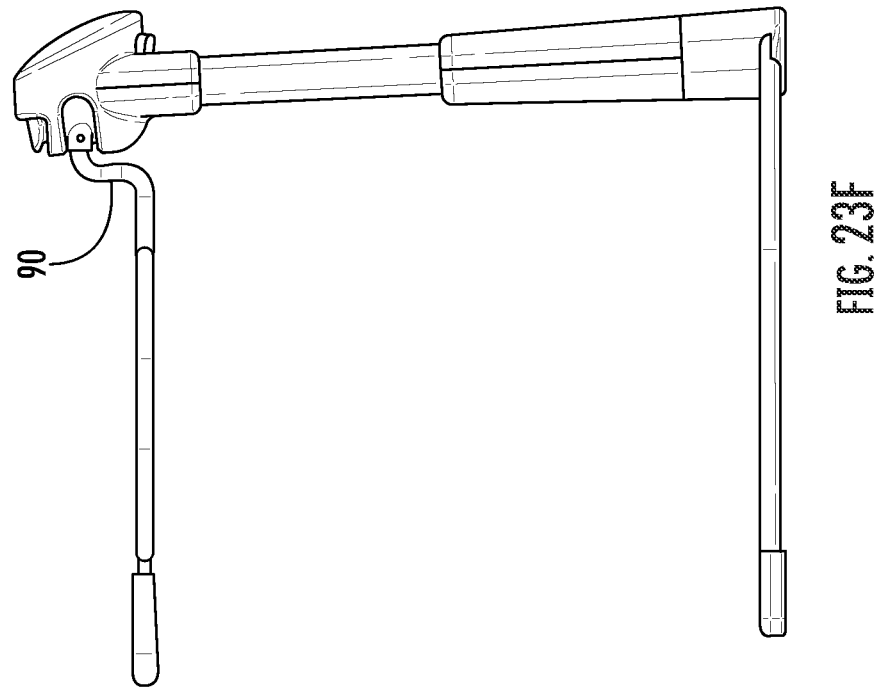
FIG. 23F is a side view of the offset support member in a second position and without a bassinet attached to the bassinet support.

FIGS. 23A-23J illustrate an additional aspect of the present disclosure. As shown in FIGS. 23A-23J, an offset support member 90 provides the connection between the bassinet 20 and the frame 40. The offset support member 90 can include a first proximal end 90a attached to the attachment component 54 and a second terminal end 90b attached to the bassinet support 60. The offset support member 90 can have an "S" shaped profile, as shown in FIGS. 23A and 23B. This offset support member 90 serves as a secondary height adjustment feature. In one aspect, the telescoping tubes or rods of the frame 40 (such as described herein relative to at least FIGS. 14A-16C) provides a primary height adjustment assembly or mechanism, and the offset member 90 provides a secondary height adjustment assembly or mechanism that is independent of the primary height adjustment mechanism. This arrangement therefore provides an increased ability to adjust the height of the bassinet 20.

As shown in FIGS. 23A, 23C, 23E, and 23G, the offset support member 90 is rotated (i.e. within a receptacle of the attachment component 54) such that the terminal end of the offset support member 90 is higher than the proximal end of the offset support member 90.

Figure 23E:
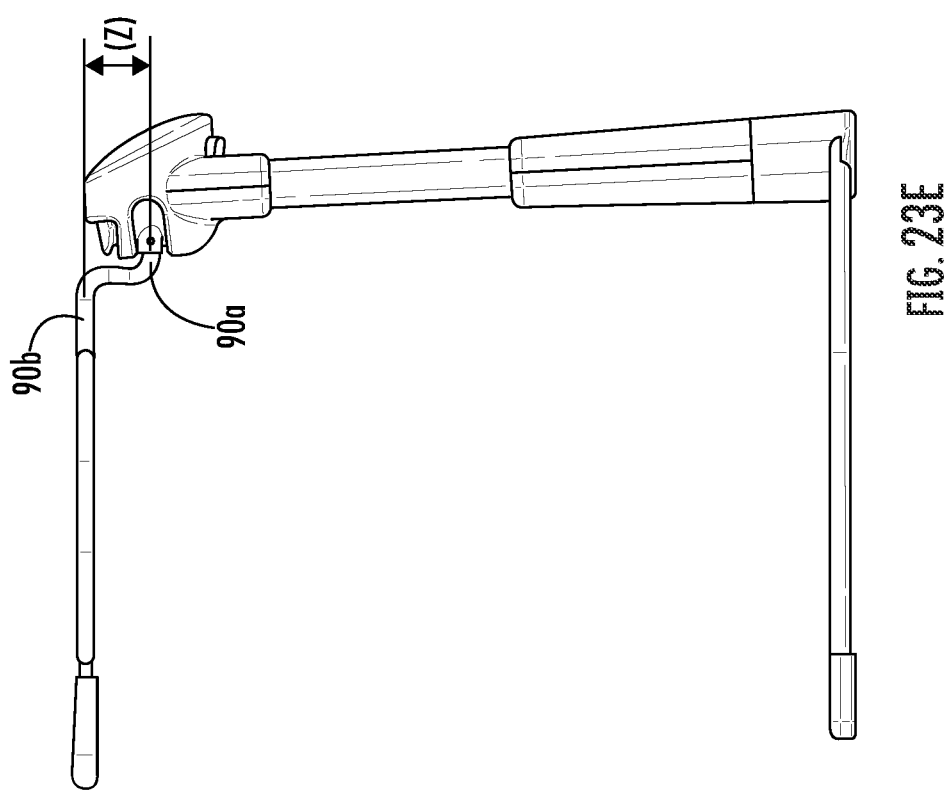
FIG. 23E is a side view of the offset support member in a first position and without a bassinet attached to the bassinet support.
Figure 23H:
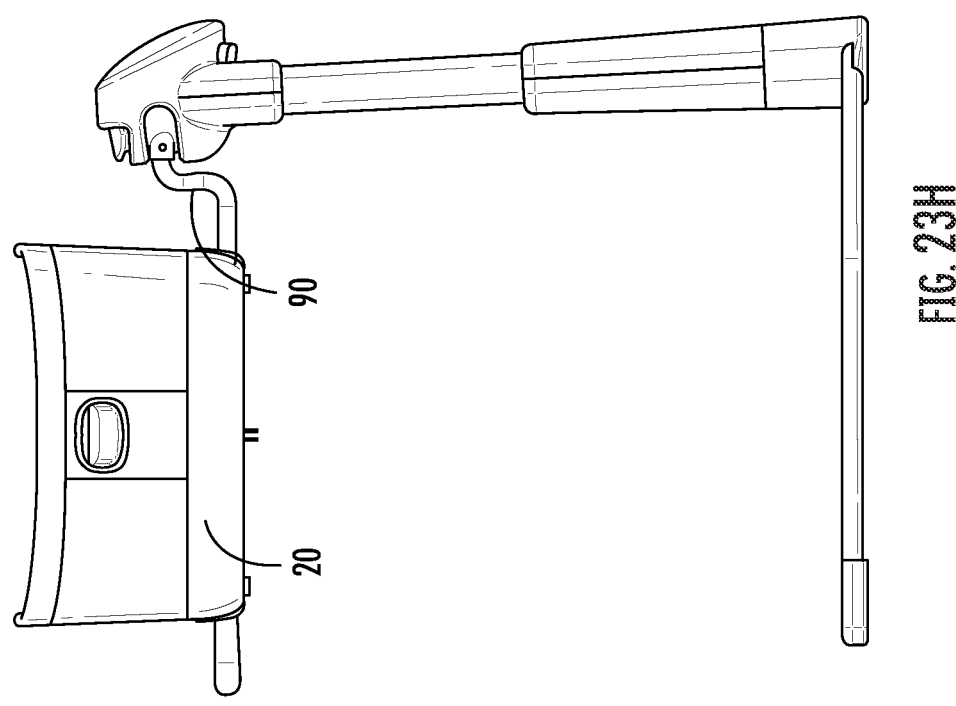
FIG. 23H is a side view of the offset support member in a second position and with a bassinet attached to the bassinet support.
Figure 23G:
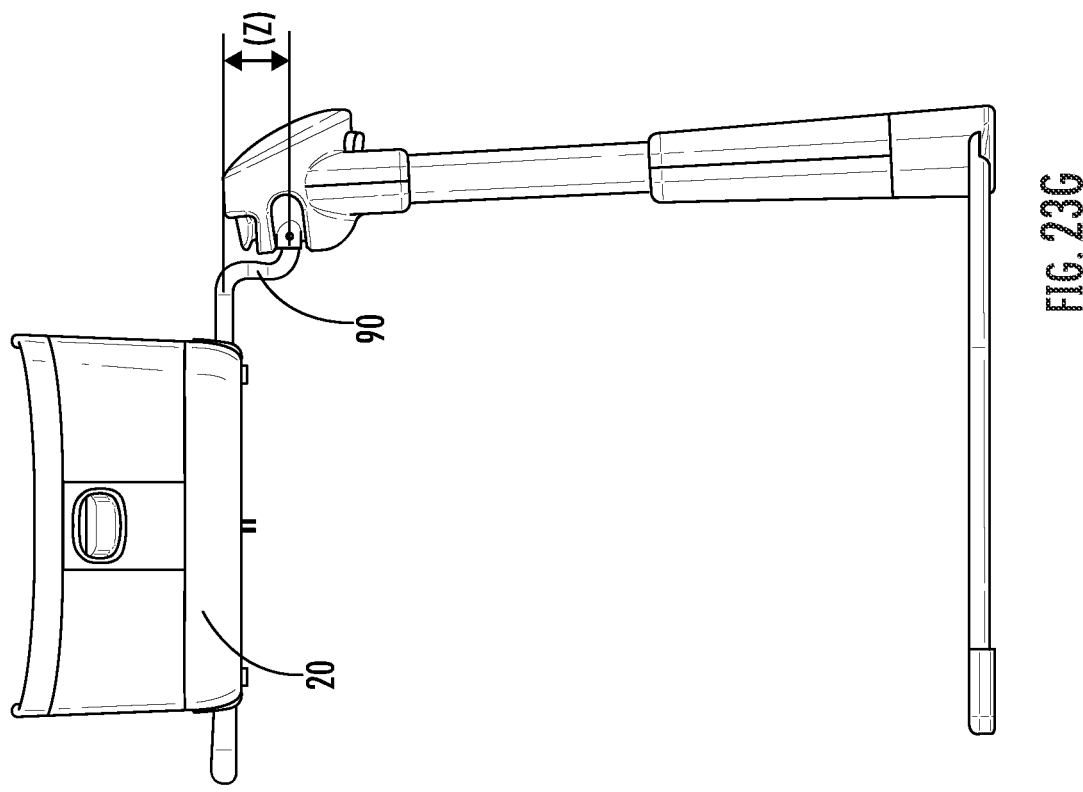
FIG. 23G is a side view of the offset support member in a first position and with a bassinet attached to the bassinet support.

FIGS. 23B, 23D, 23F, and 23H illustrate the offset support member 90 inverted 180 degrees (i.e. within a receptacle of the attachment component 54) such that the terminal end of the offset support member 90 is lower than the proximal end of the offset support member 90. As a result, the bassinet 20 supported by the bassinet support 60 in FIGS. 23B, 23D, 23F, and 23H would be positioned lower than the bassinet 20 is positioned in FIGS. 23A, 23C, 23E, and 23G. The offset support member 90 can be formed integrally with the bassinet support 60 or can be separately connected or attached to the bassinet support 60. In one aspect, the offset support member 90 is configured to be selectively arranged in a first position corresponding to a first bassinet support height and a second position corresponding to a second bassinet support height that is different than the first bassinet support height. In either configuration, the bassinet 20 is can still be swayed via the sway mechanism 50. In one aspect, an offset (Z), as shown in FIG. 23E, is defined between the first proximal end 90a attached to the attachment component 54 and the second terminal end 90b connected to the bassinet support 60.

Figure 23J:
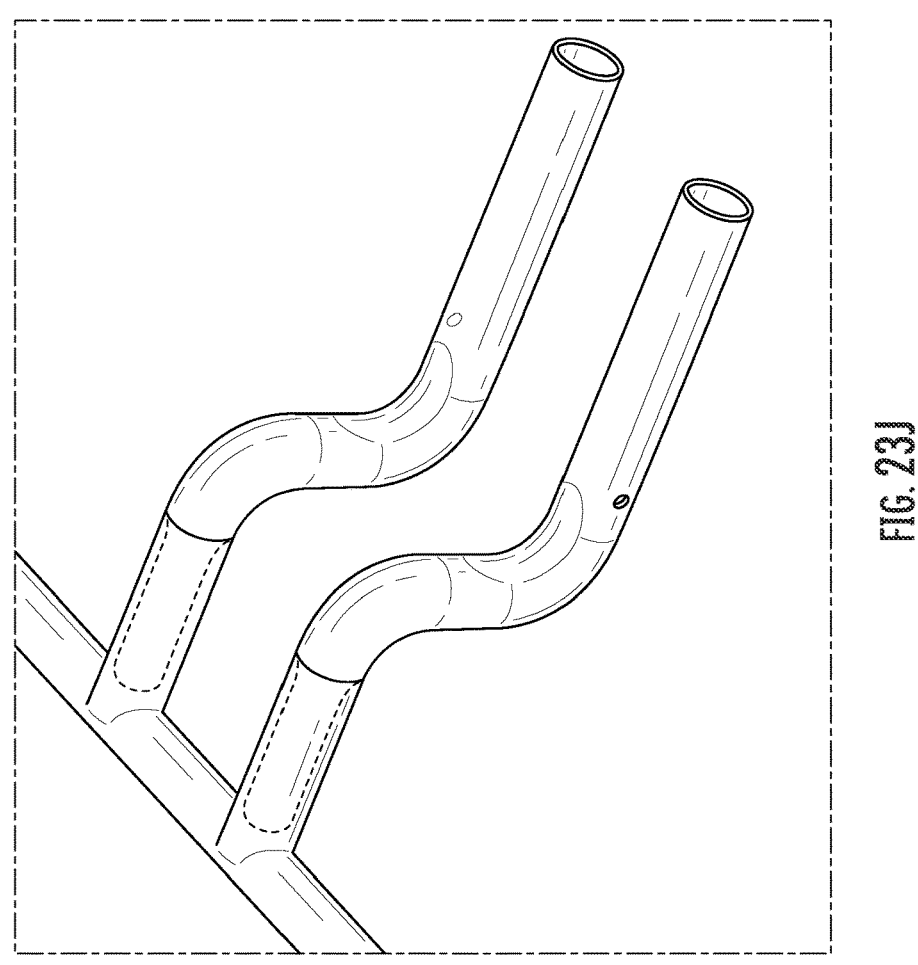
FIG. 23J is a magnified view of area "23J" from FIG. 23I.
Figure 23I:
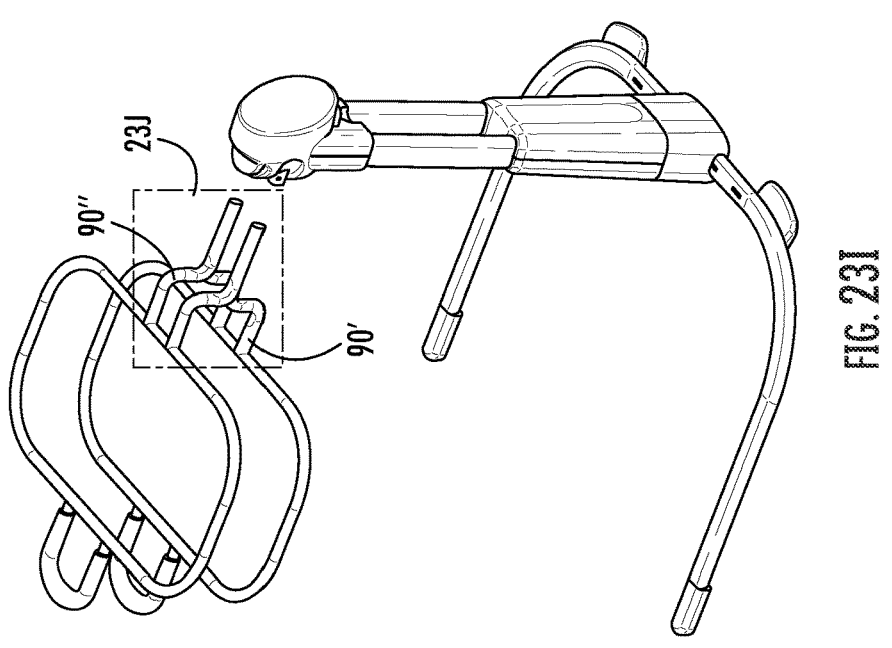
FIG. 23I is a perspective view of the offset support member in two different orientations overlaid with each other.

FIG. 23I illustrates the offset support member 90 in two different positions 90', 90" overlaid with each other. The offset support member 90 in position 90' corresponds to the lower position and the offset support member 90 in position 90" corresponds to the higher position. FIG. 23J corresponds to a magnified portion in area "23J" from FIG. 23I. As shown in FIG. 23J, the offset support member 90 can be formed by a pair of offset support members that are formed as hollow tubes and connected to the bassinet support 60.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

The invention claimed is:

1. A bassinet assembly comprising:
a bassinet support configured to hold a bassinet;
a frame connected to the bassinet support, such that the bassinet support extends cantilevered from the frame at an angle in an upwardly tilted direction from the frame in an unloaded state in which the bassinet is detached from the bassinet support;
a sway mechanism configured to provide swaying motion to the bassinet, the sway mechanism including a pivot shaft attached to the frame and an attachment component that is connected to pivot shaft and the bassinet support, the pivot shaft being arranged in a non-vertical orientation relative to a support surface, and the pivot shaft or the attachment component being freely rotatable such that the bassinet support is configured to sway when an external force is imparted to the bassinet support; and
a protective assembly configured to prevent damage to the sway mechanism, wherein the protective assembly comprises a damping element connected to a plunger having a complementary shaped interface with a groove formed on the frame,
the bassinet support comprising a latch tube connected at a proximal end to the sway mechanism, the damping element being disposed in the latch tube, the plunger having a terminal end disposed in the latch tube, and the plunger having a first proximal end that protrudes beyond a second proximal end of the latch tube.

2. The bassinet assembly according to claim 1, wherein the pivot shaft is oriented at an angle of 5°-8° relative to a vertical axis extending from the support surface.

3. The bassinet assembly according to claim 1, wherein a bottom plane of the bassinet in an extreme sway position is oriented at an angle that is less than 5° relative to a horizontal plane that is parallel to the support surface.

4. The bassinet assembly according to claim 1, further comprising a sway lock interface configured to lock the sway mechanism such that the sway mechanism is not freely rotatable when the sway lock interface is actuated.

5. The bassinet assembly according to claim 4, wherein the sway lock interface is positioned on at least one of: the bassinet support, or the frame.

6. The bassinet assembly according to claim 1, further comprising the bassinet, wherein an infant support surface of the bassinet has a concave profile in both a lateral direction and a longitudinal direction.

7. A bassinet assembly comprising:
a bassinet support configured to hold a bassinet;
a frame connected to the bassinet support;
a sway mechanism configured to provide swaying motion to the bassinet, the sway mechanism including a pivot shaft attached to the frame and an attachment component that is connected to pivot shaft and the bassinet support, the pivot shaft being arranged in a non-vertical orientation relative to a support surface, and the pivot shaft or the attachment component being freely rotatable such that the bassinet support is configured to sway when an external force is imparted to the bassinet support; and a protective assembly configured to prevent damage to the sway mechanism, wherein the protective assembly comprises a damping element connected to a plunger having a complementary shaped interface with a groove formed on the frame, the bassinet support comprising a latch tube connected at a proximal end to the sway mechanism, the damping element being disposed in the latch tube, the plunger having a terminal end disposed in the latch tube, and the plunger having a first proximal end that protrudes beyond a second proximal end of the latch tube.

8. The bassinet assembly according to claim 1, wherein the pivot shaft is oriented at an angle of 3°-10° relative to a vertical axis extending from the support surface.

9. A bassinet assembly comprising:

a bassinet support configured to hold a bassinet;

a frame connected to the bassinet support;

a sway mechanism configured to provide swaying motion to the bassinet, the sway mechanism including a pivot shaft attached to the frame and an attachment component that is connected to pivot shaft and the bassinet support; and a protective assembly configured to prevent damage to the sway mechanism, wherein the protective assembly comprises a damping element connected to a plunger having a complementary shaped interface with a groove formed on the frame, the bassinet support comprising a latch tube connected at a proximal end to the sway mechanism, the damping element being disposed in the latch tube, the plunger having a terminal end disposed in the latch tube, and the plunger having a first proximal end that protrudes beyond a second proximal end of the latch tube, wherein the pivot shaft is oriented at an angle of 3°-10° relative to a vertical axis extending from a support surface.

10. The bassinet assembly according to claim 9, wherein the pivot shaft is oriented at an angle of 5°-8° relative to a vertical axis extending from the support surface.

11. The bassinet assembly according to claim 9, wherein the pivot shaft or the attachment component being freely rotatable such that the bassinet support is configured to sway when an external force is imparted to the bassinet support.

12. The bassinet assembly according to claim 9, wherein a bottom plane of the bassinet in an extreme sway position is oriented at an angle that is less than 5° relative to a horizontal plane that is parallel to the support surface.

13. The bassinet assembly according to claim 9, further comprising a sway lock interface configured to lock the sway mechanism such that the sway mechanism is not freely rotatable when the sway lock interface is actuated.

14. The bassinet assembly according to claim 13, wherein the sway lock interface is positioned on at least one of: the bassinet support, or the frame.

15. The bassinet assembly according to claim 9, further comprising the bassinet, wherein an infant support surface of the bassinet has a concave profile in both a lateral direction and a longitudinal direction.

\*    \*    \*    \*    \*